United States Patent [19]

Yamane et al.

[11] Patent Number: 5,327,275
[45] Date of Patent: Jul. 5, 1994

[54] SWITCHING SYSTEM OF OPTICAL TRANSMISSION LINES FOR PROTECTING FROM TROUBLE

[75] Inventors: Kazuo Yamane; Naonobu Fujimoto; Takashi Kihara; Takeo Fukushima; Koichi Nishimura; Hatsumi Iino, all of Kawasaki, Japan

[73] Assignee: Fujitsu Limited, Kawasaki, Japan

[21] Appl. No.: 784,211

[22] Filed: Oct. 30, 1991

[30] Foreign Application Priority Data

Oct. 30, 1990 [JP] Japan .................................. 2-293420
Nov. 28, 1990 [JP] Japan .................................. 2-327508

[51] Int. Cl.$^5$ ...................... H04B 10/08; H04J 14/00
[52] U.S. Cl. .................................. 359/117; 359/110; 359/173; 359/152; 370/16
[58] Field of Search ............... 359/110, 117, 152, 177, 359/173; 370/16, 16.1; 371/8.1, 8.2; 379/279, 272, 273

[56] References Cited

U.S. PATENT DOCUMENTS

| | | | |
|---|---|---|---|
| 4,347,605 | 8/1982 | Hashizume et al. | 370/16.1 |
| 4,393,493 | 7/1983 | Edwards | 370/110.4 |
| 4,451,916 | 5/1984 | Casper et al. | 359/110 |
| 4,646,286 | 2/1987 | Reid et al. | 370/16 |
| 4,680,776 | 7/1987 | Ikeuchi et al. | 370/16 |
| 4,967,406 | 10/1990 | Yagi et al. | 370/16 |
| 5,007,070 | 4/1991 | Chao et al. | 370/105.3 |
| 5,069,521 | 12/1991 | Hardwick | 359/152 |
| 5,175,639 | 12/1992 | Takasaki | 359/125 |

FOREIGN PATENT DOCUMENTS

| | | |
|---|---|---|
| 2598573 | 11/1987 | France . |
| 53-41957 | 4/1978 | Japan .................................. 371/8.1 |
| 55-161449 | 12/1980 | Japan . |
| 56-132839 | 10/1981 | Japan . |
| 60-3237 | 1/1985 | Japan . |
| 61-74422 | 4/1986 | Japan . |
| 61-234634 | 10/1986 | Japan . |
| 2-285828 | 11/1990 | Japan . |

OTHER PUBLICATIONS

Fujitsu-Scientific and Technical Journal, vol. 23, No. 3, Sep. 1987, Kawasaki, JP, pp. 177-186, M. Mori et al. "810M Optical Transmission System".

IEEE International Conference on Communications ICC 88, vol. 1, No. 1.1, Jun. 12, 1988, Philadelphia, Pa., US, pp. 1-5, XP000093687 K. Aida et al. "Optical Protection Switches for Trunk Transmission Systems".

Journal of Lightwave Technology, vol. 8, No. 2, Feb. 1990, New York, US, pp. 152-159, XP0000103804, Wu et al., "Strategies and Technologies for Planning a Cost-Effective Survivable Fiber Network Architecture Using Optical Switches".

European Search Report, The Hague, mailed Jan. 11, 1993.

Primary Examiner—Richard E. Chilcot, Jr.
Assistant Examiner—Rafael Bacares
Attorney, Agent, or Firm—Staas & Halsey

[57] ABSTRACT

A system for optical communication between first and second optical terminal stations, containing a plurality of working optical transmission lines each for connecting between the first and second optical terminal stations, a protection optical transmission line. Each of the first and second optical terminal stations contains a plurality of working pieces of optical terminal equipment, connected to the respective working optical transmission lines, a protection piece of optical terminal equipment connected to the protection optical transmission line, and a plurality of bidirectional optical signal paths, provided corresponding to the respective working pieces of optical terminal equipment, and each operative to connect the corresponding working piece of optical terminal equipment to the protection piece of optical terminal equipment.

49 Claims, 22 Drawing Sheets

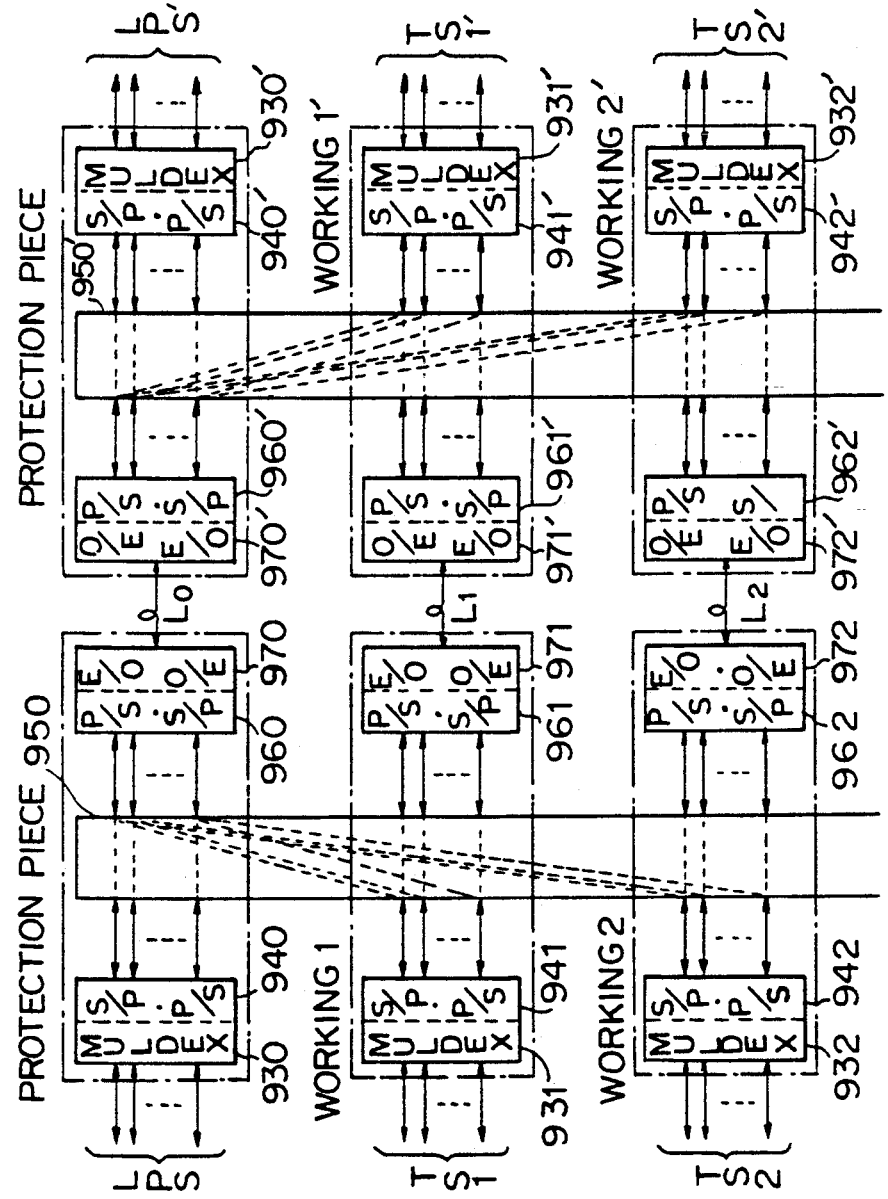

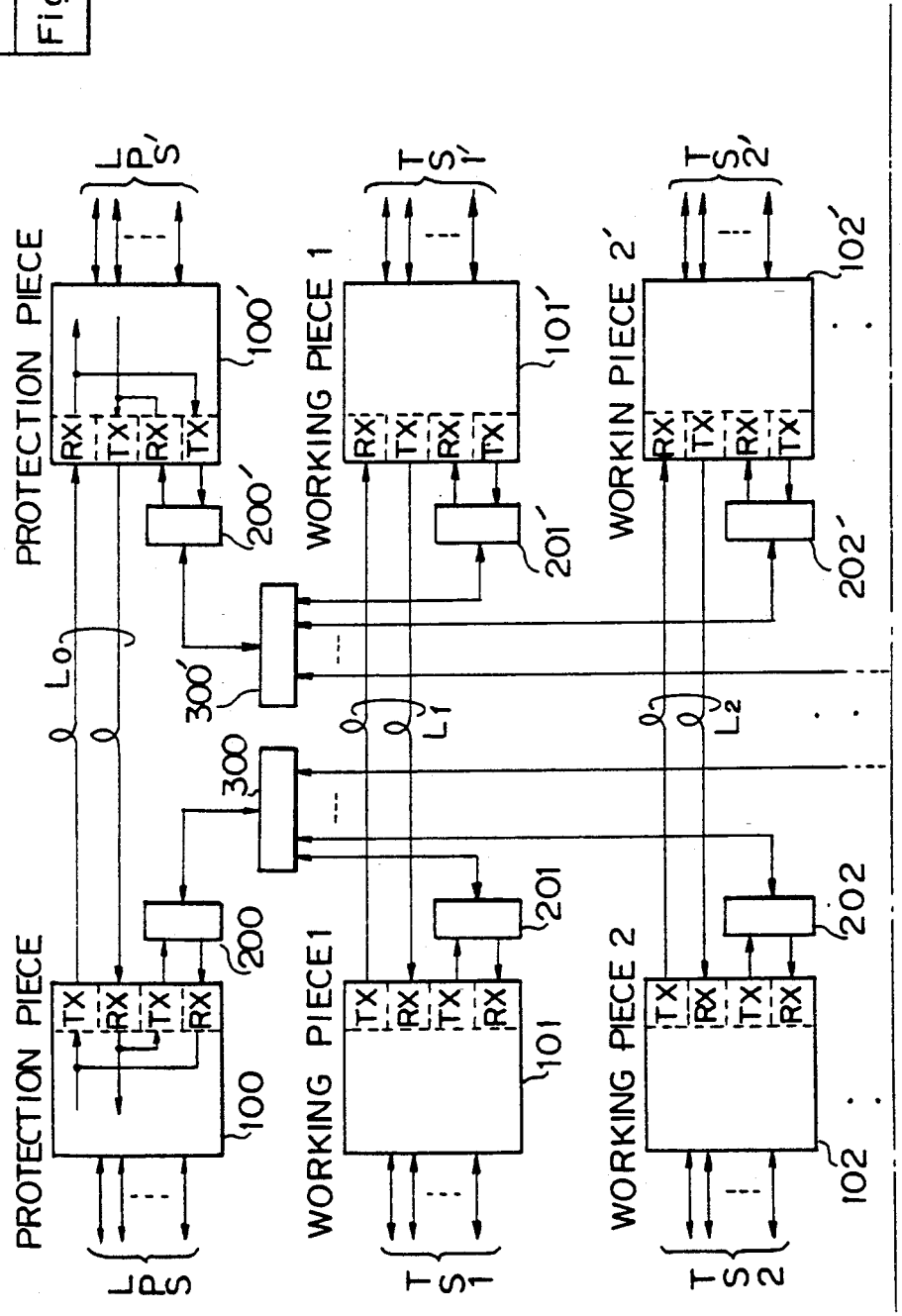

| Fig. 9A |
| Fig. 9B |

SWITCHING SYSTEM OF OPTICAL TRANSMISSION LINES FOR PROTECTING FROM TROUBLE

BACKGROUND OF THE INVENTION (1) Field of the Invention

The present invention relates to a switching system of optical transmission lines in an optical communication system for protecting a communication between terminal stations. The switching system according to the present invention is applied to an optical communication system comprising at least one working transmission line and a protection transmission line.

(2) Description of the Related Art

FIG. 1 is a diagram showing a conventional construction of an optical communication system comprising two terminal stations and a plurality of working optical transmission lines and a protection (stand-by) optical transmission line provided between the terminal stations. In FIG. 1, reference numeral 910, 911, . . . 91N each denote a multiplexer/demultiplexer in a terminal station A, 920 denotes a protection switch in the terminal station A, 910', 911', . . . 91N' each denote a multiplexer/demultiplexer in a terminal station B, 920' denotes a protection switch in the terminal station B, $L_0$ denotes a protection transmission line, $L_1, L_2, \ldots L_N$ each denote a working transmission line, TS1, TS2, . . . TSN and TS1', TS2', . . . TSN' each denote a group of transmission lines of tributary signals of low transmission rates, and LPS and LPS' each denote a group of transmission lines for transmitting tributary signals of low priorities, where each of the transmission lines are assumed to be a bidirectional transmission line. Each of the above multiplexer/demultiplexers 910, 911, . . . 91N, and 910', 911', . . . 91N' corresponding to each optical transmission line, is contained in one piece of terminal equipment.

In the construction of FIG. 1, the protection switches 920 in the terminal station A are provided on the sides of groups TS1, TS2, . . . TSN of transmission lines of tributary signals of low transmission rates, with regard to the multiplexer/demultiplexers 910, 911, . . . 91N, and 910', 911', . . . 91N', and connects the groups TS1, TS2, . . . TSN of transmission lines transmitting tributary signals of low transmission rates to the corresponding multiplexer/demultiplexers 911, . . . 91N, respectively in a normal condition. Thus, the respective groups TS1, TS2, . . . TSN of tributary signals which are to be transmitted from the terminal station A to the terminal station B, are multiplexed in the corresponding multiplexer/demultiplexers 911, . . . 91N to electric signals of high transmission rates. Then, the electric signals of high transmission rates which are generated in the respective multiplexer/demultiplexers 911, . . . 91N, are converted to optical signals in E/O (electric signal to optical signal) conversion circuits (not shown) provided on the sides of the optical transmission lines $L_1, L_2, \ldots L_N$, to be transmitted through the optical transmission lines to the terminal stations B. Parallel to the above operation of transmission, optical signals transmitted through the optical transmission lines $L_1, L_2, \ldots L_N$, are respectively converted to electric signals in O/E (optical signal to electric signal) conversion circuits (not shown) provided on the sides of the optical transmission lines $L_1, L_2, \ldots L_N$ of the corresponding multiplexer/demultiplexers 911, . . . 91N, and are then respectively/demultiplexed in the corresponding multiplexer/demultiplexers 911, . . . 91N to tributary signals to be transmitted through the groups TS1, TS2, . . . TSN of transmission lines transmitting tributary signals of low transmission rates. Similar signal transmission and reception operations are performed in the terminal station B.

When a trouble occurs in one of the optical transmission lines $L_1, L_2, \ldots L_N$, the transmission lines transmitting tributary signals of low transmission rates corresponding to the above transmission line of the trouble, are connected to the multiplexer/demultiplexer 910 so that the tributary signals to be transmitted from the terminal station A to the terminal station B are multiplexed in the multiplexer/demultiplexer 910 to an electric signal of a high transmission rate. Although the tributary signals of the low priorities from the above group LPS of transmission lines, are multiplexed and transmitted through the protection transmission line $L_0$, the tributary signals of low priorities are discarded in this case. The electric signal of a high transmission rate is converted to optical signals in an E/O conversion circuit (not shown) which is provided on the side of the optical transmission lines $L_0$, to be transmitted through the optical transmission lines to the terminal stations B. Parallel to the transmission, optical signals transmitted through the optical transmission lines $L_0$, are converted to electric signals in an O/E conversion circuit (not shown) provided on the side of the optical transmission lines $L_0$ of the multiplexer/demultiplexer 910. The electric signal is demultiplexed in the multiplexer/demultiplexer 910 to tributary signals of low transmission rate which are to be transmitted through the above transmission lines transmitting tributary signals of low transmission rates, corresponding to the above transmission line of the trouble. Similar signal transmission and reception operations are performed in the terminal station B.

Namely, according to the construction of FIG. 1, the switching operation from the working transmission line to the protection transmission line is carried out on the side of the tributary signals (of the low transmission rates). Therefore, the switching operations must be carried out for a large number of transmission lines transmitting tributary signals of low transmission rates. Since, in practice, the respective pieces of terminal equipment corresponding to the plurality of optical transmission lines are provided in different locations in a rack or shelf of an apparatus in a terminal station, a large number of cables must be provided for connecting between these pieces of terminal equipment for the above switching operation, and therefore, the hardware construction becomes large and very complicated, as shown in FIG. 1, thereby increasing a cost, and decreasing reliability of the system.

As an attempt to solve the above problem, a construction as shown in FIG. 2 is provided. In FIG. 2, reference numeral 930, 931, . . . 93N each denote a multiplexer/demultiplexer in a terminal station A, 940, 941, . . . 94N, and 960, 961, . . . 96N each denote a parallel to serial and serial to parallel conversion circuit in a terminal station A, 950 denotes a protection switch in the terminal station A, 970, 971, . . . 97N each denote an E/O and O/E conversion circuit in a terminal station A, 930', 931', . . . 93N' each denote a multiplexer/demultiplexer in a terminal station B, 940', 941', . . . 94N', and 960', 961', . . . 96N' each denote a parallel to serial and serial to parallel conversion circuit, 950' denotes a protection switch in the terminal station B, 970', 971', . . .

97N' each denote an E/O and O/E conversion circuit in a terminal station B, $L_0$ denotes a protection transmission line, and $L_1, L_2, \ldots L_N$ each denote a working transmission line, where each of the transmission lines are assumed to be a bidirectional transmission line. One of the above multiplexer/demultiplexers 930, 931, ... 93N, and 930', 931', ... 93N', one of the parallel to serial and serial to parallel conversion circuits 940, 941, ... 94N, and 940', 941', ... 94N', and one of the E/O and O/E conversion circuit 970', 971', ... 97N', corresponding to each optical transmission line, are contained in one piece of terminal equipment indicated by a rectangular drawn by dashed lines.

In the construction of FIG. 2, the protection switches 950 and 950' are each provided on the side of electric signals of the high transmission rates, with regard to the multiplexer/demultiplexers 930, 931, ... 93N, or 930', 931', ... 93N'. However, since the electric signals may have to be propagated for a relatively long distance from a position of a corresponding working transmission line to the protection transmission line when the electric signal is transmitted through the protection transmission line as shown in FIG. 1, it is difficult to carry out the switching operation at the stage of the electric signals of the high transmission rates which are respectively equal to the transmission rates of the corresponding optical transmission lines $L_1, L_2, \ldots L_N$. Therefore, the parallel to serial and serial to parallel conversion circuits 940, 941, ... 94N, 960, 961, ... 96N, 940', 941', ... 94N', and 960', 961', ... 96N' are provided on both sides of the respective protection switches 950 and 950' so that the above electric signals of the high transmission rates are respectively divided into a plurality of parallel electric signals by the parallel to serial and serial to parallel conversion circuits 940, 941, ... 94N, and 940', 941', ... 94N', and the switching to the protection transmission line $L_0$ is carried out in the stage of the divided parallel electric signals.

Thus, when tributary signals are transmitted from the terminal stations A and B, the tributary signals transmitted from the above groups TS1, TS2, ... TSN and TS1', TS2', ... TSN' of transmission lines, are first multiplexed in the corresponding multiplexer/demultiplexers 930, 931, ... 93N, or 930', 931', ... 93N', and are then divided into a plurality of parallel electric signals by the parallel to serial and serial to parallel conversion circuits 940, 941, ... 94N, and 940', 941', ... 94N'. The protection switches 950 and 950' each connect the transmission lines transmitting tributary signals of low transmission rates corresponding to the above trouble transmission line, to the parallel to serial and serial to parallel conversion circuits 960 and 960', and connect the other transmission lines transmitting tributary signals of low transmission rates corresponding to the other transmission lines in which no trouble occurs, to the corresponding parallel to serial and serial to parallel conversion circuits 961, ... 96N, and 961', ... 96N'. In the parallel to serial and serial to parallel conversion circuits 960, 961, ... 96N, and 960', 961', ... 96N', the outputs of the protection switches 950 and 950' are converted into the above-mentioned electric signals of high transmission rates, and the electric signals are converted to optical signals in the corresponding E/O and O/E conversion circuits 970', 971', ... 97N', 970', 971', ... 97N' to be transmitted through the respective optical transmission lines $L_0, L_1, L_2, \ldots L_N$.

Parallel to the above, when optical signals are transmitted from the optical transmission lines $L_0, L_1, L_2, \ldots L_N$ to terminal stations A and B, the optical signals are converted to electric signals of the high transmission rates in the corresponding E/O and O/E conversion circuits 970', 971', ... 97N', 970', 971', ... 97N', and then the electric signals are divided into a plurality of parallel electric signals in the corresponding parallel to serial and serial to parallel conversion circuits 960, 961, ... 96N, and 960', 961', ... 96N'. The divided electric signals are supplied to the protection switches 950 and 950'. The protection switches 950 and 950' supplies the divided signals which are output from the parallel to serial and serial to parallel conversion circuits 960, are supplied to one $94i$ ($i=1$ to N) of the parallel to serial and serial to parallel conversion circuits corresponding to the above-mentioned transmission lines transmitting tributary signals of low transmission rates corresponding to the trouble transmission line, and supplies the divided signals output from the parallel to serial and serial to parallel conversion circuits 961, ... 96N, and 961', ... 96N' are supplied to the other parallel to serial and serial to parallel conversion circuits $94j$ ($j=1$ to N, and $j \neq i$). The outputs of the protection switches 950 and 950' are converted into the above-mentioned electric signals of high transmission rates in the parallel to serial and serial to parallel conversion circuits 940, 941, ... 94N, and 940', 941', ... 94N', and the electric signals are demultiplexed to tributary signals of low transmission rates to transmit the tributary signals through the transmission lines of the low transmission rates.

However, even in the construction of FIG. 2, the switching operation from the working transmission line to the protection transmission line is carried out at the stage of the above-mentioned divided signals. Therefore, the switching operations still must be carried out for a large number of divided parallel transmission lines. Since, in practice, the respective pieces of terminal equipment corresponding to the plurality of optical transmission lines are provided in different locations in a rack or shelf of an apparatus in a terminal station, a large number of cables must be provided for connecting between these pieces of terminal equipment for the above switching operation, and therefore, the hardware construction becomes large and very complicated, as shown in FIG. 2, thereby increasing cost, and decreasing reliability of the system.

SUMMARY OF THE INVENTION

An object of the present invention is to provide a switching system of optical transmission lines in an optical communication system for protecting a communication between terminal stations, which is constructed with hardware of a small size to reduce cost, and improve reliability of the system.

According to the present invention and with reference to the schematic block diagram of FIG. 23, there is provided a switching system for optical communication between first and second optical terminal stations, comprising: a plurality of working optical transmission lines for connecting between the first and second optical terminal stations, and transmitting optical signals in two directions between the first and second optical terminal stations, and transmitting optical signals in two directions between the first and second optical terminal stations; a protection optical transmission line, provided as a stand-by bidirectional optical transmission line for at least a part of the working optical transmission lines, each for connecting between the first and second optical terminal stations, and transmitting an optical signal between the first and second optical terminal stations. Each of the first and second optical terminal stations comprises, a plurality of working pieces of optical terminal equipment provided corresponding to the respective working optical transmission lines, a protection piece of optical terminal equipment provided corresponding to the protection optical transmission line, and a plurality of bidirectional optical signal paths provided corresponding to the respective working pieces of optical terminal equipment, and each operating to connect the corresponding working piece of optical terminal equipment, to the protection piece of optical terminal equipment. Each of the plurality of working pieces of optical terminal equipment comprises, at least one bidirectional tributary port for transmitting and receiving tributary signals therethrough; first and second bidirectional optical ports each for transmitting and receiving optical signals therethrough, the first bidirectional optical port being connected to one of the working optical transmission lines corresponding to the above each of the plurality of working pieces of optical terminal equipment, and the second bidirectional optical port being connected to one of the bidirectional optical signal paths corresponding to the above each of the plurality of working pieces of optical terminal equipment; first receiving means for receiving tributary signals from the above at least one tributary port, first converting means for converting the received tributary signals to optical signals; first transmitting means for transmitting the optical signals converted from the received tributary signals, through the first bidirectional optical port to the other optical terminal station; second transmitting means for transmitting the optical signals converted from the received tributary signals, through the second bidirectional optical port to the protection piece of optical terminal equipment; second receiving means for receiving optical signals transmitted from the above other optical terminal station, through the first bidirectional optical port; third receiving means for receiving optical signals transmitted from the protection piece of optical terminal equipment, through the second bidirectional optical port, second converting means for converting the optical signals received by either of the second or third receiving means, to tributary signals to be transmitted from the above at least one bidirectional tributary port, and third transmitting means for transmitting the tributary signals which are converted by the second converting means, from the above at least one bidirectional tributary port. The above protection piece of optical terminal equipment comprises, third and fourth bidirectional optical ports each for transmitting and receiving optical signals therethrough, the third bidirectional optical port being connected to the protection optical transmission line, and the fourth bidirectional optical port operative to be connected to at least one of the plurality of bidirectional optical signal paths; fourth receiving means for receiving optical signals through the fourth bidirectional optical port from at least one of the plurality of working pieces of optical terminal equipment corresponding to the bidirectional optical signal path; fourth transmitting means for transmitting the received optical signals through the protection optical transmission line to the other optical terminal station; fifth receiving means for receiving optical signals from the above other optical terminal station through the third bidirectional optical port; and fifth transmitting means for transmitting the received optical signals through the fourth bidirectional optical port to the above at least one of the plurality of working pieces of optical terminal equipment corresponding to the above at least one bidirectional optical signal path.

BRIEF DESCRIPTION OF THE DRAWINGS

In the drawings:

FIGS. 2, 2A, 2B is a diagram showing a trial construction of an optical communication system proposed for solving the problem of the construction of FIG. 1;

FIGS. 3, 3A, 3B is a diagram showing a construction for the first and second embodiments of the present invention;

FIGS. 12, 12A, 12B is a diagram showing a construction for the fifth, sixth, and seventh embodiments of the present invention;

DESCRIPTION OF THE PREFERRED EMBODIMENTS

Figure 3B:
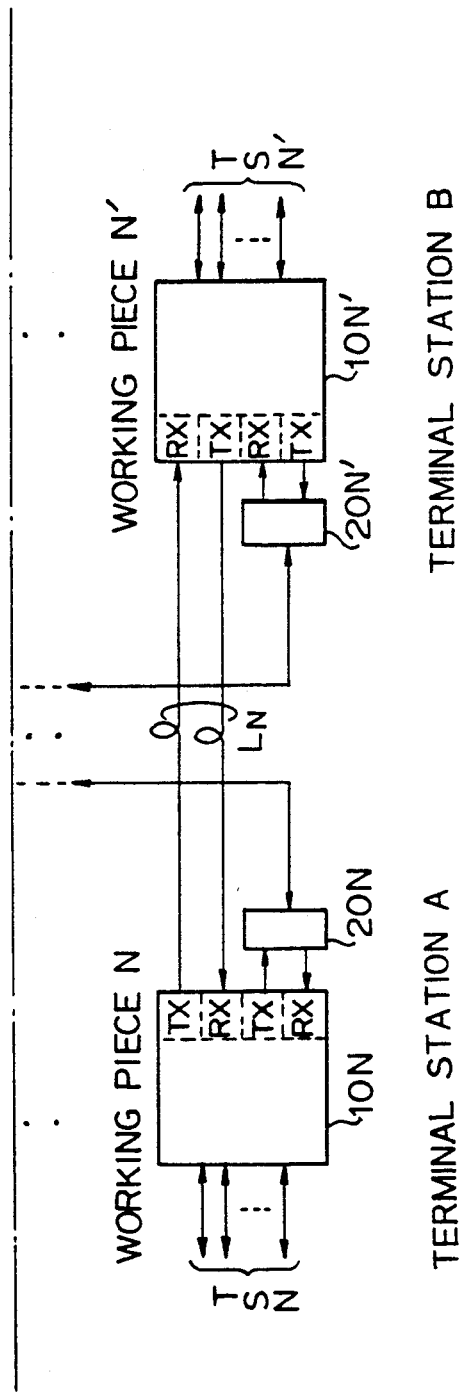
Figure 4:
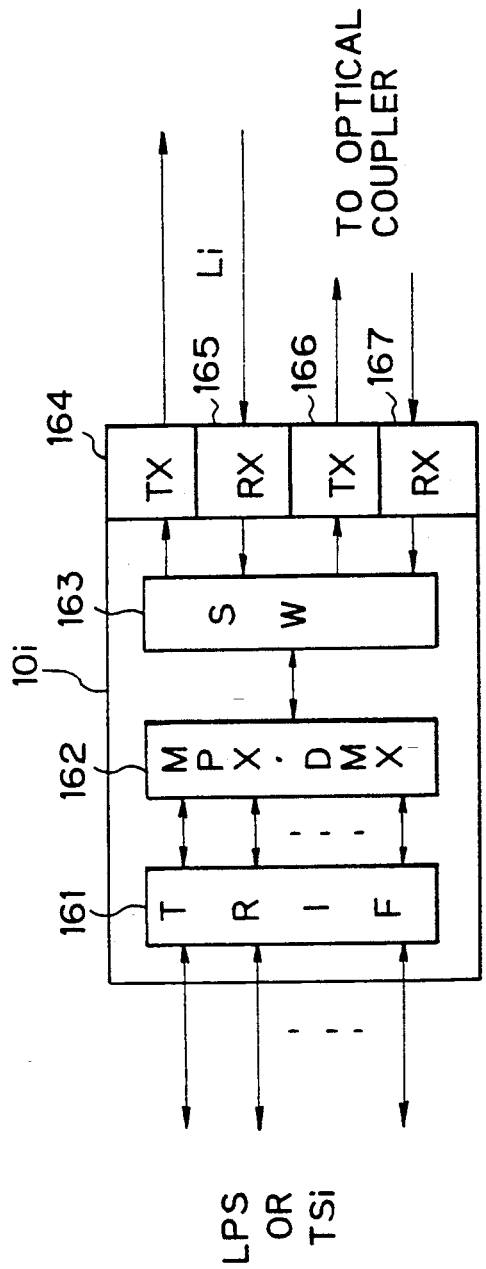
FIG. 4 is a diagram showing a construction of each of the protection pieces of optical terminal equipment 100 and 100' and the working pieces of optical terminal equipment 101, ... 10N, and 101', ... 10N'.

First and Second Embodiments (FIGS. 3 and 4)

Figure 1:
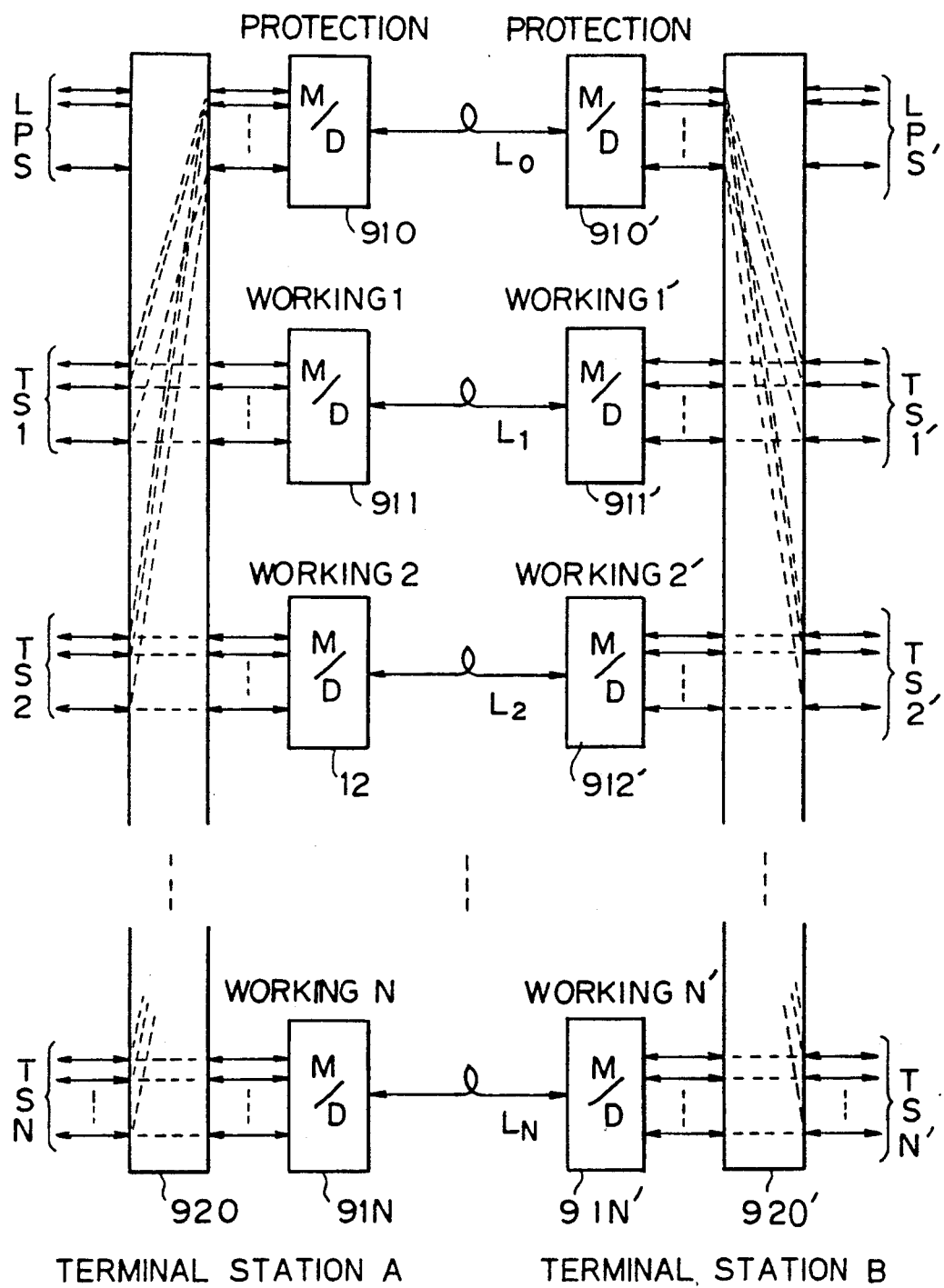
FIG. 1 is a diagram showing a conventional construction of an optical communication system comprising two terminal stations and a plurality of working optical transmission lines and a protection (stand-by) optical transmission line provided between the terminal stations.
Figure 2B:
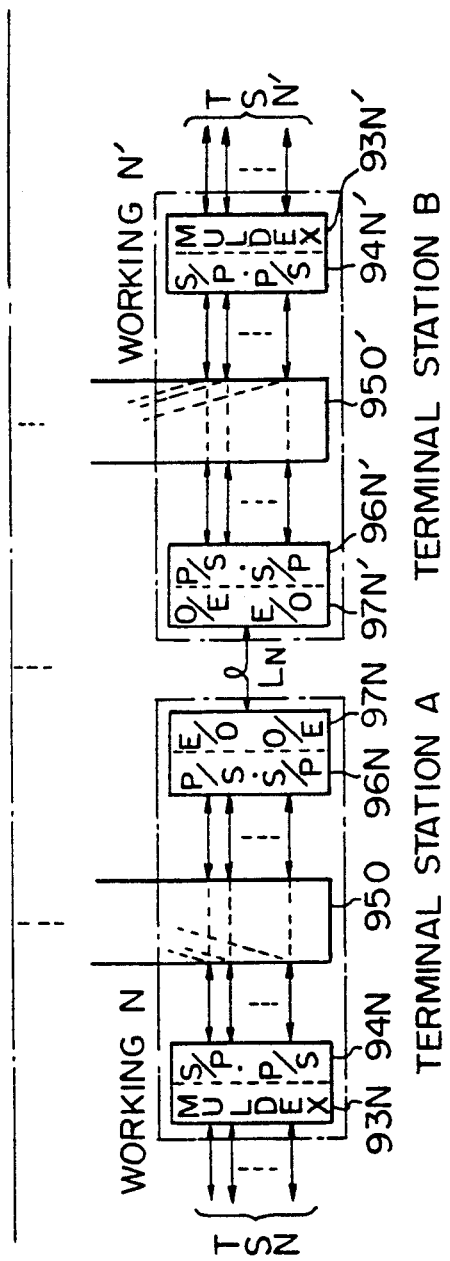

FIG. 3 is a diagram showing a construction of first and second embodiments of the present invention. In FIG. 3, reference numeral 100 denotes a protection piece of optical terminal equipment in a terminal station A, 100' denotes a protection piece of optical terminal equipment in a terminal station B, 100, 101, . . . 10N, 100', 101', . . . 10N' each denote a working piece of optical terminal equipment in the terminal station A, 200, 201, . . . 20N each denote an optical coupler in the terminal station A, and 200', 201', . . . 20N' each denote an optical coupler in the terminal station B. In the first embodiment, 300 and 300' each denote a bidirectional optical coupler, and in the second embodiment, 300 and 300' each denote a bidirectional optical switch. In each of the protection pieces of optical terminal equipment 100 and 100' and the working piece of optical terminal equipment 101, . . . 10N, and 101', . . . 10N', TX denotes an optical signal transmitting unit, and RX denotes an optical signal receiving unit. $L_0$ denotes a protection transmission line, $L_1, L_2, \ldots L_N$ denote a working transmission line, TS1, TS2, . . . TSN and TS1', TS2', . . . TSN' each denote a group of transmission lines of tributary signals of low transmission rates, and LPS and LPS' each denote a group of transmission lines for transmitting tributary signals of low priorities, where each of the transmission lines are assumed to be a bidirectional transmission line, as in the constructions of FIGS. 1 and 2.

FIG. 4 is a diagram showing a construction of each of the protection pieces of optical terminal equipment 100 and 100' and the working pieces of optical terminal equipment 101, . . . 10N, and 101', . . . 10N'. In FIG. 4, reference numeral 161 denotes an interface circuit for transmitting and receiving a plurality of tributary signals throug a plurality of ports, 162 denotes a multiplexer/demultiplexer for multiplexing tributary signals to an electric signal of a high transmission rate, and demultiplexing an electric signal to a plurality of tributary signals of relatively low transmission rates, 163 denotes a switch unit, 164 denotes the optical signal transmitting unit TX connected to the protection transmission line $L_0$, 165 denotes the optical signal receiving unit RX connected to the protection transmission line $L_0$, 166 denotes the optical signal transmitting unit TX connected to a corresponding one of the optical couplers 200, 201, . . . 20N each denote an optical coupler in the terminal station A, and 200', 201', . . . 20N', and 167 denotes the optical signal receiving unit RX connected to the optical coupler.

As shown in FIG. 4, in the first and second embodiments, each of the protection pieces of optical terminal equipment 100 and 100' and the working piece of optical terminal equipment 101, . . . 10N, and 101', . . . 10N', comprises two sets of optical signal transmitting units TX and optical signal receiving unit RX, where one set of optical signal transmitting unit TX and optical signal receiving units RX is connected to a corresponding one of the bidirectional optical transmission lines $L_0, L_1, L_2, \ldots L_N$, and the other set is provided for connecting the protection piece of optical terminal equipment 100 or 100' with one of the working pieces of optical terminal equipment 101, . . . 10N, and 101', . . . 10N' through a bidirectional optical path as explained later. Although not shown, each of the optical signal transmitting units TX comprises an electric-to-optical converter for converting the above electric signal of relatively high transmission rate to an optical signal, and each of the optical signal receiving units RX comprises an optical-to-electric converter for converting an optical signal to an electric signal of high transmission rate. A pair of an unidirectional optical input port for receiving an optical signal and an unidirectional optical output port for transmitting an optical signal in each set constitute a bidirectional optical port. The construction of the switch unit 163 is different for the first and second embodiments, and is explained later.

First Embodiment (FIGS. 3, 4, 5, and 6)

In the first embodiment, each of the above optical couplers 200, 201, . . . 20N and 200', 201', . . . 20N' comprises one bidirectional optical port and two unidirectional optical ports, and each of the optical couplers 300 and 300' comprises a coupled bidirectional optical port for transmitting and receiving coupled optical signals and a plurality of uncoupled bidirectional optical ports respectively for transmitting and receiving uncoupled optical signals. One of the two unidirectional optical ports of each of the above optical couplers 200, 201, . . . 20N and 200', 201', . . . 20N' receives an optical signal, and the received optical signal passes through the optical coupler to be output from the bidirectional optical port of the optical coupler. The bidirectional optical port thereof also receives an optical signal, and the received optical signal passes through the optical coupler to be output from the other of the two unidirectional optical ports of the optical coupler. One of the plurality of uncoupled bidirectional optical ports of each of the above optical couplers 300 and 300' receives an optical signal, and the received optical signal passes through the optical coupler to be output from the coupled bidirectional optical port of the optical coupler. The coupled bidirectional optical port thereof also receives an optical signal, and the received optical signal passes through the optical coupler to be output from all of the plurality of uncoupled bidirectional optical ports of the optical coupler.

Figure 5:
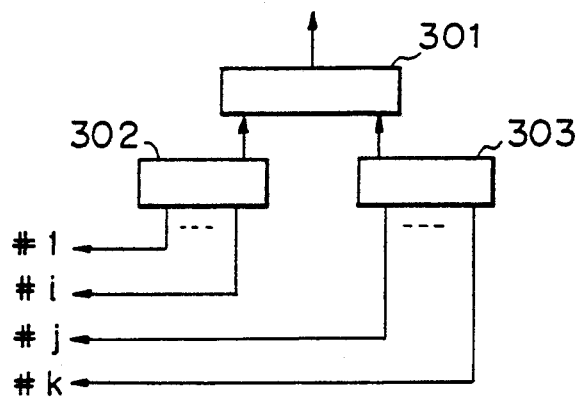
FIG. 5 shows an optical coupler constructed by a tree connection of a plurality of optical couplers.

The optical coupler as above is realized by a star coupler, or a tree connection of a plurality of optical switches as shown in FIG. 5.

As shown in FIG. 3, the optical couplers 200 and 200' are respectively provided corresponding to the protection pieces of optical terminal equipment 100 and 100', and the optical couplers 201, . . . 20N and 201', . . . 20N' are respectively provided corresponding to the working pieces of optical terminal equipment 101, . . . 10N and 101', . . . 10N'. The above two unidirectional optical ports of each of the optical couplers 200, 201, . . . 20N and 200', 201', . . . 20N' are respectively connected through bidirectional optical paths to the above optical input port and optical output port in the bidirectional optical port of the corresponding one of the protection piece of optical terminal equipment 100 and 100' and the working pieces of optical terminal equipment 101, . . . 10N and 101', . . . 10N'. The bidirectional optical port of each of the optical couplers 200 and 200' is connected through a bidirectional optical path to the coupled bidirectional optical port of the optical coupler 300 or 300' in each of the optical terminal stations A and B. The bidirectional optical port of each of the optical couplers 201, . . . 20N and 200', 201', . . . 20N' is connected to one of the plurality of uncoupled bidirectional optical ports of the corresponding one of the optical couplers 300 and 300'.

Figure 6:
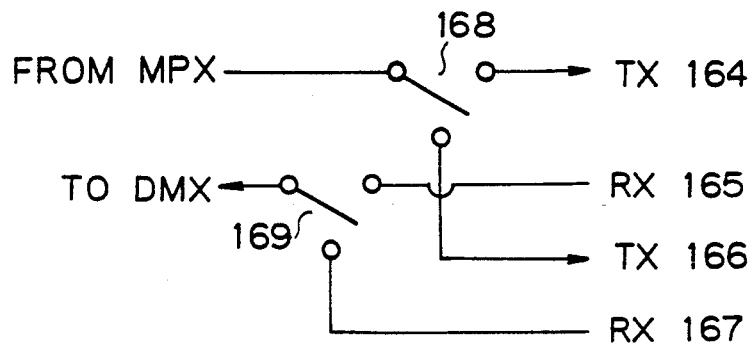
FIG. 6 shows a construction of the switch unit 163 in each working piece of optical terminal equipment 201, ... 20N and 200', 201', ... 20N' in the first embodiment of the present invention.

FIG. 6 shows a construction of the switch unit 163 in each working piece of optical terminal equipment 101, . . . 10N and 100', 101', . . . 10N' in the first embodiment of the present invention. In FIG. 6, reference numeral 168 and 169 each denote a connection switch. As shown in FIG. 6, the connection switch 168 connects the output terminal of the multiplexer 162 to a selected one of the optical signal transmitting unit TX 164 and the optical signal transmitting unit TX 166, the connection switch 169 in each working piece of optical terminal equipment connects a selected one of the output of the optical signal receiving unit 165 and the output of the optical signal receiving unit RX 167 to the input terminal of the demultiplexer 162. The above connections with the optical signal transmitting unit TX 166 and the optical signal receiving unit RX 167 are made in one of the working pieces of optical terminal equipment 101, . . . 10N and 101', . . . 10N' when the working piece of optical terminal equipment is connected to the protection transmission line. When no trouble occurs in a corresponding working transmission line Li, the output of the multiplexer 162 is connected through the connection switch 168 to the optical signal transmitting unit TX 164, and the output terminal of the optical signal receiving unit RX 165 is connected through the connection switch 169 to the input terminal of the demultiplexer 162 in the working pieces of optical terminal equipment.

Figure 7:
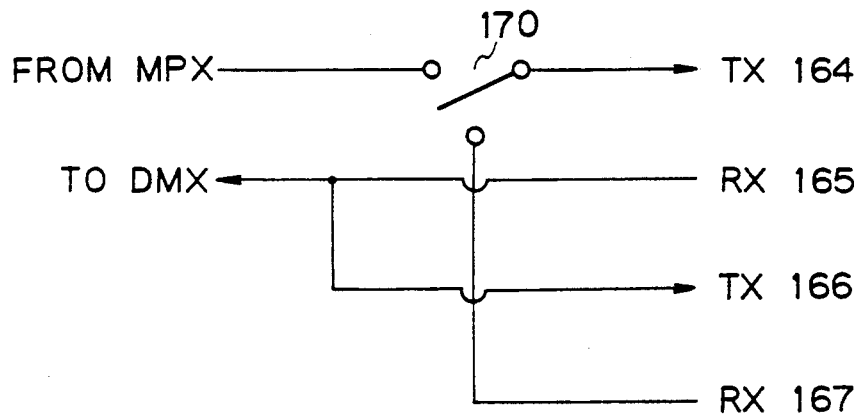
FIG. 7 shows a construction of the switch unit 163 in each protection piece of optical terminal equipment 100 or 100' in the first embodiment of the present invention.

FIG. 7 shows a construction of the switch unit 163 in each protection piece of optical terminal equipment 100 or 100' in the first embodiment of the present invention. In FIG. 7, reference numeral 170 denotes a connection switch. As shown in FIG. 7, the connection switch 170 connects the input terminal of the optical signal transmitting unit TX 164 to a selected one of the output terminal of the multiplexer 162 and the output terminal of the optical signal receiving unit RX 167, and the output of the optical signal receiving unit RX 165 is supplied to both of the input terminal of the demultiplexer 162 and the input terminal of the optical signal transmitting unit TX 166. The above connection with the optical signal receiving unit RX 167 is made in the protection piece of optical terminal equipment 100 and 100' when one of the working pieces of optical terminal equipment is connected to the protection transmission line. When no trouble occurs in every working transmission line Li, the output of the multiplexer 162 is connected through the connection switch 170 to the optical signal transmitting unit TX 164.

The operation of the construction of the first embodiment is explained below. Although the explanation is made for the construction of the optical terminal station A, the same operation is carried out in the optical terminal station B.

When a trouble occurs in one of the working transmission lines Li, tributary signals TSi (i=1 to N) multiplexed in the multiplexer 162 in one of the working pieces of optical terminal equipment 10i connected to the working transmission line Li, is supplied through the connection switch 168 to the optical signal transmitting unit TX 166. The multiplexed signal is converted to an optical signal in the optical signal transmitting unit 166, and then the optical signal is transmitted through one 20i of the optical couplers 201, . . . 20N corresponding to the working piece of optical terminal equipment 10i, the optical coupler 300, and the optical coupler 200, to the optical signal receiving unit RX 167 in the protection piece of optical terminal equipment 100. The optical signal is converted to an electric signal in the optical signal receiving unit RX 167, and the electric signal is supplied through the switch unit 170 to the optical signal receiving unit RX 164 to be transmitted through the protection transmission line $L_0$.

Parallel to the above, an optical signal transmitted through the protection transmission line $L_0$ is converted to an electric signal in the optical signal receiving unit RX 165, and the electric signal is supplied through the connection switch 171 to the optical signal transmitting unit TX 166. The optical signal transmitting unit TX 166 converts the electric signal to an optical signal. The optical signal is transmitted through the optical coupler 200, the optical coupler 300, and the optical coupler 20i to the optical signal receiving unit RX 167 in the working piece of optical terminal equipment 10i.

The same operation as above is carried out in the optical terminal station B. Thus, transmission lines for the tributary signals TSi on the side of the optical terminal station A are connected through the working piece of optical terminal equipment 10i, the above bidirectional optical path between the working piece of optical terminal equipment 10i and the protection piece of optical terminal equipment 100, the protection piece of optical terminal equipment 100, the protection transmission line $L_0$, the protection piece of optical terminal equipment 100' on the side of the optical terminal station B, a bidirectional optical path between the protection piece of optical terminal equipment 100' and a working piece of optical terminal equipment 10i', and the working piece of optical terminal equipment 100', to tributary signals TSi'.

In the above operation, the connection switches in the switch unit 163 are controlled by a control unit (not shown) provided in each optical terminal station, for realizing the above connection of one working piece of optical terminal equipment corresponding to a working transmission line having a trouble, with the protection transmission line $L_0$.

In the first embodiment, optical signals are transmitted to only one of the uncoupled bidirectional optical ports of each of the optical couplers 300 and 300' from the optical signal transmitting unit TX 166 of only one of the working pieces of optical terminal equipment in each optical terminal station, and optical signals transmitted from the optical signal transmitting unit TX 166 of the protection piece of optical terminal equipment 100 or 100' are always output from all of the uncoupled bidirectional optical ports of the optical coupler 300 or 300' in each optical terminal station, and therefore, are always applied to the optical signal receiving units RX 167 of all of the working pieces of optical terminal equipment 101, . . . 10N or 101', . . . 10N'.

Although not shown, the optical coupler 300 may be replaced by two unidirectional optical couplers passing optical signals in different directions. In this case, the optical couplers 200, 201, 202, . . . 20N may be eliminated.

Further, the bidirectional optical signals transmitted between the protection piece of optical terminal equipment and the working pieces of optical terminal equipment may have different wavelengths. In this case, a filter circuit for extracting a required wavelength component, may be provided between the optical couplers 201, 202, . . . 20N and the optical signal receiving unit of the corresponding working piece of optical terminal equipment.

Second Embodiment (FIGS. 3, 4, 6, and 7)

As explained before, in the second embodiment, 300 and 300' each denote an optical switch. The optical couplers 200, 201, . . . 20N and 200', 201', . . . 20N' in FIG. 3, are the same in the second embodiment, and each of the optical switches 300 and 300' comprises a first-type bidirectional optical port for transmitting and receiving coupled optical signals and a plurality of second-type bidirectional optical ports each for exclusively transmitting and receiving optical signals. A selected one of the plurality of second-type bidirectional optical ports of each of the above optical switches 300 and 300' receives an optical signal, and the received optical signal passes through the optical switch to be output from the first-type bidirectional optical port of the optical switch. The first-type bidirectional optical port thereof also receives an optical signal, and the received optical signal passes through the optical switch to be output from a selected one of the plurality of second-type bidirectional optical ports of the optical switch.

The bidirectional optical port of each of the optical couplers 200 and 200' is connected through a bidirectional optical path to the first-type bidirectional optical port of the optical switch 300 or 300' in each of the optical terminal stations A and B. The bidirectional optical port of each of the optical couplers 201, . . . 20N and 200', . . . 20N' is connected to one of the plurality of second-type bidirectional optical ports of the corresponding one of the optical switches 300 and 300'. In the above selection, one of the second-type bidirectional optical ports connected to one of the working pieces of optical terminal equipment corresponding to a working transmission line having a trouble and to be connected to the protection transmission line $L_0$, is selected by a control unit (not shown).

Figure 8:
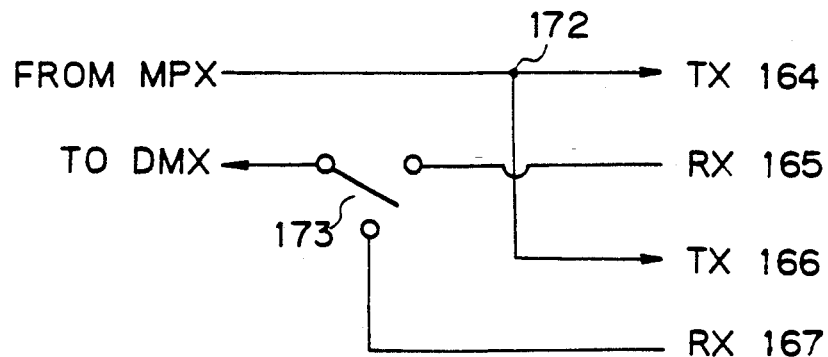
FIG. 8 shows a construction of the switch unit 163 in each working piece of optical terminal equipment 101, ... 10N and 100', 101', ... 10N' in the second embodiment of the present invention.

FIG. 8 shows a construction of the switch unit 163 in each working piece of optical terminal equipment 101, . . . 10N and 100', 101', . . . 10N' in the second embodiment of the present invention. In FIG. 8, reference numeral 172 denotes a connection point and 173 denote a connection switch. As shown in FIG. 8, the connection switch 168 connects a selected one of the output terminals of the optical signal receiving units RX 165 and 167 to the input terminal of the demultiplexer 162. The output of the demultiplexer 162 is supplied to both of the input terminals of the optical signal transmitting units TX 164 and 166.

The above output of the optical signal receiving unit RX 167 is connected to the input terminal of the demultiplexer 162 in one of the working pieces of optical terminal equipment 101, . . . 10N and 101', . . . 10N' when the working piece of optical terminal equipment is connected to the protection transmission line $L_0$. When no trouble occurs in a corresponding working transmission line Li, the output of the optical signal receiving unit RX 165 is connected to the input terminal of the demultiplexer 162.

The construction of the switch unit 163 in the protection piece of optical terminal equipment in the second embodiment is the same as the first embodiment.

In the above operation, the connection switches in the switch unit 163 and the optical switch 300 or 300' are controlled by a control unit (not shown) provided in each optical terminal station, for realizing the above connection of one working piece of optical terminal equipment corresponding to a working transmission line having a trouble, with the protection transmission line $L_0$.

The operation of the construction of the second embodiment is the same as the above-mentioned first embodiment except that the optical switches 300 and 300' are provided instead of explained below, and the construction of the switch unit 163 is as shown in FIG. 8 instead of FIG. 6. Namely, in the second embodiment, the optical signals to be transmitted from each of the working pieces of optical terminal equipment, are always output from both of the optical signal transmitting units TX 164 and 166 of each working piece of optical terminal equipment, and therefore, are always applied to a corresponding second-type bidirectional optical port of the optical switch 300 or 300', but the optical signals are output from only one of the plurality of second-type bidirectional optical ports to the optical signal receiving unit RX 167 of only one of the working piece of optical terminal equipment 101, . . . 10N or 101', . . . 10N' in each optical terminal station.

Although not shown, the optical switch 300 may be replaced by two unidirectional optical switches passing optical signals in different directions. In this case, the optical couplers 200, 201, 202, . . . 20N may be eliminated.

Similar to the first embodiment, the bidirectional optical signals transmitted between the protection piece of optical terminal equipment and the working pieces of optical terminal equipment may have different wavelengths. In this case, a filter circuit for extracting a required wavelength component, may be provided between the optical couplers 201, 202, . . . 20N and the optical signal receiving unit of the corresponding working piece of optical terminal equipment.

Figure 10:
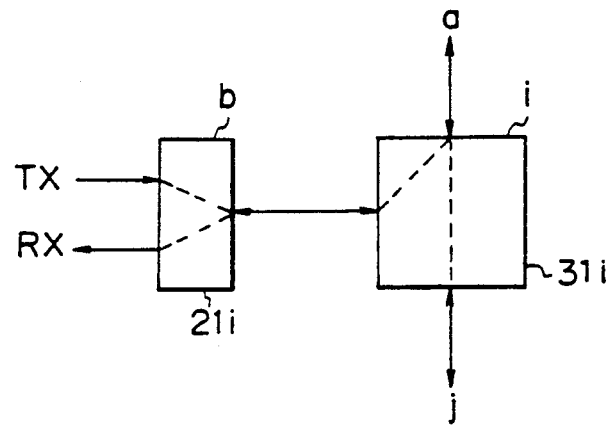
FIG. 10 is a diagram showing a connection between each optical coupler 21*i* or 21*i*' and a corresponding optical coupler 31*i* or 31*i*' in the third embodiment of the present invention.
Figure 11:
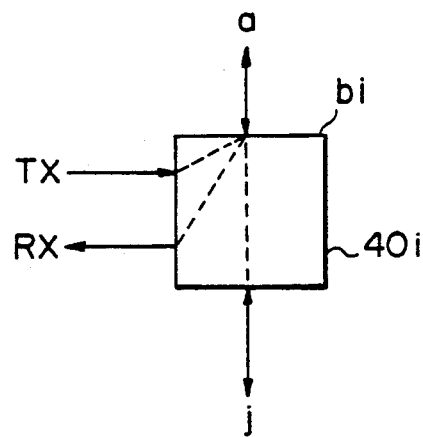
FIG. 11 is a diagram showing an alternative construction to the construction of FIG. 10.
Figures 9, 9A:
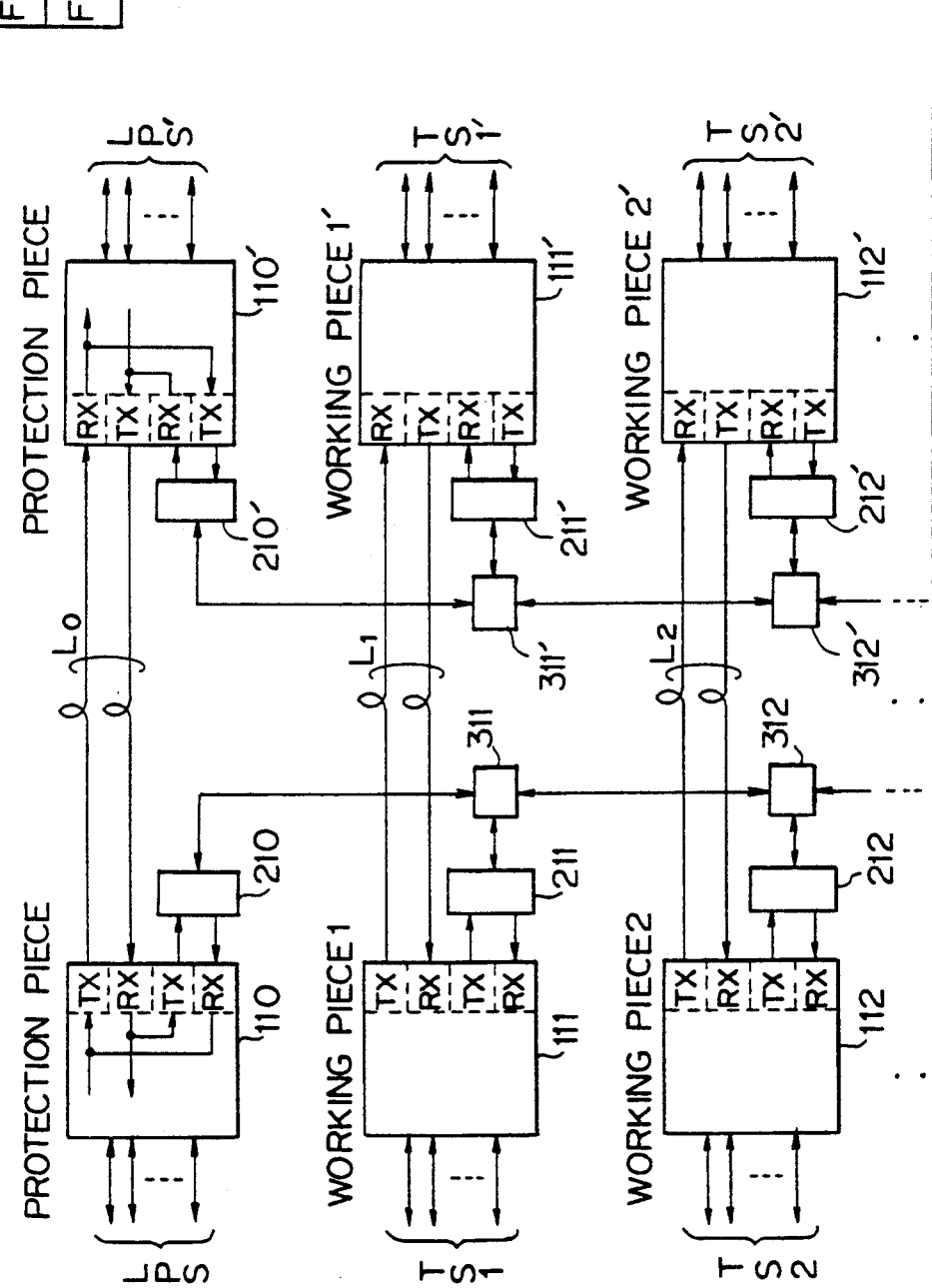
FIGS. 9, 9A, 9B is a diagram showing a construction for the third and fourth embodiments of the present invention.
Figure 9B:
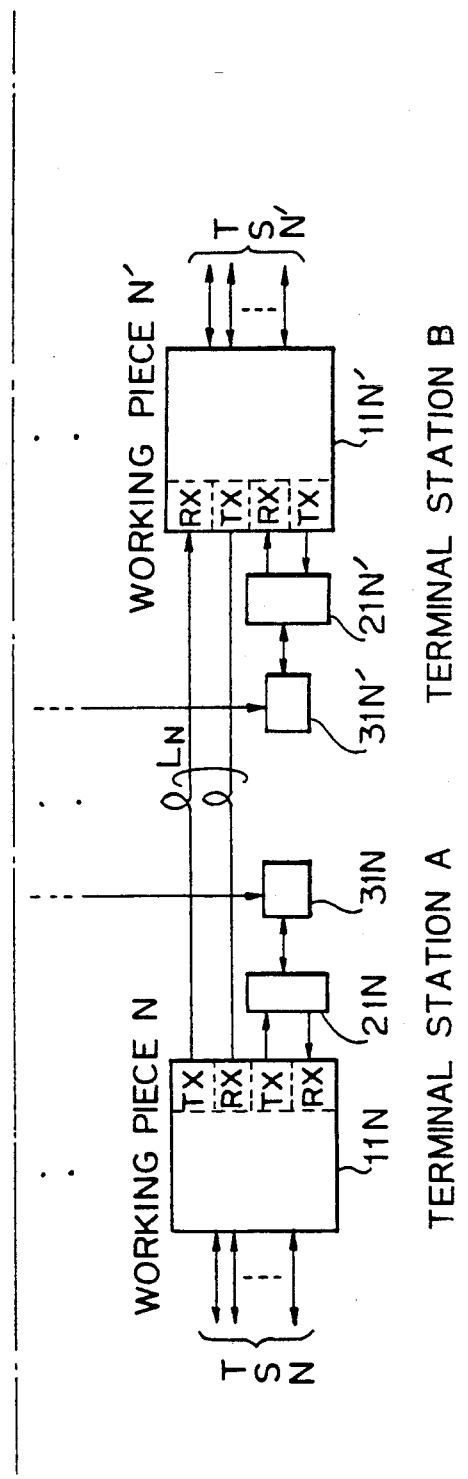

Third and Fourth Embodiments (FIGS. 9, 10, and 11)

FIG. 9 is a diagram showing a construction for the third and fourth embodiments of the present invention. In FIG. 9, reference numeral 110 denotes a protection piece of optical terminal equipment in a terminal station A, 110' denotes a protection piece of optical terminal equipment in a terminal station B, 111, 112, . . . 11N, 111', 112', . . . 10N' each denote a working piece of optical terminal equipment in the terminal station A, 210, 211, . . . 21N each denote an optical coupler in the terminal station A, and 210', 211', . . . 21N' each denote an optical coupler in the terminal station B. In the third embodiment, 311, . . . 31N and 311', . . . 31N' each denote a bidirectional optical coupler, and in the fourth embodiment, 311, . . . 31N and 311', . . . 31N' each denote a bidirectional optical switch. In each of the protection pieces of optical terminal equipment 110 and 110' and the working piece of optical terminal equipment 111, . . . 11N, and 111', . . . 11N', TX, RX, $L_0$, $L_1$, $L_2$, . . . $L_N$, TS1, TS2, . . . TSN, TS1', TS2', . . . TSN', LPS, and LPS' each denote the same element as in the constructions of FIGS. 1, 2, and 3.

Each of the protection pieces of optical terminal equipment 110 and 110' in the third and fourth embodiments has the same construction as the first and second embodiments (FIGS. 4 and 7). Each of the working pieces of optical terminal equipment 111, . . . 11N, and 111', . . . 11N' in the third embodiment has the same construction as the first embodiment (FIGS. 4 and 6), and each of the working pieces of optical terminal equipment 111, . . . 11N, and 111', . . . 11N' in the fourth embodiment has the same construction as the second embodiment (FIGS. 4 and 8).

In the construction of FIG. 9, each of the optical couplers 210, 211, . . . 21N, 210', 211', . . . 21N' has the same construction as the optical couplers 200, 201, . . . 20N, 200', 201', . . . 20N' in the construction of FIG. 4, and is connected to a corresponding one of the protection piece of optical terminal equipment 110 and 110' and the working pieces of optical terminal equipment 111, . . . 11N, and 111', . . . 11N' in the same manner as the construction of FIG. 4.

Third Embodiment (FIGS. 9 and 10)

In the third embodiment, the optical couplers 311, . . . 31N and 311', . . . 31N' are respectively provided corresponding to the optical couplers 211, . . . 21N and 211', . . . 21N'. Each of the optical couplers 311, . . . 31N and 311', . . . 31N' comprises a coupled bidirectional optical port for transmitting and receiving coupled optical signals and two uncoupled bidirectional optical ports respectively for transmitting and receiving uncoupled optical signals. One of the two uncoupled bidirectional optical ports of each of the above optical couplers 311, . . . 31N and 311', . . . 31N' receives an optical signal, and the received optical signal passes through the optical coupler to be output from the coupled bidirectional optical port of the optical coupler, as shown in FIG. 10. The coupled bidirectional optical port of the optical couplers 311, . . . 31N and 311', . . . 31N' also receives an optical signal, and the received optical signal passes through the optical coupler to be output from both of the two uncoupled bidirectional optical ports of the optical coupler, as shown in FIG. 10.

As shown in FIG. 9, the bidirectional optical port of each of the optical couplers 210 and 210' is connected through a bidirectional optical path to the coupled bidirectional optical port of the optical coupler 311 or 311' corresponding to working piece 111 of optical terminal equipment (which is located at a nearest location to the protection piece of optical terminal equipment 110 or 110') in each of the optical terminal stations A and B. The bidirectional optical port of each of the optical couplers 211, . . . 21N and 211', . . . 21N' is connected to one of the two uncoupled bidirectional optical ports of the corresponding one of the optical couplers 311, . . . 31N and 311', . . . 31N'. In each of the optical terminal stations A and B, the other bidirectional optical port of each of the optical couplers 31$i$ and 31$i'$ (i=1 to N−1) corresponding to each working piece 11$i$ or 11$i'$ of optical terminal equipment (except the optical coupler 31N or 31N' corresponding to working piece 11N of optical terminal equipment located at a furthest location from the protection piece of optical terminal equipment 110 or 110'), is connected through a bidirectional optical path to the coupled bidirectional optical port of an optical coupler 31$i$+1 or 31$i$+1' corresponding to a working piece 11$i$+1 or 11$i$+1' of optical terminal equipment located one piece further than the above each working piece 11$i$ or 11$i'$ of optical terminal equipment (i=1 to N−1).

The connection between each optical coupler 21$i$ or 21$i'$ and a corresponding optical coupler 31$i$ or 31$i'$ is shown in FIG. 10. The coupling of optical signals in the construction of FIG. 10 is realized by the construction of FIG. 11. The optical coupler 40$i$ (i=1 to N) in FIG. 11 has one coupled bidirectional optical port and three uncoupled bidirectional optical ports, where two of the three uncoupled bidirectional optical ports of the optical coupler 40$i$ (i=1 to N) connected to the optical input port and the optical output port of the corresponding working piece of optical terminal equipment, are respectively used as undirectional optical ports.

The operation of the construction of the third embodiment is explained below. Although the explanation is made for the construction of the optical terminal station A, the same operation is carried out in the optical terminal station B.

When a trouble occurs in one of the working transmission lines $L_i$, tributary signals TSi (i=1 to N) multiplexed in the multiplexer 162 in one of the working piece of optical terminal equipment 11$i$ connected to the working transmission line $L_i$, are supplied through the connection switch 168 to the optical signal transmitting unit TX 166. The multiplexed signal is converted to an optical signal in the optical signal transmitting unit 166, and then the optical signal is transmitted through the optical coupler 21$i$, the optical coupler 31$i$, the optical coupler 31$i$−1, . . . the optical coupler 311, and the optical coupler 210, to the optical signal receiving unit RX 167 in the protection piece of optical terminal equipment 110. The optical signal is converted to an electric signal in the optical signal receiving unit RX 167, and the electric signal is supplied through the switch unit 170 to the optical signal receiving unit RX 164 to be transmitted through the protection transmission line $L_0$ to the other optical terminal station.

Parallel to the above, an optical signal transmitted through the protection transmission line $L_0$ is converted to an electric signal in the optical signal receiving unit RX 165, and the electric signal is supplied through the connection switch 171 to the optical signal transmitting unit TX 166. The optical signal transmiting unit TX 166 converts the electric signal to an optical signal. The optical signal is transmitted through the optical coupler 210, the optical coupler 311, . . . the optical coupler 31$i$−1, the optical coupler 31$i$, and the optical coupler 20$i$ to the optical signal receiving unit RX 167 in the working piece of optical terminal equipment 11$i$.

The same operation as above is carried out in the optical terminal station B. Thus, transmission lines for the tributary signals TSi on the side of the optical terminal station A are connected through the working piece of optical terminal equipment 11$i$, the above bidirectional optical path between the working piece of optical terminal equipment 11$i$ and the protection piece of optical terminal equipment 110, the protection transmission line $L_0$, the protection piece of optical terminal equipment 110' on the side of the optical terminal station B, a bidirectional optical path between the protection piece of optical terminal equipment 110' and a working piece of optical terminal equipment 10$i'$, and the working piece of optical terminal equipment 110', to tributary signals TSi'.

In the above operation, the connection switches in the switch unit 163 are controlled by a control unit (not shown) provided in each optical terminal station, for realizing the above connection of one working piece of optical terminal equipment corresponding to a working transmission line having a trouble, with the protection transmission line L₀.

In the third embodiment, optical signals are transmitted to the protection piece of optical terminal equipment 110 or 110' from the optical signal transmitting unit TX 166 of only one of the working pieces of optical terminal equipment, and optical signals transmitted from the optical signal transmitting unit TX 166 of the protection piece of optical terminal equipment 110 or 110' always pass through all of the optical couplers 311, . . . 31N and 311', . . . 31N' in each optical terminal station, and therefore, are always applied to the optical signal receiving units RX 167 of all of the working pieces of optical terminal equipment 111, . . . 11N or 111', . . . 11N' in each opticl terminal station.

Fourth Embodiment (FIGS. 9 and 10)

In the fourth embodiment, the optical switches 311, . . . 31N and 311', . . . 31N' are respectively provided corresponding to the optical couplers 211, . . . 21N and 211', . . . 21N'. Each of the optical switches 311, . . . 31N and 311', . . . 31N' comprises a first-type bidirectional optical port for transmitting and receiving optical signals and two second-type bidirectional optical ports each for exclusively transmitting and receiving second-type optical signals. A selected one of the two second-type bidirectional optical ports of each of the above optical couplers 311, . . . 31N and 311', . . . 31N' receives an optical signal, and the received optical signal passes through the optical coupler to be output from the first-type bidirectional optical port of the optical coupler. The first-type bidirectional optical port of the optical couplers 311, . . . 31N and 311', . . . 31N' also receives an optical signal, and the received optical signal passes through the optical coupler to be output from a selected one of the two second-type bidirectional optical ports of the optical coupler.

As shown in FIG. 9, the bidirectional optical port of each of the optical couplers 210 and 210' is connected through a bidirectional optical path to the first-type bidirectional optical port of the optical switch 311 or 311' corresponding to working piece 111 of optical terminal equipment (which is located at a nearest location to the protection piece of optical terminal equipment 110 or 110') in each of the optical terminal stations A and B. The bidirectional optical port of each of the optical couplers 211, . . . 21N and 211', . . . 21N' is connected to one of the two second-type bidirectional optical ports of the corresponding one of the optical switches 311, . . . 31N and 311', . . . 31N'. In each of the optical terminal stations A and B, the other bidirectional optical port of each of the optical switches 31$i$ and 31$i'$(i=1 to N−1) corresponding to each working piece 11$i$ or 11$i'$ of optical terminal equipment (except the optical switch 31N or 31N' corresponding to working piece 11N of optical terminal equipment located at a furthest location from the protection piece of optical terminal equipment 110 or 110'), is connected through a bidirectional optical path to the first-type bidirectional optical port of an optical coupler 31$i$+1 or 31$i$+1' corresponding to a working piece 11$i$+1 or 11$i$+1' of optical terminal equipment which is located one piece further than the above each working piece 11$i$ or 11$i'$ of optical terminal equipment (i=1 to N−1).

The operation of the construction of the fourth embodiment is explained below. Although the explanation pertains to the construction of the optical terminal station A, the same operation is carried out in the optical terminal station B.

When a trouble occurs in one of the working transmission lines Li, tributary signals TSi (i=1 to N) which are multiplexed in the multiplexer 162 in one of the working piece of optical terminal equipment 11$i$ connected to the working transmission line Li, is supplied through the connection switch 168 to the optical signal transmitting unit TX 166. The multiplexed signal is converted to an optical signal in the optical signal transmitting unit 166, and then the optical signal is transmitted through the optical coupler 21$i$, the optical switch 31$i$, the optical switch 31$i$−1, . . . the optical switch 311, and the optical coupler 210, to the optical signal receiving unit RX 167 in the protection piece of optical terminal equipment 110. The optical signal is converted to an electric signal in the optical signal receiving unit RX 167, and the electric signal is supplied through the switch unit 170 to the optical signal receiving unit RX 164 to be transmitted through the protection transmission line Lo' to the other optical terminal station.

Parallel to the above, an optical signal transmitted through the protection transmission line Lo is converted to an electric signal in the optical signal receiving unit RX 165, and the electric signal is supplied through the connection switch 171 to the optical signal transmitting unit TX 166. The optical signal transmitting unit TX 166 converts the electric signal to an optical signal. The optical signal is transmitted through the optical coupler 210, the optical switch 311, . . . the optical switch 31$i$−1, the optical switch 31$i$, and the optical coupler 21$i$ to the optical signal receiving unit RX 167 in the working piece of optical terminal equipment 11$i$.

The same operation as above is carried out in the optical terminal station B. Thus, transmission lines for the tributary signals TSi on the side of the optical terminal station A are connected through the working piece of optical terminal equipment 11$i$, the above bidirectional optical path between the working piece of optical terminal equipment 11$i$ and the protection piece of optical terminal equipment 110, the protection piece of optical terminal equipment 110, the protection transmission line L₀, the protection piece of optical terminal equipment 110' on the side of the optical terminal station B, a bidirectional optical path between the protection piece of optical terminal equipment 100' and a working piece of optical terminal equipment 11$i'$, and the working piece of optical terminal equipment 110', to tributary signals TSi'.

In the above operation, the connection switches in the switch unit 163 and the optical switches 311, . . . 31N and 311', . . . 31N' are controlled by a control unit (not shown) provided in each optical terminal station, for realizing the above connection of one working piece of optical terminal equipment corresponding to a working transmission line having a trouble, with the protection transmission line L₀.

The operation of the construction of the fourth embodiment is the same as the above-mentioned third embodiment except that the optical switches 300 and 300' are provided instead of explained below, and the construction of switch unit 163 is as shown in FIG. 8 instead of FIG. 6. Namely, in the second embodiment, the optical signals which are to be transmitted from each of the working pieces of optical terminal equipment, are always output from both of the optical signal transmitting units TX 164 and 166, and therefore, are always applied to the second-type bidirectional optical port of the corresponding optical switch 31*i* or 31*i*' in each optical terminal station, and the optical signals output fromthe protection piece of optical terminal equipment 110 or 110' reach the optical signal receiving unit RX 167 of only one of the working pieces of optical terminal equipment 111, ... 11N or 111', ... 11N' in each optical terminal station.

Figure 12A:
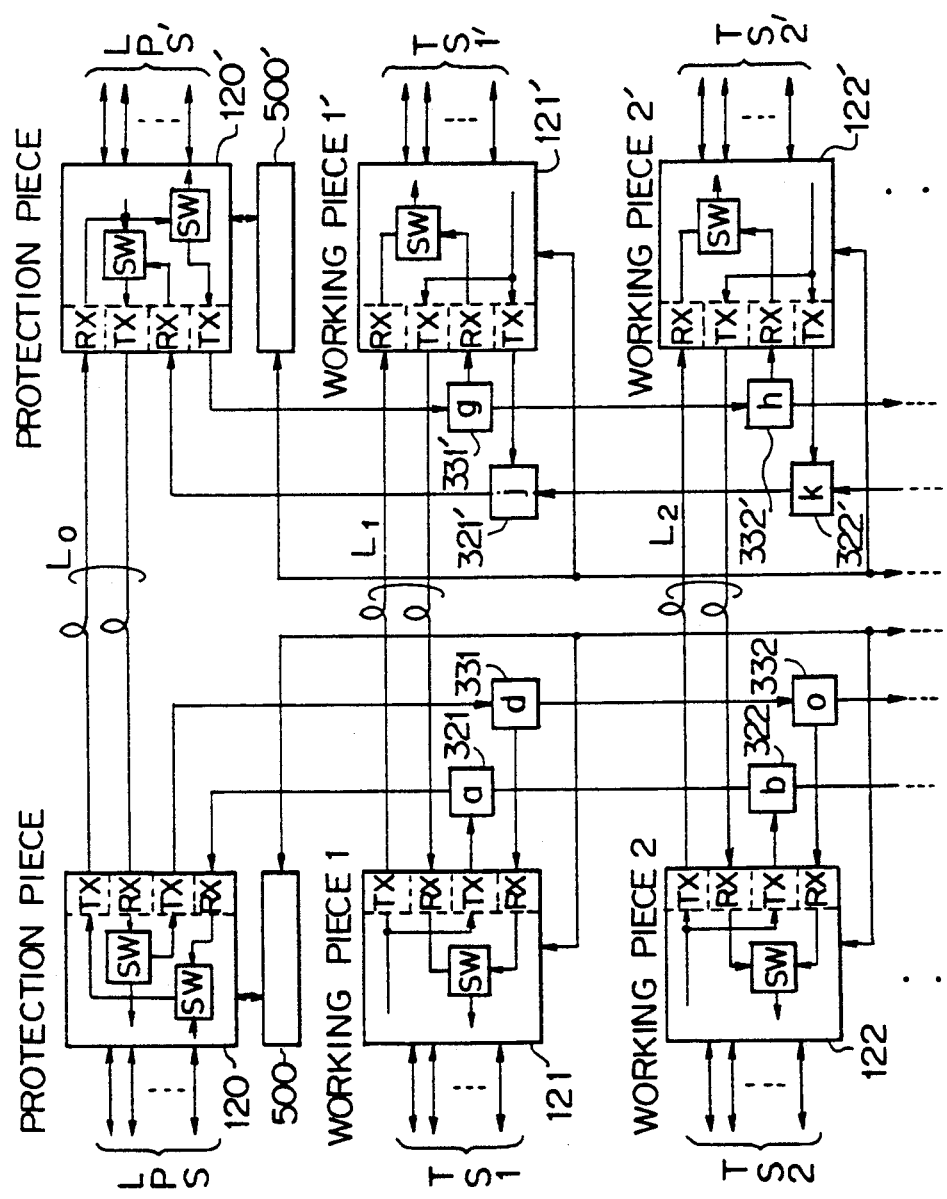
Figure 12B:
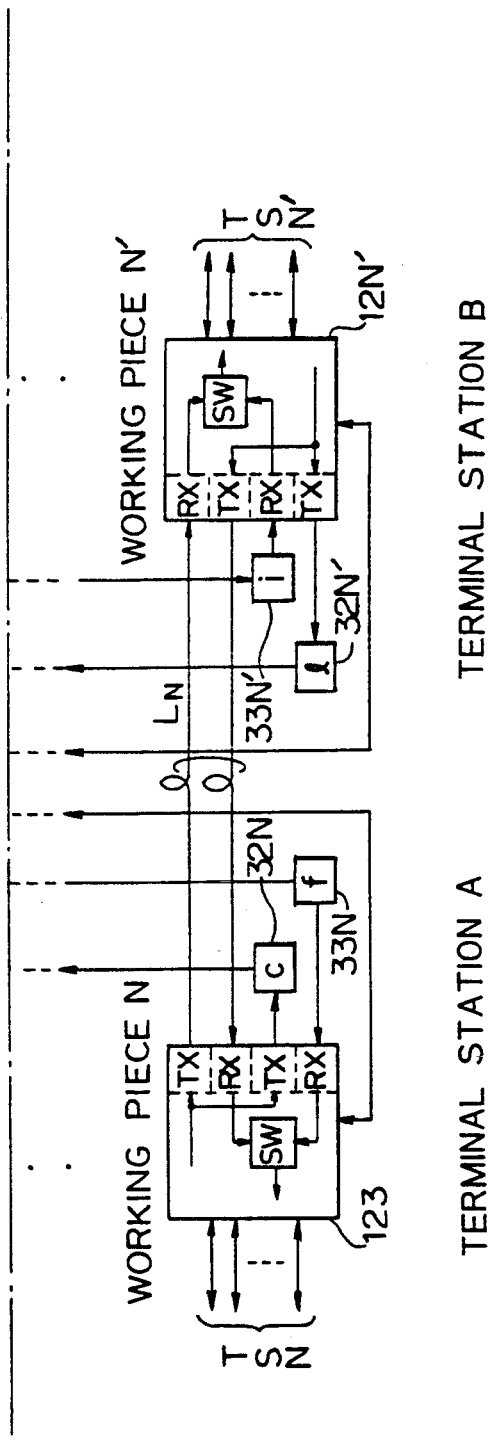

Fifth, Sixth, and Seventh Embodiments (FIG. 12)

FIG. 12 is a diagram showing a construction for the fifth, sixth, and seventh embodiments of the present invention. In FIG. 12, reference numeral 500 denotes a control unit, 120 denotes a protection piece of optical terminal equipment in a terminal station A, 120' denotes a protection piece of optical terminal equipment in a terminal station B, 121, 122, ... 12N, 121', 122', ... 12N' each denote a working piece of optical terminal equipment in the terminal station A. Reference numeral 321, ... 32N and 321', ... 32N' each denote an unidirectional optical switch in the fifth embodiment, and denote an optical switch in the sixth and seventh embodiments. Reference numeral 331, ... 33N and 331', ... 33N' each denote an optical switch in the fifth and seventh embodiment. In each of the protection pieces of optical terminal equipment 120 and 120' and the working piece of optical terminal equipment 121, ... 12N, and 121', ... 12N', TX, RX, $L_0, L_1, L_2, ... L_N$, TS1, TS2, ... TSN, TS1', TS2', ... TSN', LPS, and LPS' each denote the same element as in the constructions of FIGS. 1, 2, 3, and 9.

Each of the protection pieces of optical terminal equipment 120 and 120' in the third and fourth embodiments has the same construction as the first, second, third, fourth embodiments (FIGS. 4, 7, and 9). Each of the working pieces of optical terminal equipment 121, ... 12N, and 121', ... 12N' in the fifth embodiment has the same construction as the first and third embodiments (FIGS. 4 and 6), and each of the working pieces of optical terminal equipment 121, ... 12N, and 121', ... 12N' in the sixth and seventh embodiments has the same construction as the second and fourth embodiments (FIGS. 4, 8, and 9).

Fifth Embodiment (FIG. 12)

In the fifth embodiment, in the construction of FIG. 12, the unidirectional optical couplers 321, ... 32N and 321', ... 32N' are respectively provided corresponding to the working pieces of optical terminal equipment 121, ... 12N, and 121', ... 12N'. Each of the optical couplers 321, ... 32N and 321', ... 32N' comprises a coupled unidirectional optical port for transmitting coupled optical signals and two uncoupled unidirectional optical ports respectively for receiving uncoupled optical signals. One of the two uncoupled unidirectional optical ports of each of the above optical couplers 321, ... 32N and 321', ... 32N' receives an optical signal, and the received optical signal passes through the optical coupler to be output from the coupled unidirectional optical port of the optical coupler. The unidirectional optical couplers 331, ... 33N and 331', ... 33N' are respectively provided corresponding to the working pieces of optical terminal equipment 121, ... 12N, and 121', ... 12N'. Each of the optical couplers 331, ... 33N and 331', ... 33N' comprises a coupled unidirectional optical port for receiving coupled optical signals and two uncoupled unidirectional optical ports respectively for transmitting uncoupled optical signals. The coupled unidirectional optical ports of each of the above optical couplers 331, ... 33N and 331', ... 33N' receives an optical signal, and the received optical signal passes through the optical coupler to be output from both of the uncoupled unidirectional optical ports of the optical coupler.

As shown in FIGS. 12 and 4, the optical input port of the optical signal receiving unit 167 of the protection piece of optical terminal equipment 120 or 120' is connected through an unidirectional optical path to the coupled unidirectional optical port of the optical coupler 321 or 321' corresponding to working piece 121 of optical terminal equipment (which is located at a nearest location to the protection piece of optical terminal equipment 120 or 120'), and the optical output port of the optical signal transmitting unit 166 of the protection piece of optical terminal equipment 120 or 120' is connected through an unidirectional optical path to the coupled unidirectional optical port of the optical coupler 331 or 331' corresponding to working piece 121 of optical terminal equipment, in each of the optical terminal stations A and B. The optical output port of the optical signal transmitting unit 166 of each working piece of optical terminal equipment 121, ... 12N, and 121', ... 12N' is connected to one of the two uncoupled unidirectional optical ports of the corresponding one of the optical couplers 321, ... 32N and 321', ... 32N', and the optical input port of the optical signal receiving unit 167 of each working piece of optical terminal equipment 121, ... 12N, and 121', ... 12N' is connected to one of the two uncoupled unidirectional optical ports of the corresponding one of the optical couplers 331, ... 33N and 331', ... 33N'.

In each of the optical terminal stations A and B, the other unidirectional optical port of each of the optical couplers 32*i* and 32*i*' (i=1 to N−1) corresponding to each working piece 12*i* or 12*i*' of optical terminal equipment (except the optical coupler 32N or 32N' corresponding to working piece 12N or 12N' of optical terminal equipment which is located at a furthest location from the protection piece of optical terminal equipment 120 or 120'), is connected through a unidirectional optical path to the coupled unidirectional optical port of an optical coupler 32*i*+1 or 32*i*+1' corresponding to a working piece 12*i*+1 or 12*i*+1' of optical terminal equipment which is located one piece further than the above each working piece 12*i* or 12*i*' of optical terminal equipment (i=1 to N−1). In addition, in each of the optical terminal stations A and B, the other unidirectional optical port of each of the optical couplers 33*i* and 33*i*' (i=1 to N−1) corresponding to each working piece 12*i* or 12*i*' of optical terminal equipment (except the optical coupler 33N or 33N' corresponding to working piece 12N or 12N' of optical terminal equipment which is located at a furthest location from the protection piece of optical terminal equipment 120 or 120'), is connected through a unidirectional optical path to the coupled unidirectional optical port of an optical coupler 33*i*+1 or 33*i*+1' corresponding to a working piece 12*i*+1 or 12*i*+1' of optical terminal equipment which is located one piece further than the above each working piece 12*i* or 12*i*' of optical terminal equipment (i=1 to N−1).

The operation of the construction of the fifth embodiment is explained below. Although the explanation pertains to the construction of the optical terminal station A, the same operation is carried out in the optical terminal station B.

When a trouble occurs in one of the working transmission lines $L_i$, tributary signals TS*i* (i=1 to N) which are multiplexed in the multiplexer 162 in one of the working piece of optical terminal equipment 12i connected to the working transmission line $L_i$, is supplied through the connection switch 168 to the optical signal transmitting unit TX 166. The multiplexed signal is converted to an optical signal in the optical signal transmitting unit 166, and then the optical signal is transmitted through the optical coupler 32i, the optical coupler 32i−1, . . . the optical coupler 321 to the optical signal receiving unit RX 167 in the protection piece of optical terminal equipment 120. The optical signal is converted to an electric signal in the optical signal receiving unit RX 167, and the electric signal is supplied through the switch unit 170 to the optical signal receiving unit RX 164 to be transmitted through the protection transmission line $L_0$ to the other optical terminal station.

Parallel to the above, an optical signal transmitted through the protection transmission line $L_0$ is converted to an electric signal in the optical signal receiving unit RX 165, and the electric signal is supplied through the connection switch 171 to the optical signal transmitting unit TX 166. The optical signal transmitting unit TX 166 converts the electric signal to an optical signal. The optical signal is transmitted through the optical coupler 331, . . . the optical coupler 33i−1, the optical coupler 33i to the optical signal receiving unit RX 167 in the working piece of optical terminal equipment 12i.

The same operation as above is carried out in the optical terminal station B. Thus, transmission lines for the tributary signals TSi on the side of the optical terminal station A are connected through the working piece of optical terminal equipment 12i, the above unidirectional optical path between the working piece of optical terminal equipment 12i and the protection piece of optical terminal equipment 120, the protection piece of optical terminal equipment 120, the protection transmission line $L_0$, the protection piece of optical terminal equipment 120' on the side of the optical terminal station B, a unidirectional optical path between the protection piece of optical terminal equipment 120' and a working piece of optical terminal equipment 12i', and the working piece of optical terminal equipment 120', to tributary signals TSi'.

In the above operation, the connection switches in the switch unit 163 are controlled by the control unit 500 or 500' provided in each optical terminal station for realizing the above connection of one working piece of optical terminal equipment corresponding to a working transmission line having a trouble, to the protection transmission line $L_0$.

In the fifth embodiment, optical signals are transmitted to the protection piece of optical terminal equipment 110 or 110' from the optical signal transmitting unit TX 166 of only one of the working pieces of optical terminal equipment in each optical terminal station, and optical signals transmitted from the optical signal transmitting unit TX 166 of the protection piece of optical terminal equipment 110 or 110' always pass through all of the optical couplers 331, . . . 33N and 331', . . . 33N' in each optical terminal station, and therefore, are always applied to the optical signal receiving units RX 167 of all of the working pieces of optical terminal equipment 121, . . . 12N or 121', . . . 12N' in each optical terminal station.

Sixth Embodiment (FIG. 12)

As explained above, in the sixth embodiment, in the construction of FIG. 12, the reference numerals 321, . . . 32N and 321', . . . 32N' each denote an unidirectional optical switch, and the optical switches 321, . . . 32N and 321', . . . 32N' are respectively provided corresponding to the working pieces of optical terminal equipment 121, . . . 12N, and 121', . . . 12N'. Each of the optical switches 321, . . . 32N and 321', . . . 32N' comprises a first-type unidirectional optical port for transmitting optical signals and two second-type unidirectional optical ports each for exclusively receiving optical signals. A selected one of the two second-type unidirectional optical ports of each of the above optical switches 321, . . . 32N and 321', . . . 32N' receives an optical signal, and the received optical signal passes through the optical switch to be output from the first-type unidirectional optical port of the optical switch. The unidirectional optical switches 331, . . . 33N and 331', . . . 32N' are respectively provided corresponding to the working pieces of optical terminal equipment 121, . . . 12N, and 121', . . . 12N'. Each of the optical switches 331, . . . 33N and 331', . . . 33N' comprises a first-type unidirectional optical port for receiving optical signals and two second-type unidirectional optical ports each for exclusively transmitting optical signals. The first-type unidirectional optical ports of each of the above optical switches 331, . . . 33N and 331', . . . 33N' receives an optical signal, and the received optical signal passes through the optical switch to be output from a selected one of the second-type unidirectional optical ports of the optical switch.

As shown in FIGS. 12 and 4, the optical input port of the optical signal receiving unit 167 of the protection piece of optical terminal equipment 120 or 120' is connected through an unidirectional optical path to the first-type unidirectional optical port of the optical switch 321 or 321' corresponding to working piece 121 of optical terminal equipment (which is located at a nearest location to the protection piece of optical terminal equipment 120 or 120'), and the optical output port of the optical signal transmitting unit 166 of the protection piece of optical terminal equipment 120 or 120' is connected through an unidirectional optical path to the first-type unidirectional optical port of the optical switch 331 or 331' corresponding to working piece 121 of optical terminal equipment, in each of the optical terminal stations A and B. The optical output port of the optical signal transmitting unit 166 of each working piece of optical terminal equipment 121, . . . 12N, and 121', . . . 12N' is connected to one of the two second-type unidirectional optical ports of the corresponding one of the optical switches 321, . . . 32N and 321', . . . 32N', and the optical input port of the optical signal receiving unit 167 of each working piece of optical terminal equipment 121, . . . 12N, and 121', . . . 12N' is connected to one of the two second-type unidirectional optical ports of the corresponding one of the optical switches 331, . . . 33N and 331', . . . 33N'.

In each of the optical terminal stations A and B, the other unidirectional optical port of each of the optical switches 32i and 32i' (i=1 to N−1) corresponding to each working piece 12i or 12i' of optical terminal equipment (except the optical switch 32N or 32N' corresponding to working piece 12N or 12N' of optical terminal equipment located at a location furthest from the protection piece of optical terminal equipment 120 or 120'), is connected through a unidirectional optical path to the first-type unidirectional optical port of an optical switch 32i+1 or 32i+1' corresponding to a working piece 12i+1 or 12i+1' of optical terminal equipment located one piece further than the above each working piece 12i or 12i' of optical terminal equipment (i=1 to N−1). In addition, in each of the optical terminal stations A and B, the other unidirectional optical port of each of the optical switches 33*i* and 33*i*' (i=1 to N−1) corresponding to each working piece 12*i* or 12*i*' of optical terminal equipment (except the optical switch 33N or 33N' corresponding to working piece 12N of optical terminal equipment located at a location furthest from the protection piece of optical terminal equipment 120 or 120'), is connected through a unidirectional optical path to the first-type unidirectional optical port of an optical switch 33*i*+1 or or 33*i*+1' corresponding to a working piece 12*i*+1 or 12*i*+1' of optical terminal equipment located one piece further than the above each working piece 12*i* or 12*i*' of optical terminal equipment (i=1 to N−1).

The operation of the construction of the sixth embodiment is explained below. Although the explanation is made for the construction of the optical terminal station A, the same operation is carried out in the optical terminal station B.

When a trouble occurs in one of the working transmission lines Li, tributary signals TSi (i=1 to N) multiplexed in the multiplexer 162 in one of the working pieces of optical terminal equipment 12*i* connected to the working transmission line Li, is supplied through the connection switch 168 to the optical signal transmitting unit TX 166. The multiplexed signal is converted to an optical signal in the optical signal transmitting unit 166, and then the optical signal is transmitted through the optical switch 32*i*, the optical switch 32*i*−1, ... the optical switch 321 to the optical signal receiving unit RX 167 in the protection piece of optical terminal equipment 120. The optical signal is converted to an electric signal in the optical signal receiving unit RX 167, and the electric signal is supplied through the switch unit 170 to the optical signal receiving unit RX 164 to be transmitted through the protection transmission line $L_0$ to the other optical terminal station.

Parallel to the above, an optical signal transmitted through the protection transmission line $L_0$ is converted to an electric signal in the optical signal receiving unit RX 165, and the electric signal is supplied through the connection switch 171 to the optical signal transmitting unit TX 166. The optical signal transmitting unit TX 166 converts the electric signal to an optical signal. The optical signal is transmitted through the optical switch 331, ... the optical switch 33*i*−1, the optical switch 33*i* to the optical signal receiving unit RX 167 in the working piece of optical terminal equipment 12*i*.

The same operation as above is carried out in the optical terminal station B. Thus, transmission lines for the tributary signals TSi on the side of the optical terminal station A are connected through the working piece of optical terminal equipment 12*i*, the above two unidirectional optical paths between the working piece of optical terminal equipment 12*i* and the protection piece of optical terminal equipment 120, the protection piece of optical terminal equipment 120, the protection transmission line $L_0$, the protection piece of optical terminal equipment 120' on the side of the optical terminal station B, two unidirectional optical paths between the protection piece of optical terminal equipment 120' and a working piece of optical terminal equipment 12*i*', and the working piece of optical terminal equipment 120', to tributary signals TSi'.

In the above operation, the connection switches in the switch unit 163 and the optical switches 321, ... 32N and 321', ... 32N', and 331', ... 33N and 331', ... 33N' are controlled by the control unit 500 or 500' provided in each optical terminal station, for realizing the above connection of one working piece of optical terminal equipment corresponding to a working transmission line having a trouble, with the protection transmission line $L_0$.

In the sixth embodiment, optical signals are transmitted to the protection piece of optical terminal equipment 110 or 110' from the optical signal transmitting unit TX 166 of only one of the working pieces of optical terminal equipment in each optical terminal station, and optical signals transmitted from the optical signal transmitting unit TX 166 of the protection piece of optical terminal equipment 110 or 110' reach the optical signal receiving unit RX 167 of only one of the working pieces of optical terminal equipment 121, ... 12N, and 121', ... 12N', ... 12N' in each optical terminal station.

Seventh Embodiment (FIG. 12)

As explained above, in the first, third, and fifth embodiments, only one of the optical signal transmitting units TX 164 and 166 in each working piece of optical terminal equipment is in operation (in an ON state). In particular, the optical signal transmitting unit TX 166 in each working piece of optical terminal equipment is in an OFF state in a normal condition in the first, third, and fifth embodiments, and begins to operate when the working piece of optical terminal equipment is switched to the protection transmission line. However, generally, the optical signal transmitting unit contains an automatic power control (APC) circuit for maintaining a power of the output of the optical signal transmitting unit constant, and it takes a considerable time (rising time) for the automatic power control circuit to shift its state from the OFF state to a stable ON state. Therefore, some data may be lost during the rising time when a working piece of optical terminal equipment is switched from a normal working transmission line Li to the protection transmission line $L_0$.

In addition, in the second, fourth, and sixth embodiments, only one of the optical signal receiving units RX 165 and 167 in each working piece of optical terminal equipment is in operation (in an ON state). In particular, the optical signal receiving unit RX 167 in each working piece of optical terminal equipment is in an OFF state in a normal condition in the second, fourth, and sixth embodiments, and begins to operate when the working piece of optical terminal equipment is switched to the protection transmission line. However, generally, the optical signal receiving unit contains an automatic gain control (AGC) circuit for maintaining a power of the output of the optical signal receiving unit constant, and it takes a considerable time (rising time) for the automatic gain control circuit to shift its state from the OFF state to a stable ON state. Therefore, some data may be lost during the rising time when a working piece of optical terminal equipment is switched from a normal working transmission line Li to the protection transmission line $L_0$.

To solve the above problems, the seventh embodiment of the present invention is provided. In the seventh embodiment, in the construction of FIG. 12, optical switches 321, ... 32N and 321', ... 32N' are respectively provided corresponding to the working pieces of optical terminal equipment 121, ... 12N, and 121', ... 12N'. Each of the optical switches 321, ... 32N and 321', ... 32N' has the same construction as the corresponding element in the construction of the sixth embodiment, and is connected to the protection piece of optical terminal equipment, the corresponding working piece of optical terminal equipment, and the other optical switches 321, . . . 32N and 321', . . . 32N' in the same manner as in the construction of the sixth embodiment. In addition, in the seventh embodiment, in the construction of FIG. 12, unidirectional optical couplers 331, . . . 33N and 331', . . . 33N' are respectively provided corresponding to the working pieces of optical terminal equipment 121, . . . 12N, and 121', . . . 12N'. Each of the optical couplers 331, . . . 33N and 331', . . . 33N' has the same construction as the corresponding element in the construction of the sixth embodiment, and is connected to the protection piece of optical terminal equipment, the corresponding working piece of optical terminal equipment, and the other optical switches 331, . . . 33N and 331', . . . 33N' in the same manner as in the construction of the fifth embodiment.

Thus, optical signals are transmitted from a working piece of optical terminal equipment to be connected to the protection transmission line, to the protection piece of optical terminal equipment in the same manner as the sixth embodiment, and optical signals are transmitted from the protection piece of optical terminal equipment to the working piece of optical terminal equipment to be connected to the protection transmission line, in the same manner as the fifth embodiment.

In the above construction of the seventh embodiment, the optical signal transmitting unit TX 166 and the optical signal receiving unit RX 167 in each working piece of optical terminal equipment are constantly in the ON state, and therefore, the above problems in the first to sixth embodiments are solved in the seventh embodiment.

The above technique in the seventh embodiment can be applied to the construction of FIG. 3 for solving the above-mentioned problem therein. Namely, in the construction of FIG. 3, the bidirectional optical coupler or optical switch 300 may be replaced by an unidirectional optical switch for transmitting an optical signal in a direction from the working pieces of optical terminal equipment to the protection piece of optical terminal equipment, and an unidirectional optical coupler for transmitting an optical signal in the other direction from the protection piece of optical terminal equipment to the working pieces of optical terminal equipment.

Although, generally, the same problem may occur in the optical signal transmitting unit TX 164 and the optical signal receiving unit RX 165, this problem is solved by transmitting tributary signals LPS having low priorities through the protection transmission line $L_0$ in the normal state.

Figure 13:
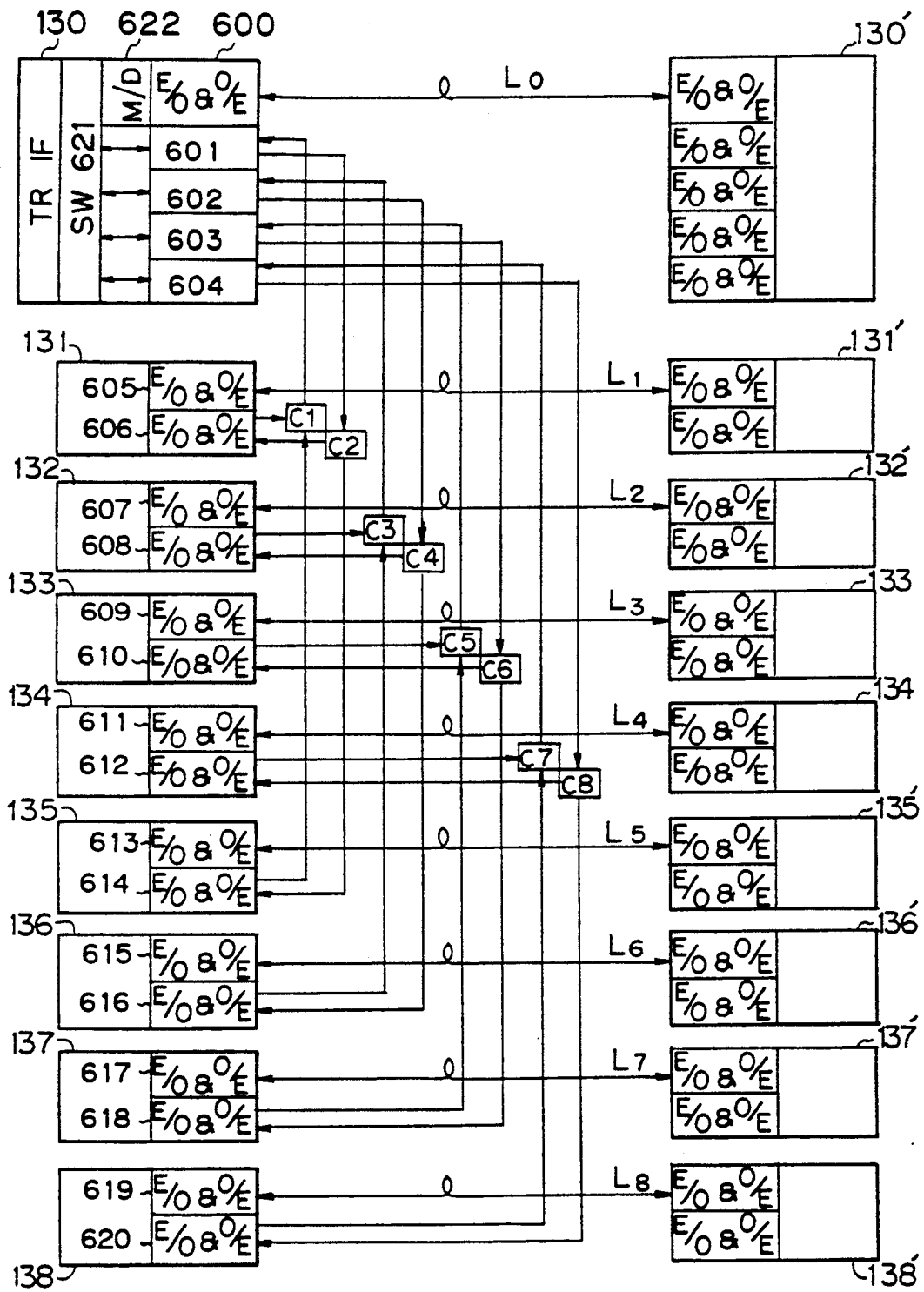
FIG. 13 is a diagram showing a construction for the eighth embodiments of the present invention.

Eighth Embodiment (FIG. 13)

FIG. 13 is a diagram showing a construction for the eighth embodiments of the present invention. In FIG. 13, reference numeral 130 and 130' each denote a protection piece of optical terminal equipment, 131, . . . 138, and 131', . . . 138' each denote a working piece of optical terminal equipment, $L_0$ denotes a protection transmission line, $L_1$, $L_2$, . . . $L_0$ each denote a working transmission line, C1, C2, . . . C8 each denote an unidirectional optical coupler or optical switch, 600 to 620 each denote a pair of the above-mentioned optical signal transmitting unit and optical signal receiving unit, which are also denoted by "E/O and O/E" in FIG. 13, 621 denotes a switch unit, and 622 denotes a multiplexer/demultiplexer. Although only paths of optical signals between the protection piece of optical terminal equipment 130 and the working pieces of optical terminal equipment 131, . . . 138 in the optical terminal station A are shown, and paths of optical signals between the protection piece of optical terminal equipment 130' and the working pieces of optical terminal equipment 131', . . . 138' in the optical terminal station B are not shown in FIG. 13, the same construction as in the optical terminal station A is provided in the optical terminal station B.

In the eighth embodiment, the transmission rate of the protection transmission line $L_0$ is four times the transmission rate of each of the working transmission lines $L_1$, $L_2$, . . . $L_8$. The protection piece 130 or 130' of optical terminal equipment in each optical terminal station comprises a plurality (four) of pairs of optical signal transmitting units and optical signal receiving units 601 to 604 other than the pair of optical signal transmitting unit and optical signal receiving unit 600 which are connected to the protection transmission line $L_0$, where the plurality of pairs of optical signal transmitting units and optical signal receiving units 601 to 604 are respectively correspond to, and connected to two of the working transmission lines $L_1$, $L_2$, . . . $L_8$. The transmission of optical signals between the pair of the optical signal transmitting unit and the optical signal receiving unit 601 of the protection piece of optical terminal equipment 130, and the pair of units 606 of the working piece of optical terminal equipment 131 or the pair of units 614 of the working piece of optical terminal equipment 135, through the unidirectional optical couplers or optical switches C1 and C2, is carried out in the same manner as in one of the fifth to seventh embodiments. Similarly, the transmissions of optical signals are carried out: between the pair of the optical signal transmitting unit and the optical signal receiving units 602 of the protection piece of optical terminal equipment 130, and the pair of units 608 of the working piece of optical terminal equipment 132 or the pair of units 616 of the working piece of optical terminal equipment 136, through the unidirectional optical couplers or optical switches C3 and C4; between the pair of the optical signal transmitting unit and the optical signal receiving units 603 of the protection piece of optical terminal equipment 130, and the pair of units 610 of the working piece of optical terminal equipment 133 or the pair of units 616 of the working piece of optical terminal equipment 137, through the unidirectional optical couplers or optical switches C5 and C6; and between the pair of the optical signal transmitting unit and the optical signal receiving units 604 of the protection piece of optical terminal equipment 130, and the pair of units 612 of the working piece of optical terminal equipment 134 or the pair of units 618 of the working piece of optical terminal equipment 138, through the unidirectional optical couplers or optical switches C7 and C8.

When the above working pieces of optical terminal equipment are to be connected to the protection transmission line $L_0$, the optical signals transmitted from the working pieces of optical terminal equipment are respectively converted to electric signals in the optical signal receiving units in the corresponding pairs of units 601 to 604 in the protection piece of optical terminal equipment 130, and then, the electric signals are supplied to the multiplexer 622 through the switch unit 621. The electric signals are multiplexed in the multiplexer 622, and then, the multiplexed electric signal is converted to an optical signal in the optical signal transmitting unit in the pair 600 to be transmitted through the protection transmission line $L_0$. In addition, an optical signal transmitted through the protection transmission line $L_0$ is converted to an electric signal in the optical signal receiving unit in the pair of units 600, and then, the electric signal is demultiplexed in the demultiplexer 622 to four electric signals. The four electric signals are then supplied through the switch unit 621 to the corresponding pairs of units 601 to 604. These electric signals are respectively converted to optical signals in the optical signal receiving units in the pairs of units 601 to 604 to be transmitted to the corresponding working pieces of optical terminal equipment.

Figure 14:
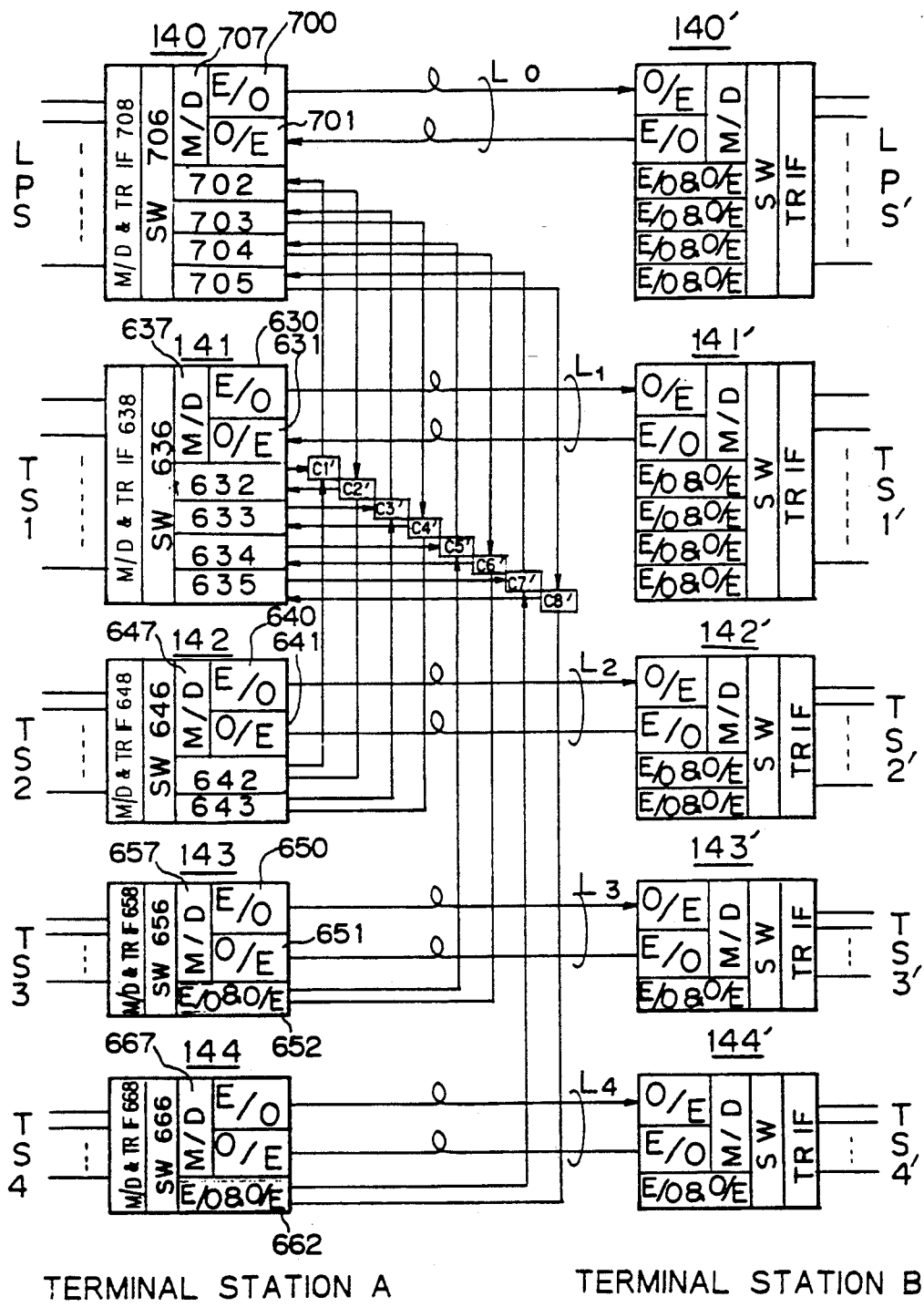
FIG. 14 is a diagram showing a construction for the ninth embodiments of the present invention.

Ninth Embodiment (FIG. 14)

FIG. 14 is a diagram showing a construction for the ninth embodiments of the present invention. In FIG. 14, reference numeral 140 and 140' each denote a protection piece of optical terminal equipment, 141, ... 144, and 141', ... 144' each denote a working piece of optical terminal equipment, $L_0$ denotes a protection transmission line, $L_1$, $L_2$, ... $L_4$ each denote a working transmission line, $C1'$, $C2'$, ... $C8'$ each denote an unidirectional optical coupler or optical switch, 700, 630, 640, 650, and 660 each denote an optical signal transmitting unit, 701, 631, 641, 651, and 661 each denote an optical signal receiving unit, 702 to 705, 632 to 635, 642, 643, 652, and 662 each denote a pair of an optical signal transmitting unit and an optical signal receiving unit, 706, 636, 646, 656, and 666 each denote a switch unit, 707, 637, 647, 657, and 667 each denote multiplexer/demultiplexer, and 638, 648, 658, and 668 each denote a construction corresponding to the interface circuit 161 and the multiplexer/demultiplexer 162 as shown in FIG. 4. Although only paths of optical signals between the protection piece of optical terminal equipment 140 and the working pieces of optical terminal equipment 141, ... 144 in the optical terminal station A are shown, and paths of optical signals between the protection piece of optical terminal equipment 140' and the working pieces of optical terminal equipment 140', ... 144' in the optical terminal station B are not shown in FIG. 14, the same construction as in the optical terminal station A is provided in the optical terminal station B.

In the ninth embodiment, the transmission rate of the protection transmission line $L_0$ and the working transmission line $L_1$ is, for example, 2.4 GHz, and the transmission rate of each path of optical signals between the protection piece of optical terminal equipment 140 and the working pieces of optical terminal equipment 141, ... 144 (and each of the optical signal transmitting units and the optical signal receiving units in each pair of units 702 to 705, 632 to 635, 642 643, 652, and 662) is, for example, 600 MHz. As shown in FIG. 14, in the ninth embodiment, transmission rates of the working transmission lines $L_1$, $L_2$, ... $L_4$ are not the same, and the minimum transmission rate is 600 MHz. That is, transmission of optical signals between the protection piece of optical terminal equipment 140 and the working pieces of optical terminal equipment 140, ... 144 is carried out at the transmission rate which is equal to the minimum transmission rate of the working transmission lines $L_1$, $L_2$, ... $L_4$, and each of the protection piece of optical terminal equipment 140 and the working pieces of optical terminal equipment 141, ... 144 comprises one or more pairs of an optical signal transmitting unit and an optical signal receiving unit for realizing the transmission.

In each of the protection piece of optical terminal equipment 140, an optical signal received through the protection transmission line $L_0$ is converted to an electric signal in the optical signal receiving unit 701, and the electric signal is demultiplexed to a plurality of electric signals of the above minimum transmission rate of the working transmission lines $L_1$, $L_2$, ... $L_N$, in the demultiplexer 707. When the protection transmission line $L_0$ is used by the working pieces of optical terminal equipment 141, ... 144, the demultiplexed electric signals are supplied through the switch unit 706 to the optical signal transmitting units in the pairs of units 702 to 705 to be respectively transmitted to the corresponding working pieces of optical terminal equipment 141, ... 144. In addition, the optical signals transmitted from the working pieces of optical terminal equipment 141, ... 144 to the protection piece of optical terminal equipment 140 are received in the pairs of units 702 to 705, and are respectively converted to electric signals. The electric signals are supplied through the switch unit 706 to the multiplexer 707 to be multiplexed to an electric signal of high transmission rate (2.4 GHz). The multiplexed electric signal is converted to an optical signal in the optical signal transmitting unit 700 to be transmitted through the protection transmission line $L_0$.

In each of the working pieces of optical terminal equipment 141, ... 144, tributary signals are first multiplexed to electric signals of the minimum transmission rate (600 MHz) in the multiplexer in the portion 638, 648, 658, or 668. In a normal condition, the electric signals are supplied through the switch unit 636, 646, 656, or 666 to the multiplexer 637, 647, 657, or 667 to be multiplexed to an electric signal of the transmission rate of the working transmission line $L_1$, $L_2$, or $L_4$. The multiplexed electric signal is converted to an optical signal in the optical signal transmitting unit 630, 640, 650, or 660 to be transmitted through the corresponding working transmission Line $L_1$, $L_2$, or $L_4$. In parallel, an optical signal received through the corresponding working transmission line $L_1$, $L_2$, or $L_4$ is converted to an electric signal in the optical signal receiving unit 631, 641, 651, or 661. The electric signal is demultiplexed to a plurality of electric signals of the minimum transmission rate in the demultiplexer 637, 547, 657, or 667. The demultiplexed electric signals are supplied through the switch unit 636, 646, 656, or 666 to the multiplexer in the portion 638, 648, 658, or 668 to be demultiplexed to tributary signals.

When the working piece of optical terminal equipment is connected to the protection piece of optical terminal equipment 140, the above electric signals output from the portion 638, 648, 658, or 668 are supplied through the switch unit 636, 646, 656, or 666 to the pairs of units 632 to 635, 642, 643, 652, and 662 to be transmitted to the protection piece of optical terminal equipment 140. Parallel to the above, the optical signals transmitted from the protection piece of optical terminal equipment 140 to the working piece of optical terminal equipment which uses the protection piece of optical terminal equipment 140, are received by the optical signal receiving unit in the pair of units 632 to 635, 642, 643, 652, and are converted therein to an electric signal of the minimum transmission rate. The electric signals are supplied through the switch unit 636, 646, 656, or 666 to the portion 638, 648, 658, or 668, and are demultiplexed therein to tributary signals.

As shown in FIG. 14, the paths of the optical signals between the respective optical signal transmitting units and the optical signal receiving units in the working pieces of optical terminal equipment and the corresponding units in the protection piece of optical terminal equipment 140 are provided by using the optical couplers or optical switches C1', C2', ... C3' in a similar manner to the fifth, sixth, and seventh embodiments.

According to the construction of the ninth embodiment, working pieces of optical terminal equipment respectively containing working transmission lines of various transmission rates can efficiently use a protection transmission line having a high transmission rate.

Figure 15:
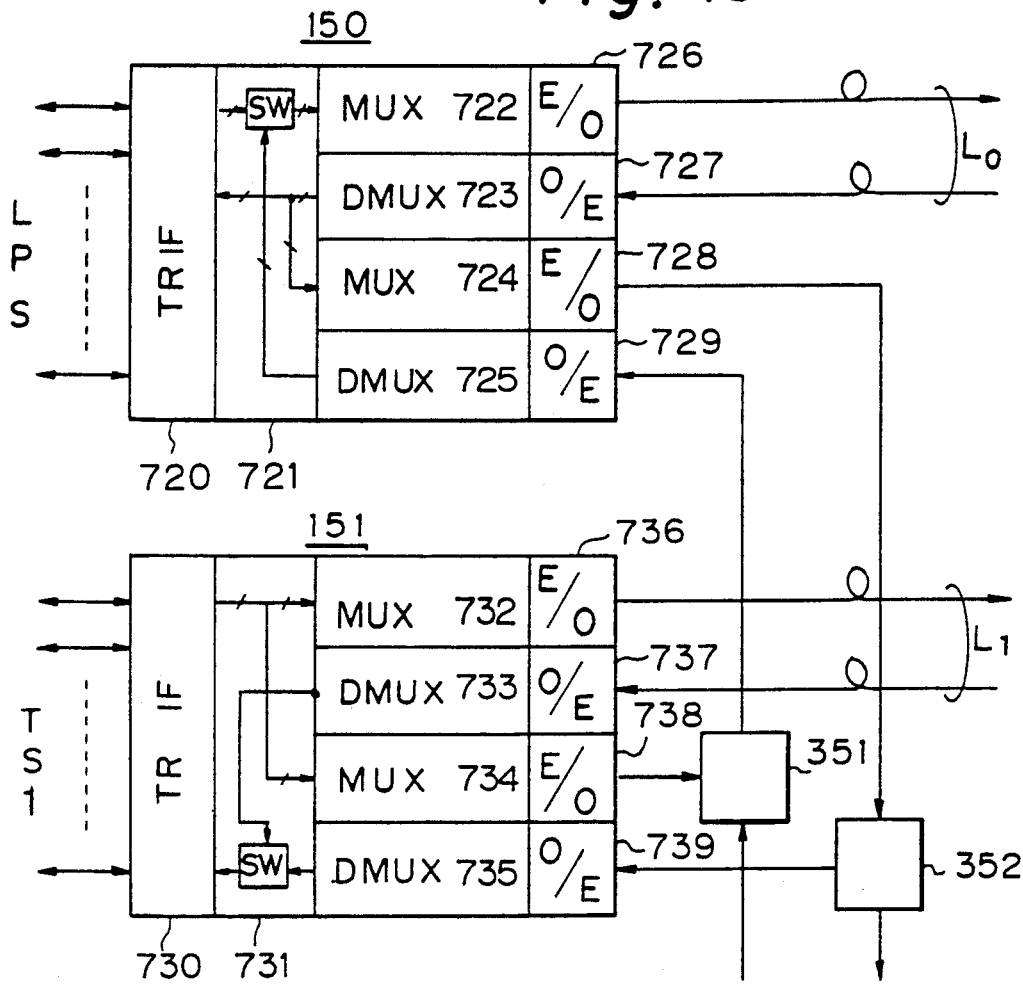
FIG. 15 is a diagram showing a construction for the tenth embodiments of the present invention.
Figure 16:
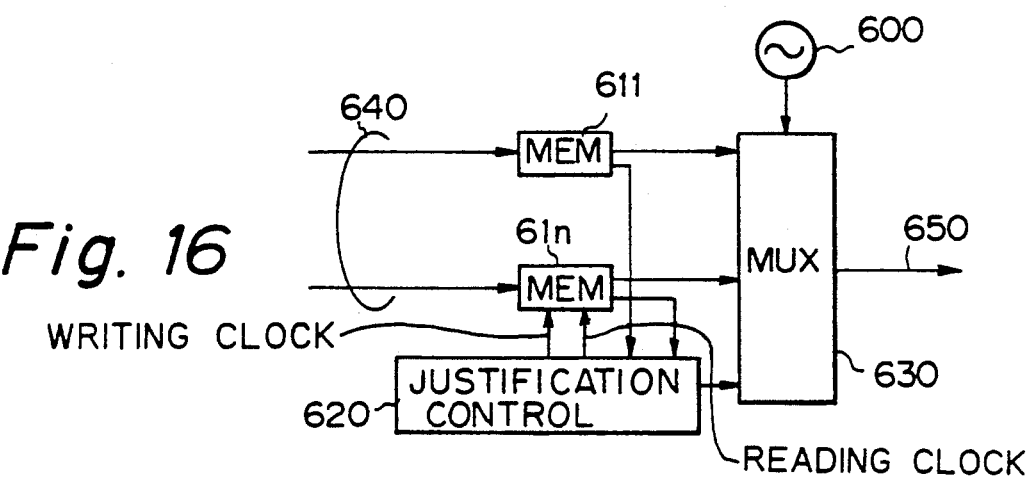
FIG. 16 is a diagram showing a construction for synchronizing the signals received from the working pieces of optical terminal equipment, with a clock signal in the protection piece of optical terminal equipment 150.

Tenth Embodiment (FIGS. 15 and 16)

FIG. 15 is a diagram showing a construction for the tenth embodiments of the present invention. In FIG. 15, reference numeral 720 denotes an interface circuit for tributary signals, 721 denotes a switch unit, 722, 724, 732, and 734 each denote a multiplexer, 723, 725, 733, and 735 each denote a demultiplexer, 726, 728, 736, and 738 each denote an optical signal transmitting unit, 727, 729, 737, and 729 each denote an optical signal receiving unit, 351 and 352 each denote an optical coupler or optical switch. Since the characteristic feature of the tenth embodiment lies in each of the protection piece of optical terminal equipment and the working pieces of optical terminal equipment, only one protection piece of optical terminal equipment and one working piece of optical terminal equipment are shown in FIG. 15. The other portion of the system is the same as the fifth to seventh embodiments. The interface circuits 720 and 730 are each the same as the interface circuit 161 in FIG. 4, and the interface circuits 720 and 730 in FIG. 15 may contain a construction equivalent to the multiplexer/demultiplexer 162. The switch unit 721 is the same as the construction of FIG. 8, and the switch unit 731 is the same as the construction of FIG. 7.

As shown in FIG. 15, multiplexers and demultiplexers are provided on the side of the optical signal transmitting units and the optical signal receiving units. The multiplexer 722 in the protection piece of optical terminal equipment comprises a construction for synchronizing the signals received from the working pieces of optical terminal equipment, with a clock signal in the protection piece of optical terminal equipment 150.

In FIG. 16, reference numeral 800 denotes a clock generator, 811 to 81n each denotes a buffer memory (FIFO memory), 820 denotes a justification circuit, and 830 denotes a multiplexing circuit. Each bit of the electric signals to be multiplexed, are respectively input into the corresponding memories 811 to 81n synchronizing with writing clocks which respectively synchronize with the electric signals input into the memory, and each bit written in each memory is read and supplied to the multiplexing circuit 830 synchronizing with a reading clock which synchronizes with the clock generated in the clock generator 800 in the protection piece of optical terminal equipment 150.

Generally, the frequency of the reading clock is set to be a little higher than the frequencies of the writing clocks. The justification control circuit 820 supplies the writing clocks and the reading clock to the memories 811 to 81n and the multiplexing circuit 830, compares phases of the writing clocks and the reading clock, and stops supplying of one cycle of the reading clock to each of the memories 811 to 81n and the multiplexing circuit 830 when the same bit is to be read twice from the memory if the cycle of the reading clock is supplied thereto.

The above construction for synchronization may be provided in the other multiplexers 724, 732, and 734 in the construction of FIG. 15. Thus, according to the construction of FIGS. 15 and 16, an optical signal transmitted through the protection transmission line $L_0$ is converted to an electric signal in the optical signal receiving unit 723, and then the electric signal is demultiplexed in the demultiplexer 723. The demultiplexed electric signals are supplied through the switch unit 721 to the multiplexer 724. The electric signals are multiplexed in the multiplexer 724, and the multiplexed electric signal is converted to an optical signal in the optical signal transmitting unit 728 to be transmitted to the corresponding working piece of optical terminal equipment. Parallel to the above, an optical signal transmitted from a working piece of optical terminal equipment is converted to an electric signal in the optical signal receiving unit 729, and the converted electric signal is demultiplexed in the demultiplexer 725. Electric signals generated by the demultiplexer 725 are supplied through the switch unit 721 to the multiplexer 722. The multiplexer 722 multiplexes the supplied electric signals to an electric signal synchronizing the signals with the clock signal generated therein as explained above, and the multiplexed electric signal is converted to an optical signal in the optical signal transmitting unit 726 to be transmitted through the protection transmission line $L_0$.

Figure 17:
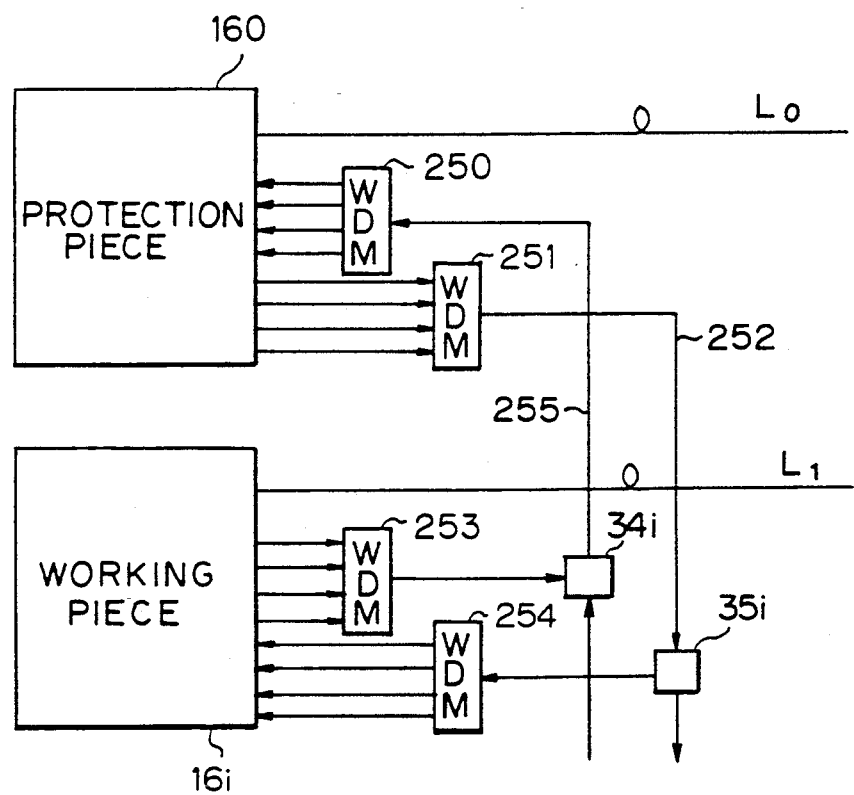
FIG. 17 is a diagram showing a construction for the eleventh embodiments of the present invention.

Eleventh Embodiment (FIG. 17)

FIG. 17 is a diagram showing a construction for the eleventh embodiments of the present invention. In FIG. 17, reference numeral 160 denotes an protection piece of optical terminal equipment, 16i denotes a working piece of optical terminal equipment, 34i and 35i each denote an optical coupler or optical switch, 250 and 254 each denote a wavelength division demultiplexer, 251 and 253 each denote a wavelength division multiplexer, 252 and 255 each denote an optical fiber.

The wavelength division multiplexer 251 converts a plurality of signals into a plurality of optical signals of respectively different wavelengths, and multiplexes the plurality of optical signals to be transmitted through an optical fiber 252. The wavelength division demultiplexer 254 receives the wavelength division multiplexed optical signal through the optical fiber 252 and the optical coupler or optical switch 35i, and demultiplexes the multiplexed optical signal into a plurality of signals as those output from the protection piece of optical terminal equipment 160. A plurality of signals to be transmitted from the working piece of optical terminal equipment 16i to the protection piece of optical terminal equipment 160 are wavelength division multiplexed in the wavelength division multiplexer 253. The multiplexed optical signal is transmitted through the optical coupler or optical switch 34i and the optical fiber 255 to the wavelength division demultiplexer 250, and is then demultiplexed to the above signals output from the working piece of optical terminal equipment 16i.

Thus, according to the construction of the eleventh embodiment, the transmission between the protection piece of optical terminal equipment and the working pieces of optical terminal equipment are carried out through a small number of optical fibers.

Figure 18:
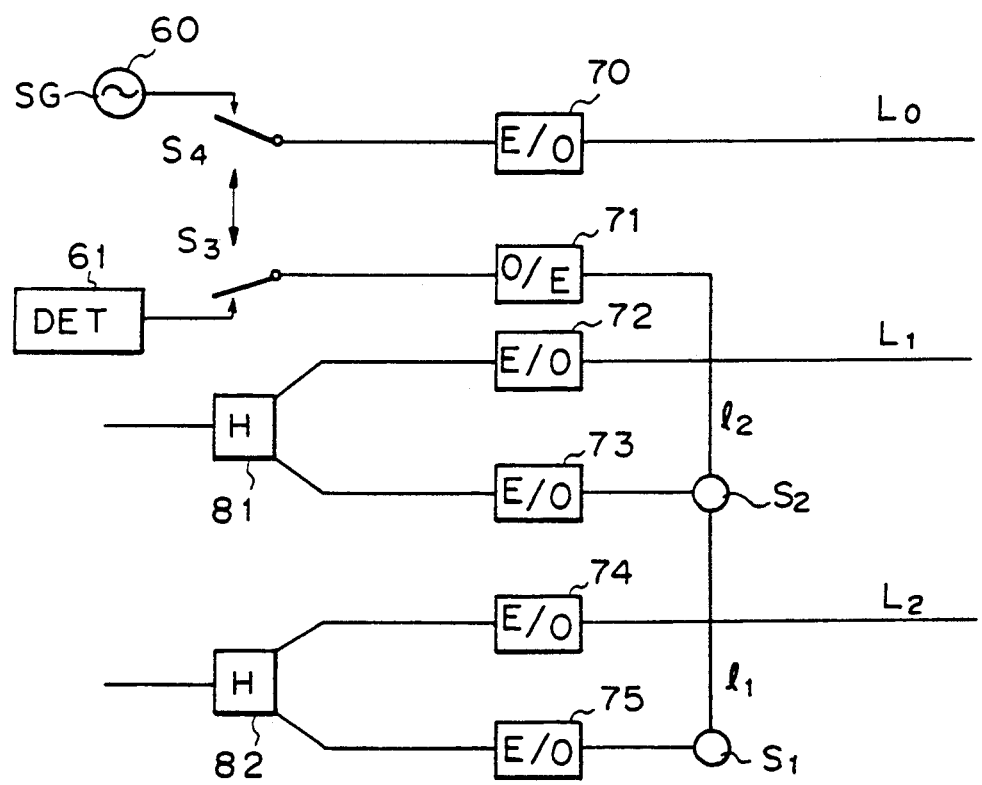
FIG. 18 is a diagram showing a construction for confirming the above normality of the paths of the optical signals between the protection piece of optical terminal equipment and the working pieces of optical terminal equipment.

Twelfth Embodiment (FIG. 18)

In the embodiments explained above, the paths of the optical signals between the protection piece of optical terminal equipment and the working pieces of optical terminal equipment are not used in the normal condition. It is desirable to confirm the normality of the paths before the paths are used. FIG. 18 is a diagram showing a construction for confirming the above normality as the eleventh embodiment of the present invention. In FIG. 18, reference numeral 60 denotes a dummy signal generator, 61 denotes a signal detector, 70, and 72 to 75 each denote an optical signal transmitting unit, 81 and 82 each denote a hybrid circuit, $S_3$ and $S_4$ each denote an optical switch, and $S_1$ and $S_2$ each denote an electric switch.

The dummy signal generator 60 and the signal detector 61 are provided in the protection piece of optical terminal equipment. The dummy signal generator 60 generates a dummy signal, and the dummy signal is transmitted through the protection transmission line $L_0$ between the protection pieces of optical terminal equipment in the optical terminal stations A and B. The dummy signal transmitted through the protection transmission line $L_0$ is detected by another signal detector (not shown) in the other optical terminal station to confirm the normality of the protection transmission line $L_0$.

The hybrid circuits 81 and 82 are respectively provided in two working pieces of optical terminal equipment. In the normal condition, an electric signal to be transmitted from each working piece of optical terminal equipment to the protection piece of optical terminal equipment, is supplied through the hybrid circuit 81 or 82 to the optical signal transmitting units 72 and 73, or 74 and 75. Thus, the electric signals from the hybrid circuits 81 and 82 are respectively applied to the optical signal transmitting units 73 and 75 to be converted to optical signals. The optical switches $S_1$ and $S_2$ are controlled so that the optical signals generated in the optical signal transmitting units 73 and 75, are alternatively (cyclically) transmitted through the optical signal receiving unit 71 to the signal detector 61 in the protection piece of optical terminal equipment. Thus, the normality of the paths of optical signals from the working pieces of optical terminal equipment to the protection piece of optical terminal equipment can be confirmed by the signal detector 61.

Although not shown, the paths of optical signals from the protection piece of optical terminal equipment to the working pieces of optical terminal equipment can be confirmed by providing a signal detector in each working piece of optical terminal equipment, and cyclincally transmitting a dummy signal to each working piece of optical terminal equipment.

Thirteenth Embodiment (FIGS. 19, 20, 21, and 22)

Figure 19:
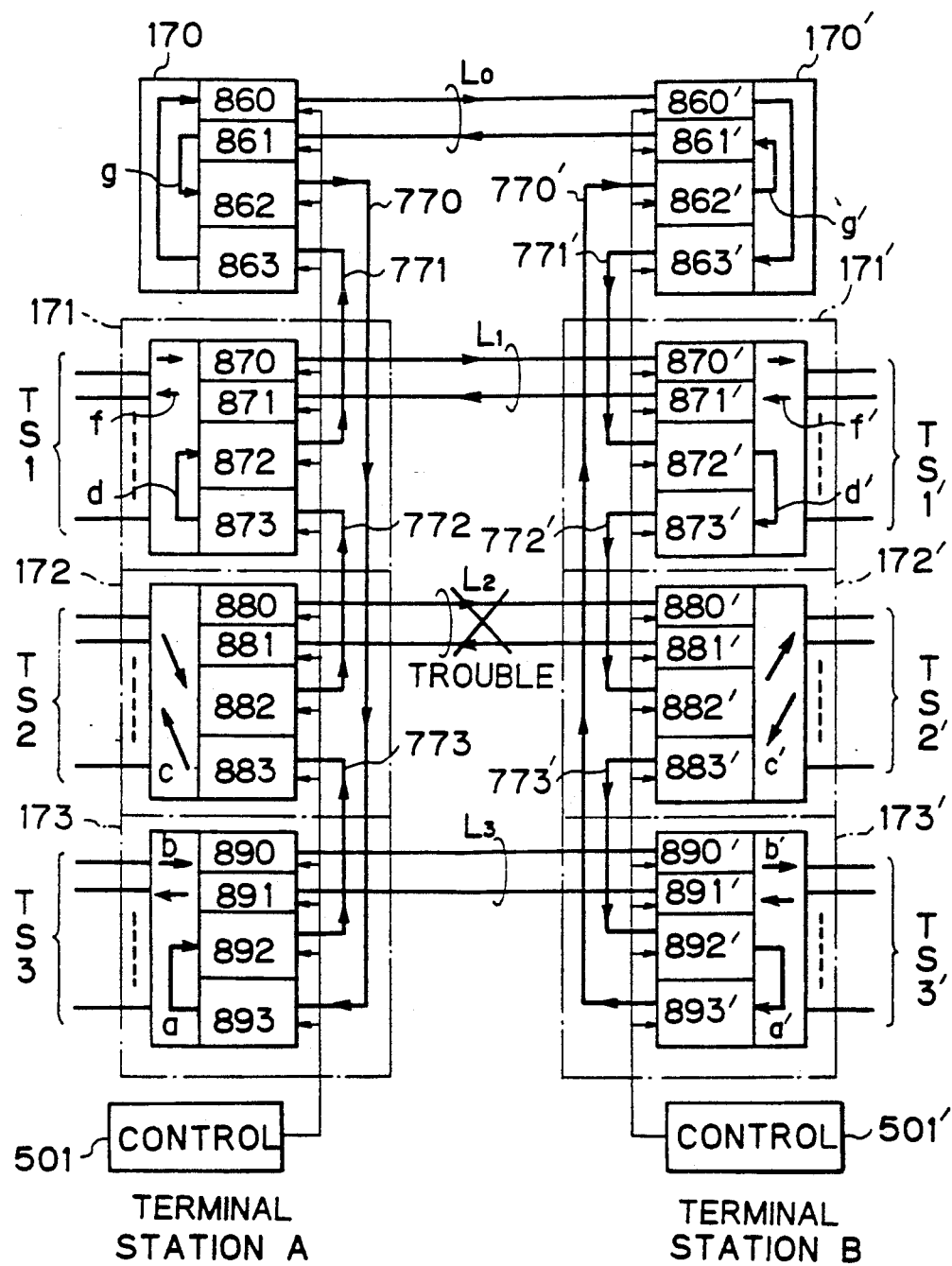
FIG. 19 is a diagram showing a construction and flows of optical and electric signals of the thirteenth embodiment of the present invention.

FIG. 19 is a diagram showing a construction and flows of optical and electric signals of the thirteenth embodiment of the present invention. In FIG. 19, reference numeral 170 and 170 each denote a protection piece of optical terminal equipment, 171, 172, 173, 171', 172', and 173' each denote a working piece of optical terminal equipment, 860, 862, 870, 872, 880, 882, 890, 892, 861', 863', 871', 873', 881', 883', 891', and 893' each denote an optical signal transmitting unit, 861, 863, 871, 873', 881, 883, 891, 893, 860', 862', 870', 872', 880', 890', and 892' each denote an optical signal receiving unit, 770 and 770' each denote a bidirectional optical path connecting the protection piece of optical terminal equipment and the working piece of optical terminal equipment which is located at a location furthest from the protection piece of optical terminal equipment, 771 and 771' each denote a bidirectional optical path connecting the protection piece of optical terminal equipment and the working piece of optical terminal equipment which is located at a location nearest to the protection piece of optical terminal equipment, 772, 773, 772', and 773' each denote a bidirectional optical path connecting a working piece of optical terminal equipment and an adjacent working piece of optical terminal equipment, 501 and 501' each denote a controller of a corresponding optical terminal station, a, d, a', and d' each denote an unidirectional path for relaying an optical signal transmitted through a working piece of optical terminal equipment, b, f, b', and f' each denote flows of bidirectional electric signals normally transmitted through a pair of an optical signal transmitting unit and an optical signal receiving unit in a working piece of optical terminal equipment other than a working piece of optical terminal equipment which is to be connected to the protection transmission line, c and c' each denote flows of bidirectional electric signals transmitted through a pair of an optical signal transmitting unit and an optical signal receiving unit in the working piece of optical terminal equipment which is to be connected to the protection transmission line, and g and g' each denote an unidirectional path for connecting an optical signal between the protection transmission line and the bidirectional optical path to and from the working piece of optical terminal equipment which is to be connected to the protection piece of optical terminal equipment. Although the explanation below is made for the construction in the optical terminal station A only, the construction in the optical terminal station B is similar to that of the optical terminal station A.

As shown in FIG. 19, one unidirectional optical path 770 connects an optical output port of the optical signal transmitting unit 862 of the protection piece of optical terminal equipment 170 with an optical output port of the optical signal receiving unit 893, an optical output port of the optical signal transmitting unit 8i2 (i=8 and 9) of each working piece of optical terminal equipment 17i and an optical input port of the optical signal receiving unit 8(i−1)3 of a working piece of optical terminal equipment 17(i−1) located one piece nearer than the working piece of optical terminal equipment 17i, are connected with an unidirectional optical path 77i, and an optical output port of the optical signal transmitting unit 872 of the working piece of optical terminal equipment 171 which is located at a location nearest to the protection piece of optical terminal equipment 170, and an optical input port of the optical signal receiving unit 863 of the protection piece of optical terminal equipment 170, are connected with an unidirectional optical path 771.

Although not shown, the directions of these unidirectional optical paths may be inverted. Namely, as an alternative to the above connections, an optical input port of the optical signal transmitting unit 863 of the protection piece of optical terminal equipment 170 and an optical input port of the optical signal receiving unit 892 may be connected by an unidirectional optical path, an optical input port of the optical signal transmitting unit 8i3 (i=8 and 9) of each working piece of optical terminal equipment 17i and an optical output port of the optical signal receiving unit 8(i−1)2 of a working piece of optical terminal equipment 17(i−1) located one piece nearer than the working piece of optical terminal equipment 17i may be connected with an unidirectional optical path, and an optical input port of the optical signal transmitting unit 873 of the working piece of optical terminal equipment 171 which is located at a location nearest to the protection piece of optical terminal equipment 170, and an optical output port of the optical signal receiving unit 862 of the protection piece of optical terminal equipment 170, may be connected with an unidirectional optical path 771.

In the above connections with the unidirectional optical paths 770, 771, 772, and 773 as shown in FIG. 19, when a trouble has occurred in the working transmission line $L_2$, in the working piece of optical terminal equipment 172 which corresponds to the working transmission line $L_2$, and which is to be connected to the protection transmission line $L_0$, an electric signal to be transmitted to the other optical terminal station, is supplied to the optical signal transmitting unit 882, and an electric signal output from the optical signal receiving unit 883 is demultiplexed to tributary signals in the working piece of optical terminal equipment 172. In the other working pieces of optical terminal equipment 171 and 173, the electric signal output of the optical signal receiving unit 8i3 (i=7 and 9) is applied to the electric signal input terminal of the optical signal transmitting unit 8i2 to relay the signals transmitted between the protection piece of optical terminal equipment 170 and the above working piece of optical terminal equipment 172, as indicated by a and d in FIG. 19. Parallel to the relay operation, normal operations of multiplexing tributary signals TSi, converting and transmitting the multiplexed signal through the working transmission line Li, receiving and converting an optical signal, and demultiplexing the converted signal to tributary signals TSi, are carried out in the respective working pieces of optical terminal equipment 171 and 173, as indicated by arrows b and f in FIG. 19. In the protection piece of optical terminal equipment 170, the protection transmission line $L_0$ is connected to the optical signal transmitting unit 862 and the optical signal receiving unit 863.

By the above connections, the tributary signals TS2 are multiplexed in the working piece of optical terminal equipment 172, and the multiplexed signal is converted to an optical signal in the optical signal transmitting unit 882. Then, the optical signal is transmitted through the path 772, the optical signal receiving unit 873, the path d, the optical signal transmitting unit 872, and the path 771 to the protection piece of optical terminal equipment 170. The optical signal output from the optical signal transmitting unit 862 is transmitted through the path 770, the optical signal receiving unit 893, the path a, the optical signal transmitting unit 892, the path 773 to the optical signal receiving unit 883 of the working piece of optical terminal equipment 172 to be converted and demultiplexed to the tributary signals TS2.

Figure 20:
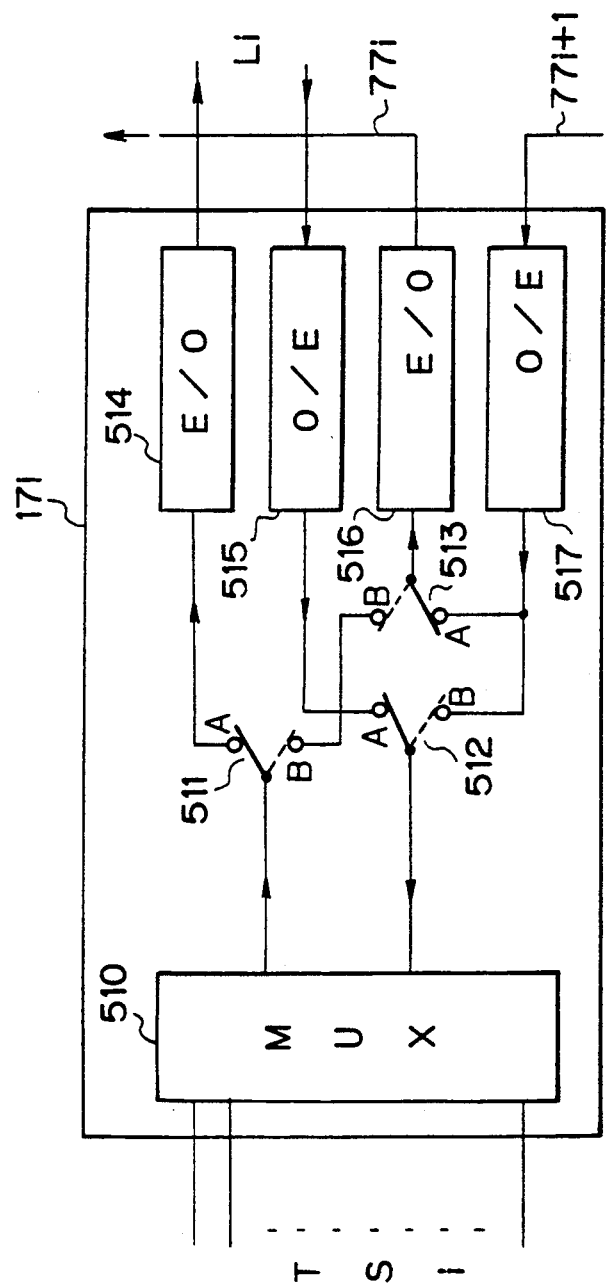
FIG. 20 is a diagram showing a construction of the working piece of optical terminal equipment 17$i$ ($i$=1 to 3) in the construction of FIG. 19.

FIG. 20 is a diagram showing a construction of the working piece of optical terminal equipment 17i (i=1 to 3) in the construction of FIG. 19. In FIG. 20, reference numeral 510 denotes a multiplexer/demultiplexer, 511, 512, and 513 each denote a switch, 514 and 516 each denote an optical signal transmitting unit, and 515 and 517 each denote an optical signal receiving unit. Each of the switches 511, 512, and 513 has two contacts A and B. In the working piece of optical terminal equipment 172 corresponding to the working transmission line $L_2$ having a trouble, the switches 511, 512, and 513 are respectively switched to their contact A.

Figure 21:
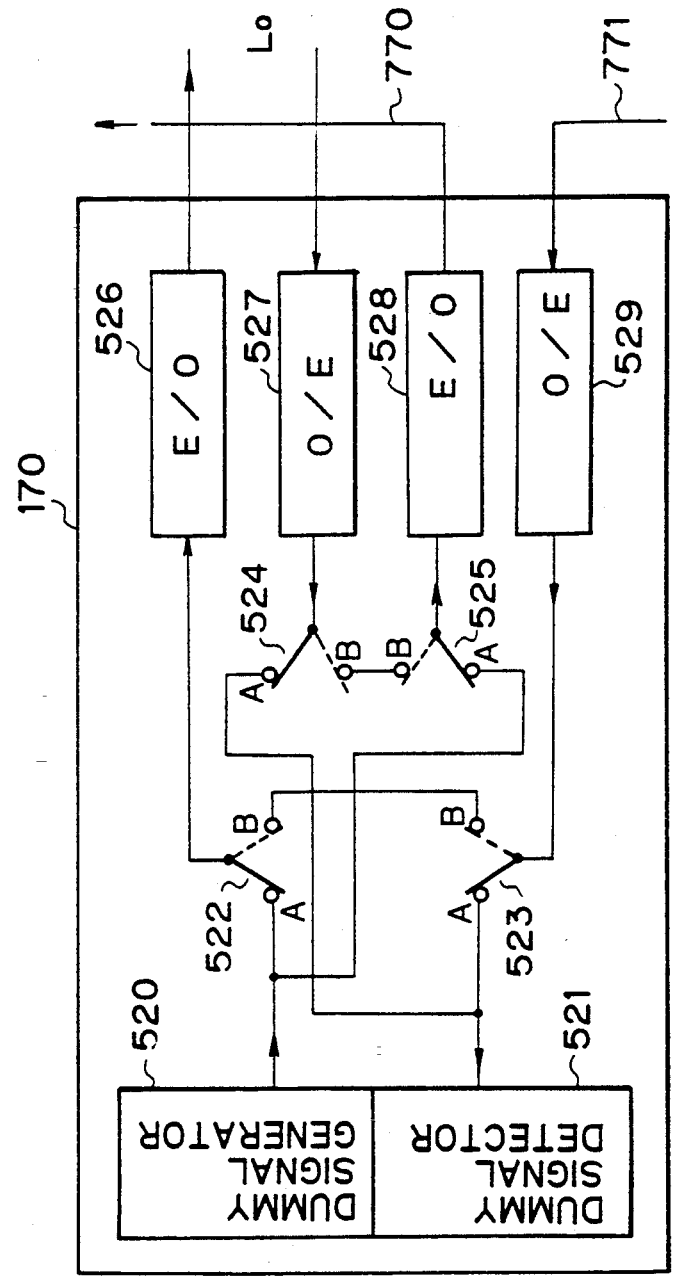
FIG. 21 is a diagram showing a construction of the protection piece of optical terminal equipment 170 in the construction of FIG. 19.

FIG. 21 is a diagram showing a construction of the protection piece of optical terminal equipment 170 in the construction of FIG. 19. In FIG. 21, reference numeral 520 denotes a dummy signal generator, 521 denotes a dummy signal detector, 522, 523, 524, and 525 each denote a switch, 526 and 528 each denote an optical signal transmitting unit, and 527 and 529 each denote an optical signal receiving unit. Each of the switches 522, 523, 524, and 525 has two contacts A and B. In the normal condition, the switches 522 and 524 are respectively switched to the contact A. When one of the working pieces of optical terminal equipment is to be connected to the protection transmission line $L_0$, all the switches 522, 523, 524, and 525 are respectively switched to the contact B.

Figure 22:
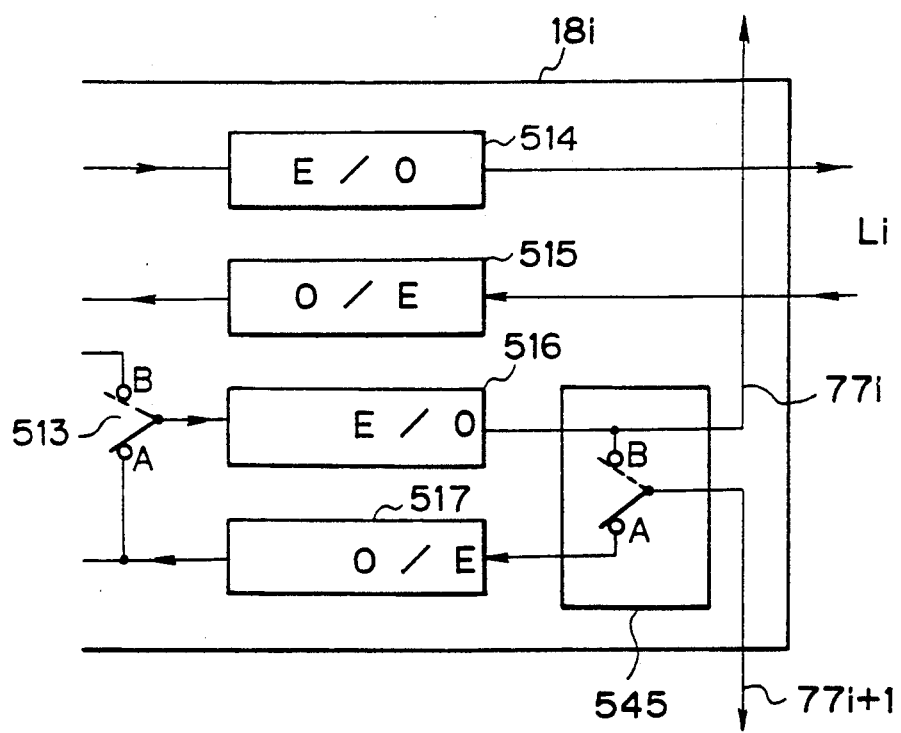
FIG. 22 is a diagram showing an alternative construction of the working piece of optical terminal equipment 17$i$ ($i$=1 to 3) in the construction of FIG. 19.
Figure 23:
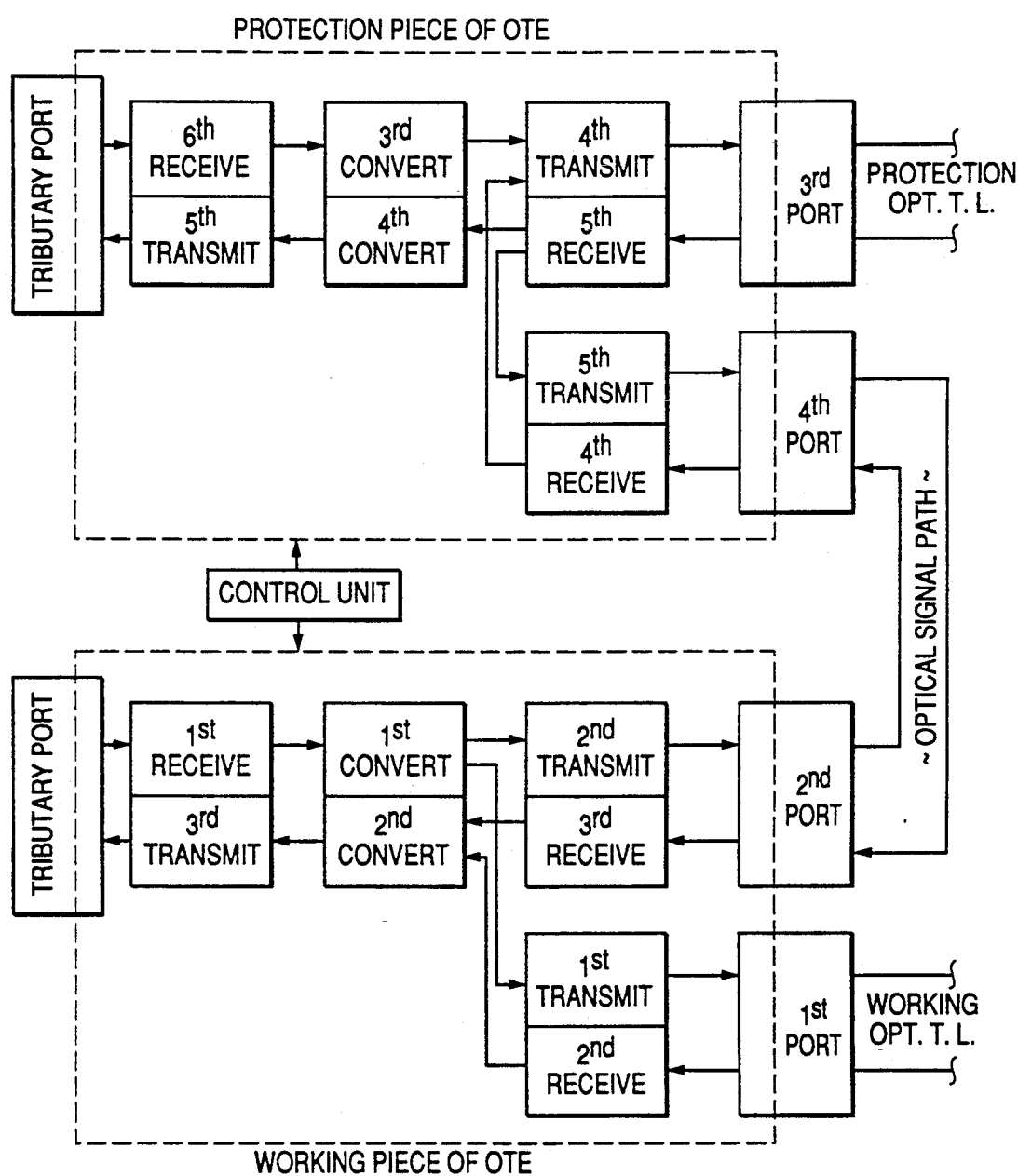
FIG. 23 is a schematic block diagram of the basic system of the invention.

FIG. 22 is a diagram showing an alternative construction of the working piece of optical terminal equipment 17i (i=1 to 3) in the construction of FIG. 19. In FIG. 22, reference numeral 545 denotes a switch, and the switch 545 has two contacts A and B. Although not shown, the working piece of optical terminal equipment 18i (i=1 to 3) has the same construction as that of FIG. 20 except the addition of the switch 545. In the construction of FIG. 22, the optical signal transmitting unit 516 and the optical signal receiving unit 517 can be bypassed when a trouble occurs in the optical signal transmitting unit 516, the optical signal receiving unit 517, and the switch 513.

We claim:

1. A system for optical communication between optical terminal stations automatically and selectively switchable between normal and protection modes, comprising:

first and second optical terminal stations;

a plurality of working optical transmission lines, each connecting said first and second optical terminal stations and operable in the normal mode for transmitting optical signals in two opposite directions between said first and second optical terminal stations;

a protection optical transmission line, provided as a standby bidirectional optical transmission line for at least some of said working optical transmission lines, connecting said first and second optical terminal stations and operable in the protection mode for transmitting an optical signal between said first and second optical terminal stations;

each of said first and second optical terminal stations comprising:

a plurality of working pieces of optical terminal equipment respectively corresponding to said plurality of working optical transmission lines, each operable in the normal mode for transmitting and receiving signals over the respective working optional transmission line, a protection piece of optical terminal equipment corresponding to said protection optical transmission line and operable in the protection mode for transmitting and receiving signals over the protection optical transmission line, a plurality of bidirectional optical signal paths corresponding to respective working pieces of optical terminal equipment, each connecting a corresponding working piece of optical terminal equipment with said protection piece of optical terminal equipment and operable in the protection mode for signal transmission therebetween, and a control unit which maintains the normal mode of each of the plurality of working pieces in the absence of any trouble occurring on the respective working optical transmission lines and which is responsive to a trouble occurring in one of the plurality of working optical transmission lines for disabling the normal mode and enabling the protection mode of operation of the respective working piece and of the protection piece;

each of said plurality of working pieces of optical terminal equipment comprising:
- at least one bidirectional tributary port inputting and outputting tributary signals,
- first and second bidirectional optical ports each inputting and outputting optical signals, said first bidirectional optical port being connected to a corresponding working optical transmission line, and said second bidirectional optical port being connected to a corresponding bidirectional optical signal path,
- first receiving means, connected to said at least one bidirectional tributary port, for receiving tributary signals from said at least one tributary port,
- first converting means, connected to said first receiving means, for converting the tributary signals to optical signals,
- first transmitting means, connected to said first converting means and said first bidirectional optical port and operable in the normal mode for transmitting the optical signals, converted from the tributary signals, through said first bidirectional optical port and the corresponding working optical transmission line to the other of said first and second optical terminal stations,
- second transmitting means, connected to said first converting means and said second bidirectional optical port and operable in the protection mode for transmitting the optical signals, converted from the tributary signals, through said second bidirectional optical port and the corresponding bidirectional optical signal path to said protection piece of optical terminal equipment,
- second receiving means, connected to said first bidirectional optical port, for receiving optical signals transmitted in the normal mode from the other of said first and second optical terminal stations through said respective working line and said first bidirectional optical port,
- third receiving means, connected to said second bidirectional optical port, for receiving optical signals transmitted in the protection mode from said protection piece of optical terminal equipment through the corresponding bidirectional optical signal path and said second bidirectional port,
- second converting means, selectively connected to said second receiving means in said normal mode and to said third receiving means in said protection mode, for converting the respective optical signals received by said second and third receiving means to tributary signals to be output from said at least one bidirectional tributary port, and
- third transmitting means, connected to said second converting means and said at least one bidirectional tributary port, for transmitting the tributary signals converted by said second converting means to said at least one bidirectional tributary port; and said protection piece of optical terminal equipment comprising:
- third and fourth bidirectional optical ports each inputting and outputting optical signals therethrough, said third bidirectional optical port being connected to said protection optical transmission line and said fourth bidirectional optical port being operatively connected to at least one of said plurality of bidirectional optical signal paths,
- fourth receiving means, connected to said fourth bidirectional optical port, for receiving optical signals, transmitted in the protection mode through said fourth bidirectional optical port from the corresponding working piece of optical terminal equipment connected to the at least one of said plurality of bidirectional optical signal paths,
- fourth transmitting means, connected to said fourth receiving means and said third bidirectional optical port, for transmitting the optical signals, received by said fourth receiving means in the protection mode, through said protection optical transmission line to the other of said first and second optical terminal stations,
- fifth receiving means, connected to said third bidirectional optical port, for receiving optical signals, transmitted in the protection mode from the other of said first and second optical terminal stations, through said protection optical signal path and said third bidirectional optical port, and
- fifth transmitting means, connected to said fourth bidirectional optical port, for transmitting the optical signals, received by said fifth receiving means in the protection mode through said fourth bidirectional optical port, to the corresponding working piece of optical terminal equipment connected to the at least one of said plurality of bidirectional optical signal paths.

2. A switching system according to claim 1, wherein said protection piece of optical terminal equipment comprises:
- dummy signal generating means for generating a dummy signal for transmission through said protection optical transmission line when no working piece of optical terminal equipment is connected to said protection optical transmission line, and
- dummy signal connection switch means for connecting said dummy signal generating means to said protection optical transmission line when no working piece of optical terminal equipment is connected to said protection optical transmission line.

3. A switching system according to claim 1, wherein said protection piece of optical terminal equipment in each of said first and second optical terminal stations further comprises:
- at least one bidirectional tributary port for inputting and outputting low-priority tributary signals therethrough;
- sixth receiving means, connected to said at least one bidirectional tributary port in said protection piece of optical terminal equipment, for receiving low-priority tributary signals from said at least one bidirectional tributary port;
- third converting means, connected to said sixth receiving means and said fourth transmitting means, for converting the low-priority tributary signals, received by said sixth receiving means, to optical signals and supplying the optical signals to said fourth transmitting means, said fourth transmitting means transmitting said optical signals, converted by said third converting means, through said third bidirectional optical port to the other of said first and second optical terminal stations;
- fourth converting means, connected to said fifth receiving means, for converting the optical signals, received by said fifth receiving means, to low-priority tributary signals to be output from said at least one bidirectional tributary port in said protection piece of optical terminal equipment; and seventh transmitting means, connected to said fourth converting means and said at least one bidirectional tributary port in said protection piece of optical terminal equipment, for transmitting the low-priority tributary signals, converted by said fourth converting means, to said at least one bidirectional tributary port.

4. A switching system according to claim 1, wherein said protection piece of optical terminal equipment operates in synchronization with a clock signal, and said fourth and fifth transmitting means each include synchronizing means for regenerating the optical signals received through said third and fourth bidirectional optical ports, at a timing of the clock signal before the transmitting operations by said fourth and fifth transmitting means.

5. A switching system according to claim 4, wherein said fourth and fifth receiving means respectively comprise optical-to-electric conversion means for converting the respectively received optical signals into electric signals, and demultiplexer means for demultiplexing the converted electric signals into demultiplexed electric signals, said fourth and fifth transmitting means respectively comprise multiplexer means for multiplexing the respectively received electric signals into multiplexed electric signals, and electric-to-optical conversion means for converting the multiplexed electric signals into optical signals, and said protection piece of optical terminal equipment comprises connection means for supplying said demultiplexed electric signals generated in said fourth and fifth receiving means to said fourth and fifth transmitting means, respectively.

6. A switching system according to claim 4, wherein a wavelength of said optical signal transmitted from said protection piece of optical terminal equipment to said working pieces of optical terminal equipment and a wavelength of said optical signal transmitted from said respective working pieces of optical terminal equipment to said protection piece of optical terminal equipment, are the same.

7. A switching system according to claim 1, wherein each of said plurality of bidirectional optical signal paths comprise wavelength division multiplex means for transforming a plurality of optical signals to optical signals respectively having different wavelengths, and multiplexing the plurality of optical signals to transmit the plurality of optical signals between the protection piece of optical terminal equipment and one of the plurality of working pieces of optical terminal equipment through an optical transmission line.

8. A switching system according to claim 1, wherein each of said plurality of working pieces of optical terminal equipment comprises switch means for making the operation active regarding optical signals passing through one of said first and second bidirectional optical ports.

9. A switching system according to claim 1, wherein each of said plurality of working pieces of optical terminal equipment comprises, a receiving signal switch means for selecting the optical signals received through one of said first and second bidirectional optical ports, to be converted to said tributary signals by said second converting means, and a transmitting signal switch means for selecting one of said first and second transmitting means to operate.

10. A switching system according to claim 9, wherein each of said first and second optical terminal stations further comprises switch control means for controlling the operations of said receiving signal switch means and said transmitting signal switch means.

11. A switching system according to claim 9, wherein said plurality of bidirectional optical signal paths in each of first and second optical terminal stations comprise:

a first signal coupling/branching means, provided corresponding to the protection piece of optical terminal equipment, said first signal coupling/branching means having one coupled bidirectional optical port and a plurality of uncoupled bidirectional optical ports provided corresponding to the respective working pieces of optical terminal equipment, the plurality of uncoupled bidirectional optical ports are respectively connected to said second bidirectional optical port of the corresponding working pieces of optical terminal equipment, the coupled bidirectional optical port being connected to said fourth bidirectional optical port of said protection piece of optical terminal equipment, an optical signal input into said coupled bidirectional optical port in each first signal coupling/branching means branching therein to be output from said plurality of uncoupled bidirectional optical ports, and an optical signal input into either of said plurality of uncoupled bidirectional optical ports in the first signal coupling/branching means passing therethrough to be output from said coupled bidirectional optical port.

12. A switching system according to claim 11, wherein said first and second bidirectional optical ports of each of said plurality of working pieces of optical terminal equipment provide an optical input port connected to said third receiving means, and an optical output port for the transmission by said second transmitting means, and wherein said protection piece of optical terminal equipment of each of said first and second optical terminal stations includes an optical input port connected to said fourth receiving means, and an optical output port connected said fifth transmitting means, wherein said plurality of bidirectional optical signal paths further comprise second signal coupling/branching means connected to said protection piece of optical terminal equipment, said second signal coupling/branching means having one coupled bidirectional optical port connected to said coupled bidirectional optical port of said first signal coupling/branching means, and two uncoupled unidirectional ports connected to said fourth bidirectional optical port of said protection piece of optical terminal equipment, an optical signal input into said coupled bidirectional optical port in said second signal coupling/branching means passing therethrough to be input into said protection piece of optical terminal equipment through said fourth bidirectional optical port thereof, and an optical signal output from said third bidirectional optical output port of said protection piece of optical terminal equipment passing through said second signal coupling/branching means to be output from said coupled bidirectional optical port thereof of said second signal coupling/branching means to said first signal coupling/branching means; and a plurality of third signal coupling/branching means, respectively provided corresponding to said plurality of working pieces of optical terminal equipment, each of said third signal coupling/branching means having one coupled bidirectional optical port connected to one of said plurality of uncoupled bidirectional optical ports of said first signal coupling/branching means, and two uncoupled unidirectional ports respectively connected to said optical input port and said optical output port of a corresponding working piece of optical terminal equipment, an optical signal input into said coupled bidirectional optical port in each third signal coupling/branching means passing therethrough to be applied to the corresponding working piece of optical terminal equipment via one of said two uncoupled unidirectional ports thereof and said optical input port of the corresponding working piece of optical terminal equipment, and an optical signal output from said optical output port of the corresponding working piece of optical terminal equipment being input through the other of said two uncoupled unidirectional ports thereof and passing therethrough to be output from the coupled bidirectional optical port thereof to said first signal coupling/branching means.

13. A switching system according to claim 9, wherein said plurality of bidirectional optical signal paths in each of said first and second optical terminal stations each further comprises first unidirectional signal coupling/branching means, connected to said protection piece of optical terminal equipment and having one coupled signal unidirectional port and a plurality of uncoupled unidirectional ports connected to corresponding working pieces of optical terminal equipment, said plurality of uncoupled unidirectional ports respectively connected to said optical output ports in said second bidirectional optical ports of the corresponding working pieces of optical terminal equipment, said coupled signal unidirectional port being connected to said optical input port of said fourth bidirectional optical port of said protection piece of optical terminal equipment, an optical signal input into one of said uncoupled unidirectional ports in said first unidirectional signal coupling/branching means being output from said coupled signal unidirectional port to be input through said optical input port of said protection piece of optical terminal equipment into said protection piece of optical terminal equipment; and second unidirectional signal coupling/branching means, connected to said protection piece of optical terminal equipment, said second unidirectional signal coupling/branching means having one coupled signal unidirectional port and a plurality of uncoupled unidirectional ports respectively connected to corresponding working pieces of optical terminal equipment through said optical input ports in said second bidirectional optical ports of the corresponding working pieces of optical terminal equipment, said coupled signal unidirectional port being connected to said optical output port of said fourth bidirectional optical port of said protection piece of optical terminal equipment, an optical signal input into said coupled signal unidirectional port in said second unidirectional signal coupling/branching means being output from all of said uncoupled unidirectional ports to be input to the optical input ports of the corresponding working pieces of optical terminal equipment to the respective working pieces of optical terminal equipment.

14. A switching system according to claim 9, wherein said plurality of bidirectional optical signal paths in each of said first and second optical terminal stations further comprise at least one signal coupling/branching means, connected to corresponding working pieces of optical terminal equipment except one of the working pieces of optical terminal equipment located at a location furthest from said protection piece of optical terminal equipment, each of said at least one signal coupling/branching means having one coupled bidirectional optical port and two uncoupled bidirectional optical ports, one of said two uncoupled bidirectional optical ports being connected to said second bidirectional optical port of the corresponding working piece of optical terminal equipment, an optical signal input into said coupled bidirectional optical port in each signal coupling/branching means being routed therein to be output from said two uncoupled bidirectional optical ports, and an optical signal input into either of said uncoupled bidirectional optical ports in each signal coupling/branching means passing therethrough to be output from said coupled bidirectional optical port;

a furthest bidirectional optical connection path for connecting said second bidirectional optical port of said working piece of optical terminal equipment located at the furthest location from said protection piece of optical terminal equipment with the other of said two uncoupled bidirectional optical ports of said at least one signal coupling/branching means located at the location nearest to said working piece of optical terminal equipment located at the furthest location;

one or more bidirectional optical connection paths connecting the other of said two uncoupled bidirectional optical ports of said at least one signal coupling/branching means with said coupled bidirectional optical port of said at least one signal coupling/branching means located at a location further by one working piece than said each signal coupling/branching means from said protection piece of optical terminal equipment, except when said at least one signal coupling/branching means being said signal coupling/branching means located at the nearest location to said working piece of optical terminal equipment located at the furthest location; and a nearest bidirectional optical connection path for connecting said coupled bidirectional optical port of said signal coupling/branching means located at the nearest location to said protection piece of optical terminal equipment, to said fourth bidirectional optical port of said protection piece of optical terminal equipment.

15. A switching system according to claim 14, wherein said first and second bidirectional optical ports of each of said plurality of working pieces of optical terminal equipment each have an optical input port for the reception by said third receiving means, and an optical output port for the transmission by said second transmitting means, and said protection piece of optical terminal equipment has an optical input port for the reception by said fourth receiving means, and an optical output port for the transmission by said fifth transmitting means;

said plurality of bidirectional optical signal paths further including second signal coupling/branching means for connecting said fourth bidirectional optical port of said protection piece of optical terminal equipment with said coupled bidirectional optical port of said signal coupling/branching means located at the nearest location to said protection piece of optical terminal equipment, said second signal coupling/branching means having one coupled bidirectional optical port and two uncoupled unidirectional ports, said coupled bidirectional optical port of said second signal coupling/branching means being connected to said coupled bidirectional optical port of said signal coupling/branching means located at the nearest location to said protection piece of optical terminal equipment, said two uncoupled unidirectional ports of said second signal coupling/branching means being respectively connected to said optical input port and said optical output port of said protection piece of optical terminal equipment, an optical signal input into said coupled bidirectional optical port in said second signal coupling/branching means passing therethrough to be input into said protection piece of optical terminal equipment through one of said two uncoupled unidirectional ports of said second signal coupling/branching means and said optical input port thereof, and an optical signal output from said optical output port of said protection piece of optical terminal equipment being input into said second signal coupling/branching means through the other of said two uncoupled unidirectional ports thereof, passing through said second signal coupling/branching means to be output from said coupled bidirectional optical port thereof to said first signal coupling/branching means; and a plurality of third signal coupling/branching means for connecting said second bidirectional optical ports of the respective working pieces of optical terminal equipment with said one of said two uncoupled unidirectional ports of said at least one signal coupling/branching means, each of said third signal coupling/branching means having one coupled bidirectional optical port and two uncoupled unidirectional ports, said coupled bidirectional optical port of each third signal coupling/branching means being connected to said other of said two uncoupled unidirectional ports of said at least one signal coupling/branching means located at a location further by one working piece than said at least one signal coupling/branching means corresponding to said each third signal coupling/branching means from said protection piece of optical terminal equipment, said two uncoupled unidirectional ports of each third signal coupling/branching means being respectively connected to said optical input port and said optical output port of said one of said plurality of working pieces of optical terminal equipment corresponding to said each third signal coupling/branching means, an optical signal input into said coupled bidirectional optical port in each third signal coupling/branching means passing therethrough to be input to said working piece of optical terminal equipment corresponding to said third signal coupling/branching means through one of said uncoupled unidirectional ports thereof and said optical input port of said working piece of optical terminal equipment, and an optical signal output from said optical output port of said working piece of optical terminal equipment corresponding to said third signal coupling/branching means, being input through said other of said two uncoupled unidirectional ports of said third signal coupling/branching means, and passing through said third signal coupling/branching means to be output from said coupled bidirectional optical port thereof to said at least one signal coupling/branching means located at a location further by one working piece than said at least one signal coupling/branching means corresponding to said each third signal coupling/branching means from said protection piece of optical terminal equipment.

16. A switching system according to claim 15, wherein each of said one or more signal coupling/branching means and a corresponding one of the third coupling/branching means are realized by an optical coupler which comprises one coupled bidirectional optical port, one uncoupled bidirectional optical port, and two uncoupled unidirectional optical ports, said coupled bidirectional optical port and said uncoupled bidirectional optical port in the optical coupler respectively correspond to said coupled bidirectional optical port and said other of said each of said one or more signal coupling/branching means, said two uncoupled unidirectional optical ports in said optical coupler respectively correspond to said two uncoupled unidirectional ports of the corresponding third signal coupling/branching means.

17. A switching system according to claim 15, wherein a wavelength of said optical signal transmitted from said protection piece of optical terminal equipment to said working pieces of optical terminal equipment and a wavelength of said optical signal transmitted from said respective working pieces of optical terminal equipment to said protection piece of optical terminal equipment, are different, and said third signal coupling/branching means comprises filter means for passing therethrough optical signals of the wavelength of said optical signal transmitted from said protection piece of optical terminal equipment to said working pieces of optical terminal equipment.

18. A switching system according to claim 9, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths is each of first and second optical terminal stations comprise:

one or more first unidirectional signal coupling/branching means, provided corresponding to the respective working pieces of optical terminal equipment except one of the working pieces of optical terminal equipment located at location furthest from said protection piece of optical terminal equipment, each of said one or more first unidirectional signal coupling/branching means having one coupled unidirectional optical port and two uncoupled unidirectional optical ports, one of said two uncoupled unidirectional optical ports being connected to said optical output port of said second bidirectional optical port of the corresponding working piece of optical terminal equipment, an optical signal input into either of said uncoupled unidirectional optical ports in each first unidirectional signal coupling/branching means passing therethrough to be output from said coupled unidirectional optical port;

a first furthest unidirectional optical connection path for connecting said optical output port of said second bidirectional optical port of said working piece of optical terminal equipment located at the furthest location from said protection piece of optical terminal equipment, with the other of said two uncoupled unidirectional optical ports of one of said one or more first unidirectional signal coupling/branching means located at location nearest to said working piece of optical terminal equipment located at the furthest location;

one or more first unidirectional optical connection paths for connecting the other of said two uncoupled unidirectional optical ports of each of the one or more first unidirectional signal coupling/branching means with said coupled unidirectional optical port of one of said one or more first unidirectional signal coupling/branching means located at a position further by one piece than said each first unidirectional signal coupling/branching means from said protection piece of optical terminal equipment, except when said each of said one or more first unidirectional signal coupling/branching means being said first unidirectional signal coupling/branching means located at the nearest location to said working piece of optical terminal equipment located at the furthest location;

a first nearest unidirectional optical connection path for connecting said coupled unidirectional optical port of said first unidirectional signal coupling/branching means located at the nearest location to said protection piece of optical terminal equipment, to said optical input port of said fourth bidirectional optical port of the protection piece of optical terminal equipment;

one or more second signal coupling/branching means, provided corresponding to the respective working pieces of optical terminal equipment except said working piece of optical terminal equipment located at the furthest location from said protection piece of optical terminal equipment, each of said one or more second signal coupling/branching means having one coupled unidirectional optical port and two uncoupled unidirectional optical ports, one of said two uncoupled unidirectional optical ports being connected to said optical input port of said second bidirectional optical port of the corresponding working piece of optical terminal equipment, an optical signal input into said coupled unidirectional optical port in each second signal coupling/branching means branching therein to be output from said two uncoupled unidirectional optical ports;

a second furthest unidirectional optical connection path for connecting said optical input port of said second bidirectional optical port of said working piece of optical terminal equipment located at the furthest location from said protection piece of optical terminal equipment, with the other of said two uncoupled unidirectional optical ports of one of said one or more second signal coupling/branching means located at location nearest to said working piece of optical terminal equipment located at the furthest location;

one or more second unidirectional optical connection paths for connecting the other of said two uncoupled unidirectional optical ports of each of the one or more second signal coupling/branching means with said coupled unidirectional optical port of one of said one or more second signal coupling/branching means located at a position further by one piece than said each second signal coupling/branching means from said protection piece of optical terminal equipment, except when said each of said one or more second signal coupling/branching means being said second signal coupling/branching means located at the nearest location to said working piece of optical terminal equipment located at the furthest location; and a second nearest unidirectional optical connection path for connecting said coupled unidirectional optical port of said second signal coupling/branching means located at the nearest location to said protection piece of optical terminal equipment, to said optical output port of said fourth bidirectional optical port of the protection piece of optical terminal equipment.

19. A switching system according to claim 1, wherein each of said plurality of working pieces of optical terminal equipment comprises a receiving signal switch means for selecting the optical signals received through one of said first and second bidirectional optical ports, to be converted to said tributary signals by said second converting means, and both of said first and second transmitting means operating concurrently.

20. A switching system according to claim 19, wherein said plurality of bidirectional optical signal paths in each of first and second optical terminal stations comprise:

a first signal switching means, provided corresponding to the protection piece of optical terminal equipment, said first signal switching means having one first-type bidirectional optical port and a plurality of second-type bidirectional optical ports, said first-type bidirectional optical port being connected to said fourth bidirectional optical port of said protection piece of optical terminal equipment, said plurality of second-type bidirectional optical ports are respectively connected to said second bidirectional optical ports of the corresponding working pieces of optical terminal equipment, an optical signal input into said first-type bidirectional optical port in the first signal switching means being output from a selected one of said plurality of second-type bidirectional optical ports, and an optical signal input into either of said plurality of second-type bidirectional optical ports in the first signal switching means passing therethrough to be output from said first-type bidirectional optical port.

21. A switching system according to claim 20, wherein each of said first and second optical terminal stations further comprises switch control means for controlling the operations of said receiving signal switch means and said one or more signal switching means.

22. A switching system according to claim 21, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths further comprises:

a first signal coupling/branching means, provided corresponding to the protection piece of optical terminal equipment, said first unidirectional signal coupling/branching means having one coupled bidirectional optical port and two uncoupled undirectional ports, said coupled bidirectional optical port of the first signal coupling/branching means being connected to said first-type bidirectional optical port of said first signal switching means, said two uncoupled unidirectional ports of the first signal coupling/branching means are respectively connected to said optical input port and said optical output port of said protection piece of optical terminal equipment, an optical signal input into said coupled bidirectional optical port in the first signal coupling/branching means passing therethrough to be input into the protection piece of optical terminal equipment through the optical input port thereof, and an optical signal output from the optical output port of the protection piece of optical terminal equipment, passing through the first signal coupling/branching means to be output from said coupled bidirectional optical port thereof to the first signal switching means; and a plurality of second signal coupling/branching means, respectively provided corresponding to said plurality of working pieces of optical terminal equipment, each of said third first signal coupling/branching means having one coupled bidirectional optical port and two uncoupled unidirectional ports, said coupled bidirectional optical port of each second signal coupling/branching means being connected to one of said plurality of uncoupled bidirectional optical ports of said first signal switching means, said two uncoupled unidirectional ports of each second signal coupling/branching means are respectively connected to said optical input port and said optical output port of one of said plurality of working pieces of optical terminal equipment corresponding to said each second signal coupling/branching means, an optical signal input into said coupled bidirectional optical port in each second signal coupling/branching means passing therethrough to be applied to the working piece of optical terminal equipment corresponding to the second signal coupling/branching means through the one of the uncoupled unidirectional ports thereof and the optical input port of the working piece of optical terminal equipment, and an optical signal output from the optical output port of the working piece of optical terminal equipment corresponding to the second signal coupling/branching means, being input through the other of said two uncoupled unidirectional ports of the second signal coupling/branching means, and passing through the second signal coupling/branching means to be output from the coupled bidirectional optical port thereof to the first signal switching means.

23. A switching system according to claim 19, wherein said plurality of bidirectional optical signal paths in each of first and second optical terminal stations comprise:

a first unidirectional signal switching means, provided corresponding to the protection piece of optical terminal equipment, said first unidirectional signal switching means having one first-type unidirectional port and a plurality of second-type unidirectional ports, said plurality of second-type unidirectional ports being provided corresponding to the respective working pieces of optical terminal equipment, the plurality of second-type unidirectional ports being respectively connected to said optical output ports in the second bidirectional optical ports of the corresponding working pieces of optical terminal equipment, the first-type unidirectional port being connected to the optical input port of said fourth bidirectional optical port of said protection piece of optical terminal equipment, an optical signal input into one of said second-type unidirectional ports in the first unidirectional signal switching means being output from said first-type unidirectional port to be input into the protection piece of optical terminal equipment through the optical input port of the protection piece thereof; and a second unidirectional signal switching means, provided corresponding to the protection piece of optical terminal equipment, said second unidirectional signal switching means having one first-type unidirectional port and a plurality of second-type unidirectional ports, said plurality of second-type unidirectional ports being provided corresponding to the respective working pieces of optical terminal equipment, the plurality of second-type unidirectional ports being respectively connected to said optical input ports in the second bidirectional optical ports of the corresponding working pieces of optical terminal equipment, the first-type unidirectional port being connected to the optical output port of said fourth bidirectional optical port of said protection piece of optical terminal equipment, an optical signal input into said first-type unidirectional port in the second unidirectional signal switching means being output from a selected one of said second-type unidirectional ports to be applied to the respective working pieces of optical terminal equipment through the optical input port thereof.

24. A switching system according to claim 23, wherein each of said first and second optical terminal stations further comprises switch control means for controlling the operations of said receiving signal switch means, and said first and second unidirectional signal switching means.

25. A switching system according to claim 19, wherein said plurality of bidirectional optical signal paths in each of first and second optical terminal stations comprise:
one or more signal switching means, provided corresponding to the respective working pieces of optical terminal equipment except one of the working pieces of optical terminal equipment located at location furthest from said protection piece of optical terminal equipment, each of said one or more having one second-type bidirectional optical port and two second-type bidirectional optical ports,
one of said two second-type bidirectional optical ports of the signal switching means being connected to said second bidirectional optical port of the corresponding working piece of optical terminal equipment, an optical signal input into said second-type bidirectional optical port in each signal switching means passing therethrough to be output from one of said two second-type bidirectional optical ports, and an optical signal input into one of said second-type bidirectional optical ports in each signal switching means passing therethrough to be output from said second-type bidirectional optical port;
a furthest bidirectional optical connection path for connecting said second bidirectional optical port of said working piece of optical terminal equipment located at the furthest location from said protection piece of optical terminal equipment, with the other of said two second-type bidirectional optical ports of one of said one or more signal switching means located at location nearest to said one of the working pieces of optical terminal equipment located at the furthest location;
one or more bidirectional optical connection paths for connecting the other of said two second-type bidirectional optical ports of each of said one or more signal switching means with said second-type bidirectional optical port of one of said one or more signal coupling/branching means located at a position further by one piece than said each signal coupling/branching means from said protection piece of optical terminal equipment, except where said each of said one or more signal switching means being said signal switching means located at the nearest location to said one of the working pieces of optical terminal equipment located at the furthest location; and
a nearest bidirectional optical connection path for connecting said first-type bidirectional optical port of said signal switching means located at the nearest location to said protection piece of optical terminal equipment, to said fourth bidirectional optical port of the protection piece of optical terminal equipment.

26. A switching system according to claim 25, wherein each of said first and second optical terminal stations further comprises switch control means for controlling the operations of said receiving signal switch means and said one or more signal switching means.

27. A switching system according to claim 25, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;
said plurality of bidirectional optical signal paths further comprises:
a first signal coupling/branching means, provided corresponding to the protection piece of optical terminal equipment, for connecting said fourth bidirectional optical port of the protection piece of optical terminal equipment with said coupled bidirectional optical port of said signal switching means located at the nearest location to said protection piece of optical terminal equipment, said first signal coupling/branching means having one coupled bidirectional optical port and two uncoupled unidirectional ports, said coupled bidirectional optical port of the first signal coupling/branching means being connected to said coupled bidirectional optical port of the signal switching means located at the nearest location to said protection piece of optical terminal equipment, said two uncoupled unidirectional ports of the first signal coupling/branching means are respectively connected to said optical input port and said optical output port of said protection piece of optical terminal equipment, an optical signal input into said coupled bidirectional optical port in the first signal coupling/branching means passing therethrough to be input into the protection piece of optical terminal equipment through the optical input port thereof, and an optical signal output from the optical output port of the protection piece of optical terminal equipment, passing through the first signal coupling/branching means to be output from said coupled bidirectional optical port thereof to said signal switching means located at the nearest location to said protection piece of optical terminal equipment; and
a plurality of second signal coupling/branching means, respectively provided corresponding to said plurality of working pieces of optical terminal equipment, for connecting said one of said two second-type bidirectional optical ports of each signal switching means with said second bidirectional optical port of a corresponding working piece of optical terminal equipment, each of said second signal coupling/branching means having one coupled bidirectional optical port and two uncoupled unidirectional ports, said coupled bidirectional optical port of each second signal coupling/branching means being connected to said one of the uncoupled unidirectional optical ports of a corresponding one of the signal coupling/branching means, said two uncoupled unidirectional ports of each second signal coupling/branching means are respectively connected to said optical input port and said optical output port of one of said plurality of working pieces of optical terminal equipment corresponding to said each second signal coupling/branching means, an optical signal input into said coupled bidirectional optical port in each second signal coupling/branching means passing therethrough to be applied to the working piece of optical terminal equipment corresponding to the second signal coupling/branching means through the one of the uncoupled unidirectional ports of the second signal coupling/branching means and the optical input port of the working piece of optical terminal equipment, and an optical signal output from the optical output port of the working piece of optical terminal equipment corresponding to the second signal coupling/branching means, being input through the other of said two uncoupled unidirectional ports of the second signal coupling/branching means, and passing therethrough to be output from the coupled bidirectional optical port thereof to the signal switching means corresponding to the second signal coupling/branching means.

28. A switching system according to claim 27, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths in each of first and second optical terminal stations comprise:

one or more first unidirectional signal switching means, provided corresponding to the respective working pieces of optical terminal equipment except one of the working pieces of optical terminal equipment located at location furthest from said protection piece of optical terminal equipment, each of said one or more first signal switching means having one coupled unidirectional optical port and two uncoupled unidirectional optical ports, one of said two uncoupled unidirectional optical ports being connected to said optical output port of said second bidirectional optical port of the corresponding working piece of optical terminal equipment, an optical signal input into a predetermined one of said uncoupled unidirectional optical ports in a first unidirectional signal switching means corresponding to the working piece of optical terminal equipment, passing through the first unidirectional signal switching means to be output from said coupled unidirectional optical port thereof when the working piece of optical terminal equipment is to be connected to the protection transmission line, and an optical signal input into the other of said uncoupled unidirectional optical ports in the first unidirectional signal switching means passing through the first unidirectional signal switching means to be output from said coupled unidirectional optical port when any working piece of optical terminal equipment located at a further location than the working piece of optical terminal equipment corresponding to the first unidirectional signal switching means is to be connected to the protection transmission line;

a first furthest unidirectional optical connection path for connecting said optical output port of said second bidirectional optical port of said working piece of optical terminal equipment located at the furthest location from said protection piece of optical terminal equipment, with the other of said two uncoupled unidirectional optical ports of one of said one or more first unidirectional signal switching means located at location nearest to said working piece of optical terminal equipment located at the furthest location, an optical signal input into a predetermined one of said uncoupled unidirectional optical ports in at most a selected one of said one or more first unidirectional signal switching means passing therethrough to be output from said coupled unidirectional optical port, and an optical signal input into the other of said uncoupled unidirectional optical ports in one of said one or more first unidirectional signal switching means passing therethrough to be output from said coupled unidirectional optical port when any of the working pieces of optical terminal equipment located at a further location than the working piece of optical terminal equipment corresponding to the first unidirectional signal switching means is to be connected to the protection transmission line;

one or more first unidirectional optical connection paths for connecting the other of said two uncoupled unidirectional optical ports of each first unidirectional signal switching means with said coupled unidirectional optical port of one of said one or more first unidirectional signal switching means located at a position further by one piece than said each first unidirectional signal switching means from said protection piece of optical terminal equipment, except when said each of said one or more first unidirectional signal switching means being said first unidirectional signal switching means located at the nearest location to said working piece of optical terminal equipment located at the furthest location;

a first nearest unidirectional optical connection path for connecting said coupled unidirectional optical port of said first unidirectional signal switching means located at the nearest location to said protection piece of optical terminal equipment, to said optical input port of said fourth bidirectional optical port of the protection piece of optical terminal equipment;

one or more second unidirectional signal switching means, provided corresponding to the respective working pieces of optical terminal equipment except said working piece of optical terminal equipment is located at the furthest location from said protection piece of optical terminal equipment, each of said one or more second unidirectional signal switching means having one coupled unidirectional optical port and two uncoupled unidirectional optical ports, one of said two uncouuncoupled unidirectional optical ports being connected to said optical input port of said second bidirectional optical port of the corresponding working piece of optical terminal equipment, an optical signal which is applied to said coupled unidirectional optical ports in a second unidirectional signal switching means corresponding to one of the working pieces of optical terminal equipment, passing through the second unidirectional signal switching means to be output from a predetermined one of said two uncoupled unidirectional optical ports to the working piece of optical terminal equipment corresponding to the second unidirectional signal switching means when the working piece of optical terminal equipment is to be connected to the protection transmission line, and an optical signal which is applied to said coupled unidirectional optical ports in the second unidirectional signal switching means corresponding to the working piece of optical terminal equipment, passing through the second unidirectional signal switching means to be output from the other of the two uncoupled unidirectional optical port when any working piece of optical terminal equipment located at a further location than the working piece of optical terminal equipment corresponding to the second unidirectional signal switching means is to be connected to the protection transmission line;

a second furthest unidirectional optical connection path for connecting said optical input port of said second bidirectional optical port of said working piece of optical terminal equipment located at the furthest location from said protection piece of optical terminal equipment, with said other of said two uncoupled unidirectional optical ports of one of said one or more second unidirectional signal switching means located at location nearest to said working piece of optical terminal equipment located at the furthest location;

one or more second unidirectional optical connection paths for connecting said other of said two uncoupled unidirectional optical ports of each second unidirectional signal switching means with said coupled unidirectional optical port of one of said one or more second unidirectional signal switching means located at a position further by one piece than said each second unidirectional signal switching means from said protection piece of optical terminal equipment, except when said each second unidirectional signal switching means being located at the nearest location to said working piece of optical terminal equipment located at the furthest location; and a second nearest unidirectional optical connection path for connecting said coupled unidirectional optical port of said second unidirectional signal switching means located at the nearest location to said protection piece of optical terminal equipment, to said optical output port of said fourth bidirectional optical port of the protection piece of optical terminal equipment.

29. A switching system according to claim 28, wherein each of said first and second optical terminal stations further comprises switch control means for controlling the operations of said receiving signal switch means, and said first and second unidirectional signal switching means.

30. A switching system according to claim 19, wherein said plurality of bidirectional optical signal paths in each of first and second optical terminal stations comprise:

unidirectional signal switching means, provided corresponding to the protection piece of optical terminal equipment, said unidirectional signal switching means having one first-type unidirectional port and a plurality of second-type unidirectional ports, said plurality of second-type unidirectional ports being provided corresponding to the respective working pieces of optical terminal equipment, the plurality of second-type unidirectional ports being respectively connected to said optical output ports in the second bidirectional optical ports of the corresponding working pieces of optical terminal equipment, the first-type unidirectional port being connected to the optical input port of said fourth bidirectional optical port of said protection piece of optical terminal equipment, an optical signal input into one of said second-type unidirectional ports in the unidirectional signal switching means being output from said first-type unidirectional port to be input into the protection piece of optical terminal equipment through the optical input port of the protection piece thereof; and a unidirectional signal coupling/branching means, provided corresponding to the protection piece of optical terminal equipment, said unidirectional signal coupling/branching means having one coupled signal unidirectional port and a plurality of uncoupled unidirectional ports provided corresponding to the respective working pieces of optical terminal equipment, the plurality of uncoupled unidirectional ports are respectively connected to said optical input ports in the second bidirectional optical ports of the corresponding working pieces of optical terminal equipment, the coupled signal unidirectional port being connected to the optical output port of said fourth bidirectional optical port of said protection piece of optical terminal equipment, an optical signal input into said coupled signal unidirectional port in the unidirectional signal coupling/branching means being output from all of said uncoupled unidirectional ports to be applied through the optical input ports of the corresponding working pieces of optical terminal equipment to the respective working pieces of optical terminal equipment.

31. A switching system according to claim 19, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths in each of first and second optical terminal stations comprise:

one or more unidirectional signal switching means, provided corresponding to the respective working pieces of optical terminal equipment except one of the working pieces of optical terminal equipment located at location furthest from said protection piece of optical terminal equipment, each of said one or more first signal switching means having one coupled unidirectional optical port and two uncoupled unidirectional optical ports, one of said two uncoupled unidirectional optical ports being connected to said optical output port of said second bidirectional optical port of the corresponding working piece of optical terminal equipment, an optical signal input into a predetermined one of said uncoupled unidirectional optical ports in a unidirectional signal switching means corresponding to the working piece of optical terminal equipment, passing through the unidirectional signal switching means to be output from said coupled unidirectional optical port thereof when the working piece of optical terminal equipment is to be connected to the protection transmission line, and an optical signal input into the other of said uncoupled unidirectional optical ports in the unidirectional signal switching means passing through the unidirectional signal switching means to be output from said coupled unidirectional optical port when any working piece of optical terminal equipment located at a further location than the working piece of optical terminal equipment corresponding to the unidirectional signal switching means is to be connected to the protection transmission line;

a furthest unidirectional optical connection path for connecting said optical output port of said second bidirectional optical port of said working piece of optical terminal equipment located at the furthest location from said protection piece of optical terminal equipment, with the other of said two uncoupled unidirectional optical ports of one of said one or more unidirectional signal switching means located at location nearest to said working piece of optical terminal equipment located at the furthest location, an optical signal input into a predetermined one of said uncoupled unidirectional optical ports in at most a selected one of said one or more unidirectional signal switching means passing therethrough to be output from said coupled unidirectional optical port, and an optical signal input into the other of said uncoupled unidirectional optical ports in one of said one or more unidirectional signal switching means passing therethrough to be output from said coupled unidirectional optical port when any of the working pieces of optical terminal equipment located at a further location than the working piece of optical terminal equipment corresponding to the unidirectional signal switching means is to be connected to the protection transmission line;

one or more unidirectional optical connection paths for connecting the other of said two uncoupled unidirectional optical ports of each unidirectional signal switching means with said coupled unidirectional optical port of one of said one or more unidirectional signal switching means located at a position further by one piece than said each unidirectional signal switching means from said protection piece of optical terminal equipment, except when said each of said one or more unidirectional signal switching means being said unidirectional signal switching means located at the nearest location to said working piece of optical terminal equipment located at the furthest location;

a nearest unidirectional optical connection path for connecting said coupled unidirectional optical port of said unidirectional signal switching means located at the nearest location to said protection piece of optical terminal equipment, to said optical input port of said fourth bidirectional optical port of the protection piece of optical terminal equipment;

one or more unidirectional signal coupling/branching means, provided corresponding to the respective working pieces of optical terminal equipment except one of the working pieces of optical terminal equipment located at location furthest from said protection piece of optical terminal equipment, each of said one or more unidirectional signal coupling/branching means having one coupled unidirectional optical port and two uncoupled unidirectional optical ports, one of said two uncoupled unidirectional optical ports being connected to said optical output port of said second bidirectional optical port of the corresponding working piece of optical terminal equipment, an optical signal input into either of said uncoupled unidirectional optical ports in each unidirectional signal coupling/branching means passing therethrough to be output from said coupled unidirectional optical port;

a second furthest unidirectional optical connection path for connecting said optical output port of said second bidirectional optical port of said working piece of optical terminal equipment located at the furthest location from said protection piece of optical terminal equipment, with the other of said two uncoupled unidirectional optical ports of one of said one or more unidirectional signal coupling/branching means located at location nearest to said working piece of optical terminal equipment located at the furthest location;

one or more second unidirectional optical connection paths for connecting the other of said two uncoupled unidirectional optical ports of each of the one or more unidirectional signal coupling/branching means with said coupled unidirectional optical port of one of said one or more unidirectional signal coupling/branching means located at a position further by one piece than said each unidirectional signal coupling/branching means from said protection piece of optical terminal equipment, except when said each of said one or more unidirectional signal coupling/branching means being said unidirectional signal coupling/branching means located at the nearest location to said working piece of optical terminal equipment located at the furthest location;

a second nearest unidirectional optical connection path for connecting said coupled unidirectional optical port of said unidirectional signal coupling/branching means located at the nearest location to said protection piece of optical terminal equipment, to said optical input port of said fourth bidirectional optical port of the protection piece of optical terminal equipment.

32. A switching system according to claim 9, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths in each of said first and second optical terminal stations comprise, a long unidirectional optical connection path for connecting said optical output port of said fourth bidirectional optical port of said protection piece of optical terminal equipment, with said optical input port of said second bidirectional optical port of said working piece of optical terminal equipment located at location furthest from said protection piece of optical terminal equipment, a plurality of unidirectional optical connection paths each for connecting said optical output port of the second bidirectional optical port of each of said working pieces of optical terminal equipment except one of the working pieces of optical terminal equipment located at a furthest position from the protection piece of optical terminal equipment, with said input optical output port of the second bidirectional optical port of one of said plurality of working pieces of optical terminal equipment located at a position further by one piece than said each working piece of optical terminal equipment from said protection piece of optical terminal equipment, and a nearest unidirectional optical connection path for connecting said optical output port of the fourth bidirectional optical port of the protection piece of optical terminal equipment, with said optical input port of the second bidirectional optical port of the working piece of optical terminal equipment located at a nearest position from the protection piece of optical terminal equipment; and each of said plurality of working pieces of optical terminal equipment, further comprises relay means for receiving an optical signal input from said optical input port of said second bidirectional optical port thereof, and transmitting the received optical signal from said optical output port of said second bidirectional optical port thereof when said working piece of optical terminal equipment is not to be connected to said protection transmission line and one of the working pieces of optical terminal equipment located at a location further than the said each working piece of optical terminal equipment is to be connected to the protection transmission line.

33. A switching system according to claim 32, wherein each of said first and second optical terminal stations further comprises switch control means for controlling the operations of said receiving signal switch means, said transmitting signal switch means, and said relay means.

34. A switching system according to claim 32, wherein said relay means comprises optical bypass switch means for directly connecting said optical input port of said second bidirectional optical port with said optical output port of said second bidirectional optical port to bypass the optical signals received from the optical input port to the optical output port when said working piece of optical terminal equipment is not to be connected to said protection transmission line and one of the working pieces of optical terminal equipment located at a location further than the said each working piece of optical terminal equipment is to be connected to the protection transmission line.

35. A switching system according to claim 32, wherein said optical input port comprises optical-to-electric conversion means for converting the optical signals received through said optical input port into electric signals, and said optical output port comprises electric-to-optical conversion means for converting electric signals into optical signals to be output through the optical output port, and said relay means comprises optical bypass switch means for supplying the electric signals converted by said optical-to-electric conversion means, to the electric-to-optical conversion means when said working piece of optical terminal equipment is not to be connected to said protection transmission line and one of the working pieces of optical terminal equipment located at a location further than the said each working piece of optical terminal equipment is to be connected to the protection transmission line.

36. A switching system according to claim 9, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths in each of said first and second optical terminal stations comprise:

a long unidirectional optical connection path for connecting said optical input port of said second bidirectional optical port of said protection piece of optical terminal equipment, with said optical output port of said second bidirectional optical port of said working piece of optical terminal equipment located at location furthest from said protection piece of optical terminal equipment, a plurality of unidirectional optical connection paths each for connecting said optical input port of the second bidirectional optical port of each of said working pieces of optical terminal equipment except one of the working pieces of optical terminal equipment located at a furthest position from the protection piece of optical terminal equipment, with said output optical output port of the second bidirectional optical port of one of said plurality of working pieces of optical terminal equipment located at a position further by one piece than said each working piece of optical terminal equipment from said protection piece of optical terminal equipment, and a nearest unidirectional optical connection path for connecting said optical input port of the fourth bidirectional optical port of the protection piece of optical terminal equipment, with said optical output port of the second bidirectional optical port of the working piece of optical terminal equipment located at a nearest position from the protection piece of optical terminal equipment; and each of said plurality of working pieces of optical terminal equipment, further comprises relay means for receiving an optical signal input from said optical input port of said second bidirectional optical port thereof, and transmitting the received optical signal from said optical output port of said second bidirectional optical port thereof when said working piece of optical terminal equipment is not to be connected to said protection transmission line and one of the working pieces of optical terminal equipment located at a location further than the said each working piece of optical terminal equipment is to be connected to the protection transmission line.

37. A switching system according to claim 36, wherein each of said first and second optical terminal stations further comprises switch control means for controlling the operations of said receiving signal switch means, said transmitting signal switch means, and said relay means.

38. A switching system according to claim 36, wherein said relay means comprises optical bypass switch means for directly connecting said optical input port of said second bidirectional optical port with said optical output port of said second bidirectional optical port to bypass the optical signals received from the optical input port to the optical output port when said working piece of optical terminal equipment is not to be connected to said protection transmission line and one of the working pieces of optical terminal equipment located at a location further than the said each working piece of optical terminal equipment is to be connected to the protection transmission line.

39. A switching system according to claim 36, wherein said optical input port comprises optical-to-electric conversion means for converting the optical signals received through said optical input port into electric signals, and said optical output port comprises electric-to-optical conversion means for converting electric signals into optical signals to be output through the optical output port, and said relay means comprises optical bypass switch means for supplying the electric signals converted by said optical-to-electric conversion means, to the electric-to-optical conversion means when said working piece of optical terminal equipment is not to be connected to said protection transmission line and one of the working pieces of optical terminal equipment located at a location further than the said each working piece of optical terminal equipment is to be connected to the protection transmission line.

40. A switching system according to claim 9, wherein said first and second bidirectional optical ports of each of said plurality of working pieces of optical terminal equipment each having an optical input port for the reception by said third receiving means, and an optical output port for the transmission by said second transmitting means, and said protection piece of optical terminal equipment each having an optical input port for the reception by said fourth receiving means, and an optical output port for the transmission by said fifth transmitting means;

said plurality of bidirectional optical signal paths in each of said first optical terminal station comprises, a first long unidirectional optical connection path for connecting said optical output port of said fourth bidirectional optical port of said protection piece of optical terminal equipment, with said optical input port of said second bidirectional optical port of said working piece of optical terminal equipment located at location furthest from said protection piece of optical terminal equipment, a plurality of first unidirectional optical connection paths each for connecting said optical output port of the second bidirectional optical port of each of said working pieces of optical terminal equipment except one of the working pieces of optical terminal equipment located at a furthest position from the protection piece of optical terminal equipment, with said input optical output port of the second bidirectional optical port of one of said plurality of working pieces of optical terminal equipment located at a position further by one piece than said each working piece of optical terminal equipment from said protection piece of optical terminal equipment, and a first nearest unidirectional optical connection path for connecting said optical output port of the fourth bidirectional optical port of the protection piece of optical terminal equipment, with said optical input port of the second bidirectional optical port of the working piece of optical terminal equipment located at a nearest position from the protection piece of optical terminal equipment;

said plurality of bidirectional optical signal paths in each of said second optical terminal station comprises:

a second long unidirectional optical connection path for connecting said optical input port of said second bidirectional optical port of said protection piece of optical terminal equipment, with said optical output port of said second bidirectional optical port of said working piece of optical terminal equipment located at location furthest from said protection piece of optical terminal equipment, a plurality of second unidirectional optical connection paths each for connecting said optical input port of the second bidirectional optical port of each of said working pieces of optical terminal equipment except one of the working pieces of optical terminal equipment located at a furthest position from the protection piece of optical terminal equipment, with said output optical output port of the second bidirectional optical port of one of said plurality of working pieces of optical terminal equipment located at a position further by one piece than said each working piece of optical terminal equipment from said protection piece of optical terminal equipment, and a second nearest unidirectional optical connection path for connecting said optical input port of the fourth bidirectional optical port of the protection piece of optical terminal equipment, with said optical output port of the second bidirectional optical port of the working piece of optical terminal equipment located at a nearest position from the protection piece of optical terminal equipment;

each of said plurality of working pieces of optical terminal equipment, further comprises relay means for receiving an optical signal input from said optical input port of said second bidirectional optical port thereof, and transmitting the received optical signal from said optical output port of said second bidirectional optical port thereof when said working piece of optical terminal equipment is not to be connected to said protection transmission line and one of the working pieces of optical terminal equipment located at a location further than the said each working piece of optical terminal equipment is to be connected to the protection transmission line.

41. A switching system according to claim 40, wherein each of said first and second optical terminal stations further comprises switch control means for controlling the operations of said receiving signal switch means, said transmitting signal switch means, and said relay means.

42. A switching system according to claim 40, wherein said relay means comprises optical bypass switch means for directly connecting said optical input port of said second bidirectional optical port with said optical output port of said second bidirectional optical port to bypass the optical signals received from the optical input port to the optical output port when said working piece of optical terminal equipment is not to be connected to said protection transmission line and one of the working pieces of optical terminal equipment located at a location further than the said each working piece of optical terminal equipment is to be connected to the protection transmission line.

43. A switching system according to claim 40, wherein said optical input port comprises optical-to-electric conversion means for converting the optical signals received through said optical input port into electric signals, and said optical output port comprises electric-to-optical conversion means for converting electric signals into optical signals to be output through the optical output port, and said relay means comprises optical bypass switch means for supplying the electric signals converted by said optical-to-electric conversion means, to the electric-to-optical conversion means when said working piece of optical terminal equipment is not to be connected to said protection transmission line and one of the working pieces of optical terminal equipment located at a location further than the said each working piece of optical terminal equipment is to be connected to the protection transmission line.

44. A system for optical communication between optical terminal stations automatically and selectively switchable between normal and protection modes, comprising:

first and second optical terminal stations;

a plurality of working optical transmission lines, each connecting said first and second optical terminal stations and operable in the normal mode for transmitting optical signals in two opposite directions between said first and second optical terminal stations;

a protection optical transmission line, provided as a standby bidirectional optical transmission for at least some of said working optical transmission lines, connecting said first and second optical terminal stations and operable in the protection mode for transmitting an optical signal between said first and second optical terminal stations;

each of said first and second optical terminal stations comprising:

a protection piece of optical terminal equipment connected to said protection optical transmission line and operable in the protection mode for transmitting and receiving signals over the protection optical transmission line, a plurality of groups of working pieces of optical terminal equipment, respective working pieces of optical terminal equipment in said plurality of groups being connected to corresponding said working optical transmission lines, the respective working pieces of optical terminal equipment in each group being concurrently connectable to said protection piece of optical terminal equipment in the protection mode, a sum of maximum transmission rates of the working optical transmission lines corresponding to the working pieces of optical terminal equipment in each of the groups being not more than a transmission rate of said protection transmission line, a plurality of bidirectional optical signal paths connected to the respective groups, each operatively connecting the working pieces of optical terminal equipment in each of the groups corresponding to said each bidirectional optical signal path with said protection piece of optical terminal equipment in the protection mode for signal transmission therebetween, and a control unit which maintains the normal mode of each of the plurality of working pieces in the absence of any trouble occurring on the respective working optical transmission lines and which is responsive to a trouble occurring in one of the plurality of working optical transmission lines for disabling the normal mode and enabling the protection mode of operation of the respective working piece and of the protection piece;

each of said working pieces of optical terminal equipment comprising:

at least one bidirectional tributary port inputting and outputting tributary signals therethrough, first and second bidirectional optical ports, each for inputting and outputting optical signals, said first bidirectional optical port being connected to one of the working optical transmission lines corresponding to said each of said plurality of working pieces of optical terminal equipment, and said second bidirectional optical port being connected to one of the bidirectional optical signal paths corresponding to one of the groups in which said each of said working pieces of optical terminal equipment is included, first receiving means, connected to said at least one tributary port, for receiving tributary signals from said at least one tributary port, first converting means, connected to said first receiving means, for converting the tributary signals to optical signals, first transmitting means, connected to said first converting means and said first bidirectional optical port and operable in the normal mode for transmitting the optical signals, converted from the tributary signals, through said first bidirectional optical port and the corresponding working optical transmission line to the other of said first and second optical terminal stations, second transmitting means, connected to said first converting means and said second bidirectional optical port and operable in the protection mode, for transmitting the optical signals, converted from said received tributary signals, through said one of the second bidirectional optical ports and the corresponding bidirectional optical signal path to said protection piece of optical terminal equipment, second receiving means, connected to said first bidirectional port, for receiving optical signals transmitted in the normal mode from said other of said first and second optical terminal stations through said first bidirectional optical port, third receiving means, connected to said second bidirectional optical port, for receiving optical signals transmitted in the protection mode from said protection piece of optical terminal equipment through the corresponding bidirectional optical signal path and said second bidirectional port, second converting means, selectively connected to said second receiving means in said normal mode and to said third receiving means in said protection mode, for converting the optical signals received by said second and third receiving means to tributary signals to be output from said at least one bidirectional tributary port, and third transmitting means, connected to said second converting means and said at least one bidirectional tributary port, for transmitting the tributary signals converted by said second converting means to said at least one bidirectional tributary port; and said protection piece of optical terminal equipment comprising:
a third bidirectional optical port inputting and outputting optical signals therethrough, said third bidirectional optical port being connected to said protection optical transmission line,
a plurality of fourth bidirectional optical ports, provided for the respective groups, each inputting and outputting optical signals therethrough, said plurality of fourth bidirectional optical ports being operatively connectable to said plurality of bidirectional optical signal paths, respectively,
fourth receiving means, connected to said plurality of fourth bidirectional optical ports, for receiving optical signals transmitted in the protection mode through said plurality of fourth bidirectional optical ports from said plurality of groups of working pieces of optical terminal equipment,
multiplexing means, connected to said fourth receiving means, operative in the protection mode for multiplexing signals received through said plurality of fourth bidirectional optical ports to generate a multiplexed optical signal and output the multiplexed optical signal to fourth transmitting means,
said fourth transmitting means, connected to said multiplexing means, being operative in the protection mode for transmitting the multiplexed optical signals through said protection optical transmission line to said other of said first and second optical terminal stations,
fifth receiving means, connected to said third bidirectional optical port, operative in the protection mode for receiving optical signals from said other of said first and second optical terminal stations through said third bidirectional optical port,
demultiplexing means operative in the protection mode for demultiplexing signals received through said third bidirectional optical port into a plurality of demultiplexed signals and outputting the demultiplexed signals to fifth transmitting means, and
said fifth transmitting means, connected to said demultiplexing means, being operative in the protection mode for transmitting the demultiplexed optical signals through said plurality of fourth bidirectional optical ports to said plurality of working pieces of optical terminal equipment.

45. A system for optical communication between optical terminal stations automatically and selectively switchable between normal and protection modes, comprising:
first and second optical terminal stations;
a plurality of working optical transmission lines, each connecting said first and second optical terminal stations and operable in the normal mode, for transmitting optical signals in two opposite directions between said first and second optical terminal stations;
a protection optical transmission line, provided as a stand by bidirectional optical transmission line for at least some of said working optical transmission lines, connecting said first and second optical terminal stations and operable in the protection mode for transmitting an optical signal between said first and second optical terminal stations;
each of said first and second optical terminal stations comprising:
a protection piece of optical terminal equipment corresponding to said protection optical transmission line and operable in the protection mode for transmitting and receiving signals over the protection optical transmission line,
a plurality of working pieces of optical terminal equipment respectively corresponding to said plurality of working optical transmission lines,
a plurality of bidirectional optical signal paths, each connecting a respective said working piece of optical terminal equipment with said protection piece of optical terminal equipment and operable in the protection mode for signal transmission therebetween, and
a control unit which maintains the normal mode of each of the plurality of working pieces in the absence of any trouble occurring on the respective working optical transmission lines and which is responsive to a trouble occurring in one of the plurality of working optical transmission lines for disabling the normal mode and enabling the protection mode of operation of the respective working piece and of the protection piece;
each of said plurality of working pieces of optical terminal equipment comprising:
at least one bidirectional tributary port inputting and outputting tributary signals therethrough,
a first bidirectional optical port inputting and outputting optical signals therethrough, said first bidirectional optical port being connected to one of the working optical transmission lines corresponding to said each of said plurality of working pieces of optical terminal equipment, at least one second bidirectional optical port inputting and outputting optical signals therethrough, said at least one second bidirectional optical port being connected to at least one of said plurality of bidirectional optical signal paths, first receiving means, connected to said at least one tributary port, for receiving tributary signals from said at least one tributary port, first converting means, connected to said first receiving means, for converting the tributary signals to optical signals, first transmitting means, connected to said first converting means and said first bidirectional optical port and operable in the normal mode, for transmitting the optical signals, converted from the received tributary signals, through said first bidirectional optical port and operable in the protection mode to the other of said first and second optical terminal stations, second transmitting means connected to said first converting means and operable in the protection mode for transmitting the optical signals converted from said received tributary signals through said at least one second bidirectional optical port and the respective bidirectional optical signal path to said protection piece of optical terminal equipment, second receiving means, connected to said first bidirectional optical port, for receiving optical signals, transmitted in the normal mode from said other of said first and second optical terminal stations, through said respective working line and said first bidirectional optical port, third receiving means, connected to said at least one second bidirectional optical port, for receiving optical signals, transmitted in the protection mode from said protection piece of optical terminal equipment, through said at least one second bidirectional optical port from said corresponding bidirectional optical signal path, second converting means, selectively connected to said second receiving means in said normal mode and to said third receiving means in said protection mode, for converting the respective optical signals received by said second and third receiving means, to tributary signals to be output from said at least one bidirectional tributary port, and third transmitting means, connected to said second converting means and said at least one bidirectional tributary port, for transmitting the tributary signals converted by said second converting means to said at least one bidirectional tributary port; and said protection piece of optical terminal equipment comprising:

a third bidirectional optical port inputting and outputting optical signals, said third bidirectional optical port being connected to said protection optical transmission line, a plurality of fourth bidirectional optical ports each inputting and outputting optical signals therethrough, each of said plurality of fourth bidirectional optical ports being operatively connectable to said at least one second bidirectional optical port in said working pieces of optical terminal equipment, fourth receiving means, connected to said plurality of fourth bidirectional optical ports, for receiving optical signals transmitted in the protection mode through said plurality of fourth bidirectional optical ports from at least one of said plurality of working pieces of optical terminal equipment, multiplexing means, connected to said fourth receiving means, operative in the protection mode for multiplexing signals received through said plurality of fourth bidirectional optical ports to generate a multiplexed optical signal and outputting the multiplexed signal to fourth transmitting means, said fourth transmitting means, connected to the multiplexing means, being operative in the protection mode for transmitting the multiplexed optical signals through said protection optical transmission line to said other of said first and second optical terminal stations, fifth receiving means, connected to said third bidirectional optical port, operative in the protection mode for receiving optical signals from said other of said first and second optical terminal stations through said third bidirectional optical port, demultiplexing means operative in the protection mode for demultiplexing signals received through said third bidirectional optical port into a plurality of demultiplexed signals to generate a demultiplexed optical signal and outputting the demultiplexed signals to fifth transmitting means, said fifth transmitting means, connected to said demultiplexing means, being operative in the protection mode for transmitting the demultiplexed optical signals through said plurality of fourth bidirectional optical ports, to said plurality of working pieces of optical terminal equipment, and said plurality of bidirectional optical signal paths corresponding to the respective second bidirectional optical ports of said working pieces of optical terminal equipment, each of said plurality of bidirectional optical signal paths operatively connecting the respective second bidirectional optical ports with said fourth bidirectional optical ports of said protection piece of optical terminal equipment for signal transmission therebetween in the protection mode and wherein a sum of maximum transmission rates of the plurality of bidirectional optical signal paths concurrently connected to the fourth bidirectional optical ports of the protection piece of optical terminal equipment is not more than a transmission rate of said protection transmission line.

46. A system according to claim 41, wherein the transmission rates of said plurality of bidirectional optical signal paths are equal.

47. A system according to claim 42, wherein the transmission rates of said plurality of bidirectional optical signal paths are equal to a minimum transmission rate of said working pieces of optical terminal equipment.

48. A switching system according to claim 1, wherein said protection piece of optical terminal equipment comprises:

at least one bidirectional tributary port inputting and outputting low-priority tributary signals;

sixth receiving means, connected to said at least one bidirectional tributary port in said protection piece of optical terminal equipment, for receiving low-priority tributary signals from said at least one tributary port;

third converting means, connected to said sixth receiving means and transmission signal switch means, for converting the low-priority tributary signals received by said sixth receiving means to optical signals, and supplying the optical signals to transmission signal switch means;

said transmission signal switch means being operable for selecting one of the outputs of said fourth receiving means and said third converting means and supplying the selected output to said fourth transmitting means;

said fourth transmitting means, further, transmitting the optional signals converted by the third converting means through said third bidirectional optical port to the other of said optical terminal stations, when the optical signals converted by the third converting means are supplied to said fourth transmitting means by said transmission signal switch means;

fourth converting means, connected to said fifth receiving means, for converting the optical signals received by said fifth receiving means to low-priority tributary signals to be output from said at least one bidirectional tributary port in said protection piece of optical terminal equipment; and seventh transmitting means, connected to said fourth converting means and said at least one bidirectional tributary port in said protection piece of optical terminal equipment, for transmitting the low-priority tributary signals, converted by said fourth converting means, from said at least one bidirectional tributary port.

49. A system for optical communication between optical terminal stations automatically and selectively switchable between normal and protection modes, comprising:

associated pairs of local and remote working optical terminal equipment;

plural working optical transmission lines interconnecting said local and remote working optical terminal equipment of each pair and operable in a normal mode to transmit corresponding optical signals in two opposite directions between said local and remote optical terminal equipment of each pair;

a plurality of pairs of local and remote bidirectional optical signal paths respectively interconnected by said pairs of corresponding local and remote working optical terminal equipment and operative in the protection mode for providing bidirectional communications therebetween;

at least one protection optical transmission line operable in the protection mode for providing bidirectional communications and selectively corresponding to at least one of said working optical transmission lines;

at least one pair of local and remote protection units interconnected by the respective at least one protection optical transmission line and identically constructed as and corresponding to the local and remote working units, respectively, of at least one pair of said local and remote working optical terminal equipment, operative in the protection mode to transmit optical signals in two opposite directions on the respective, at least one interconnecting protection optical transmission line;

a control unit which maintains the normal mode of each of the plurality of working pieces in the absence of any trouble occurring on the respective working optical transmission lines and which is responsive to a trouble occurring in one of the plurality of working optical transmission lines for disabling the normal mode and enabling the protection mode of operation of the respective working piece and the protection piece; and each of the local and remote protection units comprising:

a first bidirectional optical port operatively connected in the protection mode to each local working unit corresponding thereto via a corresponding one of said bidirectional optical signal paths, first receiving means, connected to said first bidirectional optical port, operative in the protection mode for receiving the corresponding local and remote optical signals from the respective local and remote working units of a pair of said local and remote working optical terminal equipment corresponding thereto, over the corresponding one of the pair of local and remote bidirectional optical signal path, a second bidirectional optical port operatively connected to said at least one protection optical transmission line, first transmitting means, connected to said first receiving means and said second bidirectional optical port, operative in the protection mode for transmitting the local optical signals via said at least one protection optical transmission line to the associated remote protection unit of the pair thereof, second receiving means, connected to said second bidirectional optical port, operative in the protection mode for receiving remote optical signals from the associated remote protection unit of the pair thereof, and second transmitting means, connected to said second receiving means and said first bidirectional optical port, operative in the protection mode for transmitting the received, remote optical signals via said first bidirectional optical port to the respective one of the associated local and remote working units of the one pair of said working optical terminal equipment corresponding thereto over the corresponding bidirectional optical signal path.

* * * * *

UNITED STATES PATENT AND TRADEMARK OFFICE
CERTIFICATE OF CORRECTION

PATENT NO. : 5,327,275
DATED : Jul. 5, 1994
INVENTOR(S) : YAMANE et al.

It is certified that error appears in the above-indentified patent and that said Letters Patent is hereby corrected as shown below:

Col. 2,    line 18, after "$L_0$" insert --,--;
           line 19, delete ",".

Col. 7,    line 35, after "$L_N$" insert --each--;
           line 50, change "throug" to --through--.

Col. 15,   line 15, change "opticl" to --optical--.

Col. 16,   line 19, change "$L_0'$" to --$L_0$--.

Col. 17,   line 22, after "seventh" insert --embodiments, and denote an optical switch in the sixth--.

Col. 22,   line 17, delete ", . . . 12N'".

Col. 23,   line 59, change "$L_0$" to --$L_8$--.

Col. 25, line 56, change "140" to --141--.

Col. 27,   line 1, change "C3'" to --C8'--.

Col. 29,   line 41, change "cyclincally" to --cyclically--;
           line 54, after "880," insert --882',--.--.

Col. 38,   line 17, after "comprise" insert --:--.

UNITED STATES PATENT AND TRADEMARK OFFICE
CERTIFICATE OF CORRECTION

PATENT NO. : 5,327,275
DATED : Jul. 5, 1994
INVENTOR(S) : YAMANE et al.

It is certified that error appears in the above-indentified patent and that said Letters Patent is hereby corrected as shown below:

Col. 39, line 15, after "including" insert --:--.

Col. 41, line 4, change "is" to --in--.

Signed and Sealed this

Thirteenth Day of March, 2001

Attest:

NICHOLAS P. GODICI

*Attesting Officer*     *Acting Director of the United States Patent and Trademark Office*